US009635006B2

(12) United States Patent
Oz et al.

(10) Patent No.: US 9,635,006 B2
(45) Date of Patent: Apr. 25, 2017

(54) HACKER SECURITY SOLUTION FOR PACKAGE TRANSFER TO AND FROM A VEHICLE

(71) Applicant: Continental Intelligent Transportation Systems, LLC, Santa Clara, CA (US)

(72) Inventors: Seval Oz, San Jose, CA (US); Sudeep Kaushik, Fremont, CA (US); Yao Zhai, Fremont, CA (US); Francisco Fernandez Nares, Morgan Hill, CA (US); Adrian Ramos Aguayo, San Jose, CA (US); Tammer Zein El-Abedein, Campbell, CA (US)

(73) Assignee: Continental Intelligent Transportation Systems, LLC, Santa Clara, CA (US)

( * ) Notice: Subject to any disclaimer, the term of this patent is extended or adjusted under 35 U.S.C. 154(b) by 104 days.

(21) Appl. No.: 14/832,882

(22) Filed: Aug. 21, 2015

(65) Prior Publication Data
US 2016/0099927 A1    Apr. 7, 2016

Related U.S. Application Data

(60) Provisional application No. 62/058,410, filed on Oct. 1, 2014.

(51) Int. Cl.
*H04L 29/06* (2006.01)
*G06Q 10/08* (2012.01)
(Continued)

(52) U.S. Cl.
CPC ........... *H04L 63/08* (2013.01); *G06Q 10/083* (2013.01); *G07C 5/0808* (2013.01); *H04L 63/06* (2013.01);
(Continued)

(58) Field of Classification Search
CPC ....................................................... H04L 63/08
(Continued)

(56) References Cited

U.S. PATENT DOCUMENTS 5,864,297 A    1/1999    Sollestre et al.
6,073,064 A    6/2000    Konrad et al.
(Continued)

FOREIGN PATENT DOCUMENTS

EP         1 564 690        8/2005
WO      WO 0197144 A1    12/2001
(Continued)

OTHER PUBLICATIONS

"Cardrops, your car becomes an e-commerce delivery point"; downloaded from Internet Sep. 27, 2015, 5 pages, http://www.cardrops.com.
(Continued)

*Primary Examiner* — Longbit Chai

(57) ABSTRACT

A cloud based system for a package exchange with a vehicle service is discussed. The system can have servers having processors, ports, and databases and a security module running on the processors to receive a virtual key and one of a request for package exchange with a vehicle service, data, or both, from a package delivery vehicle. The virtual key has a first shelf life and is used for authentication of communications from the delivery vehicle. The security module can receive a security token having a second shelf life from a user. The security token is used for verification of the user and target vehicle. After the first authentication and in an overlap window of the two shelf lives, the security module can send the one or more commands to an on-board actuation module of the target vehicle to cause an electromechanical operation in the target vehicle.

20 Claims, 23 Drawing Sheets

(51) Int. Cl.
*H04W 12/06* (2009.01)
*H04W 12/08* (2009.01)
*G07C 5/08* (2006.01)
*H04W 4/02* (2009.01)
*H04W 4/04* (2009.01)
*H04L 29/08* (2006.01)

(52) U.S. Cl.
CPC .............. *H04L 63/12* (2013.01); *H04L 67/18* (2013.01); *H04W 12/06* (2013.01); *H04W 12/08* (2013.01); *H04L 67/12* (2013.01); *H04L 2209/84* (2013.01); *H04W 4/02* (2013.01); *H04W 4/046* (2013.01)

(58) Field of Classification Search
USPC ............................................................ 726/9
See application file for complete search history.

(56) References Cited

U.S. PATENT DOCUMENTS

| | | | |
|---|---|---|---|
| 6,529,808 | B1 | 3/2003 | Diem |
| 7,432,796 | B2 | 10/2008 | Kawamura et al. |
| 8,232,897 | B2 | 7/2012 | Tieman et al. |
| 2004/0189439 | A1 | 9/2004 | Cansino |
| 2005/0203683 | A1 | 9/2005 | Olsen et al. |
| 2005/0216553 | A1 | 9/2005 | Mallonee et al. |
| 2008/0021747 | A1 | 1/2008 | Moeller et al. |
| 2009/0160607 | A1 | 6/2009 | Edwards et al. |
| 2011/0032075 | A1 | 2/2011 | Alrabady et al. |
| 2011/0112969 | A1 | 5/2011 | Zaid et al. |
| 2011/0257817 | A1 | 10/2011 | Tieman |
| 2014/0180959 | A1* | 6/2014 | Gillen ................ G06Q 10/0838 705/341 |
| 2014/0229501 | A1 | 8/2014 | Josefiak |
| 2015/0215779 | A1 | 7/2015 | Fokkelman et al. |

FOREIGN PATENT DOCUMENTS

| | | |
|---|---|---|
| WO | WO 2013/092306 A2 | 6/2013 |
| WO | WO 2016099623 A1 | 6/2016 |

OTHER PUBLICATIONS

Continental: Open Seasame: Continentak With mobile phones are at a great car keys Nov. 13, 2011, (6 pages).

Behrmann, Elisabeth; Weiss, Richard, "Volvo Said to Near Deal to Deliver Parcels to Parked Cars" 6 pages. Nov. 17, 2014. Downloaded Dec. 10, 2014 from www.bloomberg.com/news/2014-11-17/volvo-said-to-near-deal . . . .

International Search Report and Written Opinion for International Patent Application No. PCT/US2015/053159 mailed May 31, 2016; 9 pages. International Searching Authority/US, Alexandria VA US.

* cited by examiner

Box2Go Telematics Value Proposition

The Priority Package Problem

- What happens when you're not at home?
  - Priority package

Delivery Person 304

- Busy at work

- Missed Delivery

- What are your options?
  ○ Carrier
     – Attempt re-delivery
  ○ You
     – Release liability,
     – Wait for it at home, or
     – Pick it up at night

800A

HACKER SECURITY SOLUTION FOR PACKAGE TRANSFER TO AND FROM A VEHICLE

RELATED APPLICATIONS

This application claims the benefit of U.S. Provisional Patent Application No. 62/058,410, filed Oct. 1, 2014, and entitled "PACKAGE DELIVERY TO AND PICK-UP FROM A VEHICLE", and is incorporated herein by reference.

FIELD

The design generally relates to a package delivery to and pick-up from a vehicle system.

BACKGROUND

Typically, shipments are usually sent to the home address of the person concerned. This technology instead delivers packages to or picks-up a package inside a customer's vehicle while ensuring safe delivery at the exchange location.

SUMMARY

In general, a cloud based system for a package exchange with a vehicle service is described. The cloud based system has one or more servers having one or more processors and one or more ports. The servers can be configured to cooperate with one or more databases in the cloud based system. A security module running on the one or more processors can be configured to receive a first virtual key via a first port and one of 1) a request for package exchange with a vehicle service, 2) data, or 3) both, from a first client device associated with a package delivery vehicle. The first virtual key has a first shelf life and can be stored in a first database of the cloud based system. The first virtual key can be used by the security module for a first authentication of communications from the first client device. The security module is further configured to receive a security token associated with both a user and the target vehicle from a second client device associated with the user. The security token has a second shelf life and is used for a verification of the user and target vehicle. The security module is configured to send the security token and one or more commands after the first authentication and in an overlap window of time between the first shelf life and the second shelf life. The security module can be configured to send the security token to any of i) a first client device, ii) one or more application programming interfaces of a server of third party site or iii) internally to another module within the cloud based system for a package exchange with a vehicle service the security token for verification and one or more commands regarding the vehicle to be executed. The commands regarding the vehicle are either based on the request from the first client device, and/or initiated by the security module. The security module is configured to send the one or more commands regarding the vehicle over a network to either a local client device or over the network via the one or more application programming interfaces of the server of third party site to an on-board actuation module installed in the target vehicle. The on-board actuation module can be installed in the target vehicle and in response to the commands can be configured to cause an electro-mechanical operation in the target vehicle. The electro-mechanical operation may include any of i) open up a door, a window, or a trunk of the target vehicle, ii) unlock a door or trunk of the target vehicle, and iii) any combination of these two, so that the package delivery service can perform a package exchange with the target vehicle.

In an embodiment, a cloud based system for a package exchange with a vehicle service is described. The cloud based system has a security module configured to receive a first virtual key and a command from a package delivery vehicle. The first virtual key which is used for a first authentication of the received command has a first shelf life. The security module is further configured to receive a security token from a user. The security token which is used by a telematics provider for user verification and has a second shelf life. After the first authentication and in an overlap window of the first shelf life and the second shelf life, the security module is configured to send the security token and the command to the telematics provider such that after user verification the command is sent to a target vehicle for the package exchange with a vehicle service.

In an embodiment, a secure method of package exchange with a vehicle service by a cloud-based system between a package delivery vehicle and a target vehicle is described. The method includes receiving a first virtual key and one of 1) a request for package exchange with a vehicle service, 2) data, or 3) both, from the package delivery vehicle. The first virtual key has a first shelf life. The method also includes using the first virtual key for authenticating communications from the package delivery vehicle. The method further includes receiving a security token which has a second shelf life from a user. The security token can be used for verification of the user and target vehicle. After authentication, the one or more commands either 1) based on the request from the package delivery vehicle, and/or 2) initiated by the cloud-based system are sent to an on-board actuation module of the target vehicle in an overlap window of the first shelf life and the second shelf life.

In an embodiment, the cloud-based package exchange with a vehicle service is based on a geo-proximity Vehicle Alert and Access System which is hosted on a cloud-based provider site that contains one or more servers and one or more databases. The package exchange with a vehicle service provides a single common end-to-end solution between one or more delivery services and one or more Original equipment manufacturer (OEM) telematics systems without additional hardware needing to be installed in the vehicle by using one or more application programming interfaces and using downloadable applications resident in client devices.

In an embodiment, the cloud-based package exchange with a vehicle service hosted on a cloud-based provider site contains two or more servers and two or more databases. The package exchange with a vehicle service uses two or more paired-virtual keys, such as a dual-key protection mechanism, via secure key matching authentication in order to render hacking any single system's server useless. Additionally, the virtual keys are given a shelf life to limit authorized package delivery and subsequent activation of the vehicle's telematics system to be within a specified time window (e.g., a predetermined time frame).

In an embodiment, the cloud-based package exchange with a vehicle service hosted on a cloud-based provider site contains two or more servers and one or more databases. The package exchange with a vehicle service uses a Global Positioning System (GPS)-based proximity system to control and track the package exchange process, to speed up the package delivery and pick-up process, and to ensure security for the package exchange. The package exchange with a vehicle service also uses a mobile delivery notice to verify the origination of the package delivery order as well as to communicate a successful delivery or pick-up of a package.

In an embodiment, a method for an alternative package pickup and delivery system includes a number of example steps. The consumer while shopping at a retail store, at checkout, can be offered to purchase one or more selected products on a retail website. The consumer is offered on the user interface at checkout an alternative package delivery option to have the purchased products delivered to a vehicle using a cloud-based package exchange with a vehicle service. The consumer selects the delivery method offered on the user interface labeled as "Box2Go Delivery," to have the package delivered to the consumer's vehicle. The package exchange with a vehicle service processes the alternative package pickup and delivery option. The purchased products are delivered to the consumer's vehicle's location. The package exchange with a vehicle service opens the consumer's vehicle and ensures the purchased products have been delivered. The package exchange with a vehicle service ensures the consumer's vehicle is closed and locked when the purchased products have been delivered.

In an embodiment, a multiple phase security system may be used by a cloud-based package-exchange-service. The multiple phase security system can include one or more servers, the servers can have one for more processors and one or more ports and can be configured to cooperate with one or more databases in the system for cloud based system package-exchange-service. A security module running on the one or more processors can be configured to coordinate the multiple phase security system to enable the package exchange with a target vehicle by enabling access to the target vehicle for the package exchange by remotely opening up the target vehicle. The security module is configured to receive notification of a package exchange request for a first user either i) from a server of a package delivery service or ii) from a server of a merchant. The security module is configured to look up in a first database in the cloud-based package-exchange-service for one or more contact information listings for the first user and to create one or more notifications. The notifications can include any of e-mail notifications, SMS text notifications, and mobile app notifications, to one or more client devices associated with the first user. The one or more notifications request the first user to take action to verify that a package exchange with their one or more target vehicles has indeed been requested by that first user. When there is more than one target vehicles, the security module is configured to, via a first port, to receive confirmation of which of the one or more target vehicles associated with the first user will be the target vehicle used for the package exchange with the package delivery service. The received information can be from any of the following i) the client device of the user, ii) the server of the merchant, and iii) the server of the package delivery service. The security module can be configured to create at least one or more unique digital encrypted keys with an associated valid duration time period that are specific to the target vehicle in order for the package exchange service to utilize. The security module can also be configured to then send the one or more unique digital encrypted keys to a server of the package delivery service as well as store each unique key sequence of the one or more unique digital encrypted keys or their equivalents in the first database of the package exchange service's cloud in order to later verify an authenticity of the digital encrypted key for the package delivery service. The security module can be configured to receive a first digital encrypted key and a request to any of i) locate the target vehicle, ii) open the target vehicle, iii) cause an alert of the target vehicle including one or a combination of honking a horn and flashing lights, iv) lock the target vehicle, and v) any combination of these four, from a client device associated with the package delivery service when the package delivery services wants to locate, open, cause an alert, or lock the target vehicle. The security module can then be configured to check the unique key sequence against the stored information in the first database of the cloud based package-exchange-service in order to authenticate the digital encrypted key. The security module can be configured to perform a time check against an effective duration of a first unique virtual digital key received from the client device of the package delivery service. If the time check against the effective duration of the virtual digital key indicates that the time period for use is still valid, then generating a request to issue a command for either i) an onboard telematics module in the target vehicle, ii) a dongle module installed in the target vehicle, or iii) a RF module associated with a keyless remote entry function located in the target vehicle, to perform an electro-mechanical operation in the target vehicle and open up the target vehicle so that the package exchange with the target vehicle can occur.

In an embodiment, the 2-phase security system used by the cloud for the package exchange with a vehicle is configured to allow access to a vehicle for a package exchange (delivery or pick up) that includes i) creating a unique encrypted key with a valid duration time period for the package exchange service and then storing the unique key sequence or its equivalent in package exchange service's cloud database to later verify the authenticity of the encrypted key for the package delivery service, ii) receiving the encrypted key from the package delivery service when the package delivery services wants to open the vehicle and checking the unique key sequence against the stored information in package exchange service's cloud database; iii) authentication of the access token or a 2nd key received from the OEM telematics provider, iv) doing a time check against the effective duration of the virtual key from the unique virtual key from the package delivery service, and v) if the time check against the effective duration of the virtual key is still valid AND the access token or 2nd virtual key from the OEM telematics provider is still valid, then generating the request to the OEM telematics cloud to issue a command request accompanied with the access token or 2nd virtual key to an onboard telematics module in a vehicle to open up the target vehicle.

BRIEF DESCRIPTION OF THE DRAWINGS

The multiple drawings refer to the example embodiments of the design.

Figure 1:
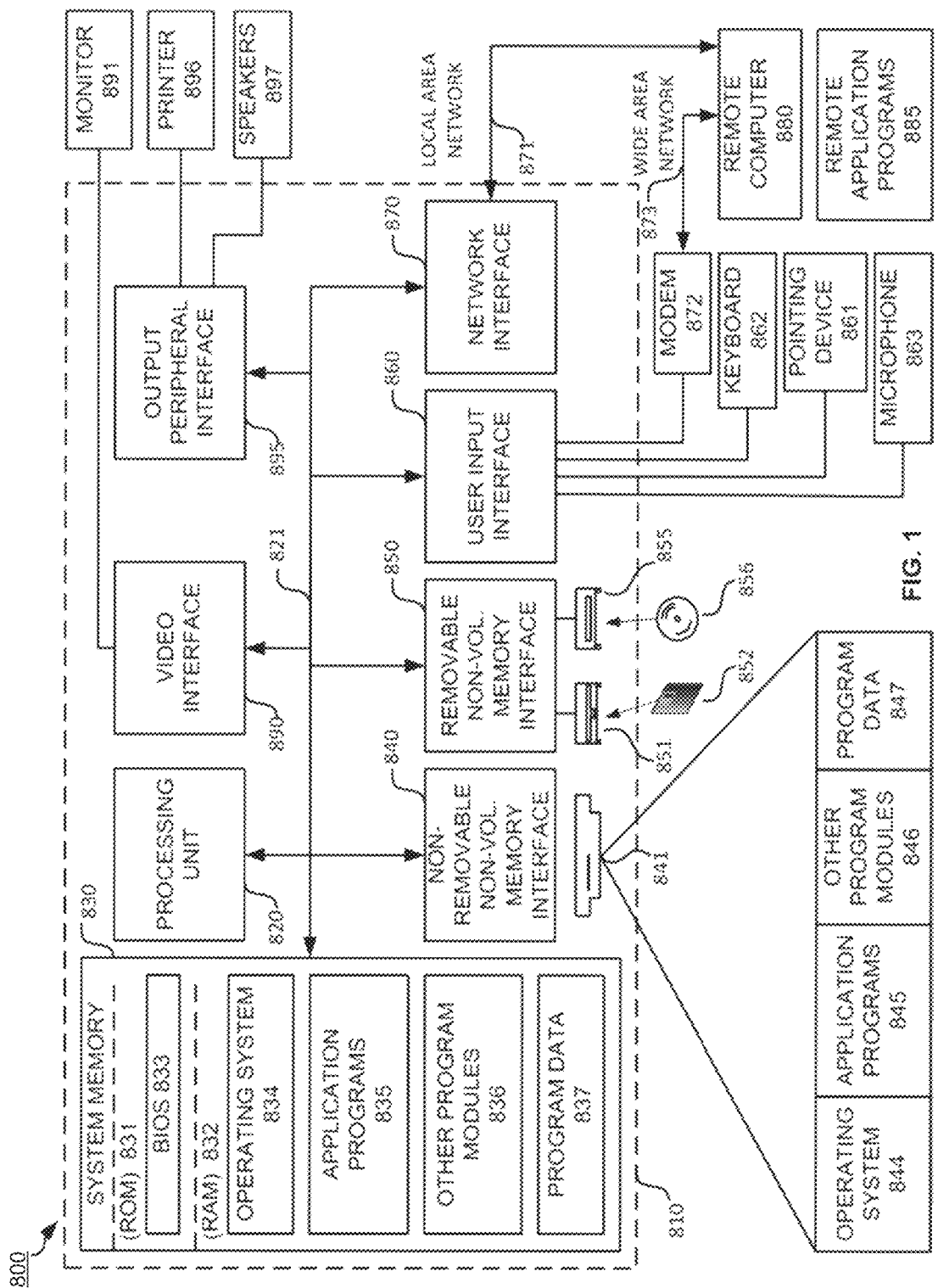
FIG. 1 illustrates a block diagram of an example computing system that may be used in an embodiment of one or more of the servers, in-vehicle electronic modules, and client devices discussed herein.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific package delivery services, named components, connections, number of databases, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details discussed in one embodiment may be reasonably implemented in another embodiment. The specific details may be varied from and still be contemplated to be within the spirit and scope of the present design.

Figure 11:
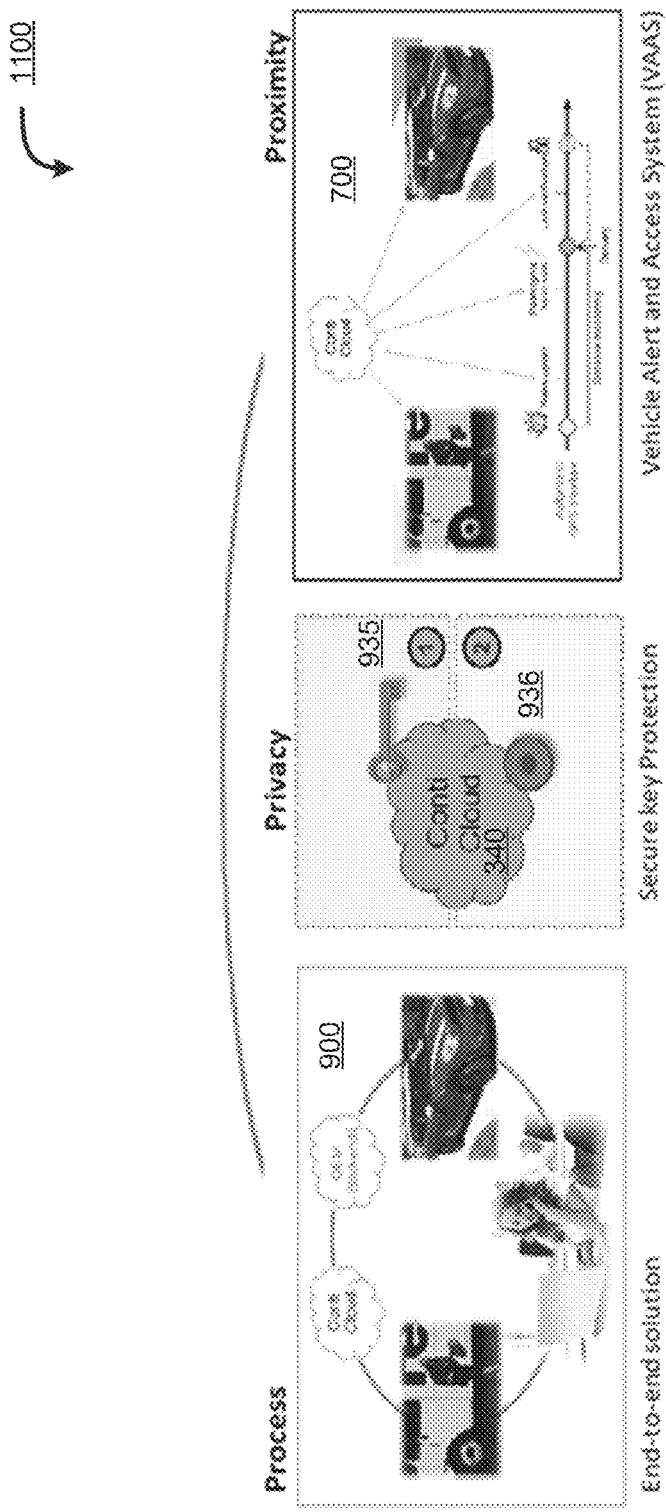
FIG. 11 illustrates a block diagram overview of an embodiment of the package exchange with a vehicle service hosted on a cloud-based and some of its features including i) process connectivity to multiple platforms, ii) built in privacy and security, and iii) a vehicle awake and alert system via proximity.

In general, the package delivery to and pick-up from a vehicle service facilitates package delivery or pick up from a vehicle at home or work. The package exchange with a vehicle service can be hosted on a cloud-based provider site. The package delivery to and pick-up from a vehicle service hosted on a cloud-based provider site may use an onboard actuation module for commanding the vehicle such as locking and unlocking the vehicle. The package delivery to and pick-up from a vehicle service may use an already existing access module installed in the vehicle such as the onboard RF access module, a telematics module, or may install a dongle as the access module. If the telematics system is used, the package delivery to and pick-up from a vehicle service may provide a single common end-to-end solution between two or more package delivery services and two or more Original equipment manufacturer (OEM) 'remote access/connectivity' systems, such as telematics systems, without additional hardware needing to be installed in the vehicle by using one or more application programming interfaces on the package exchange with a vehicle service in the cloud and using downloadable applications resident in client devices. Alternatively, the package exchange with a vehicle service can use a dongle module having a Wi-Fi or cellular communication circuit configured to establish a secure communication between the vehicle and the cloud based server associated with the package exchange with a vehicle service. The package exchange with a vehicle service receives two or more virtual keys, such as a dual-key protection mechanism, and uses the dual-key protection mechanism via secure key matching authentication in order to render hacking any single system's server useless. Additionally, the virtual keys are given a shelf life to limit authorized package delivery and subsequent activation of the vehicle's telematics system to within a specified time window. First, the package exchange with a vehicle service uses a virtual key, such as a public key, for authenticating communications received from the package delivery vehicle which can be matched with the corresponding private key for authentication. The virtual key can be made unique in space (assigned only to a vicinity of the location of package transfer) and time (valid only for a limited window of time around the date/time of transfer) and can be recycled or even never used again when expired. Second, the package exchange with a vehicle service can also receive a security token from the user of the target vehicle. The security token can be encrypted and can be provided to the user: 1) by the telematics provider to a client device of the user and can be used by the telematics provider for user and target vehicle verification, 2) by the on-board dongle module through the client device of the user, or 3) by the onboard RF access module through the client device of the user. The package exchange with a vehicle service provider can only receive an encrypted security token and thus does not receive and may not store the user credentials for the OEM telematics systems in its databases. The encrypted security token is provided by the package exchange with a vehicle service provider on behalf of the user to the telematics provider or the package delivery systems to provide authentication. In general, only encrypted data is transmitted from the cloud-based package exchange with a vehicle service and i) the applications resident in client devices, ii) the package delivery systems, and iii) the OEM telematics systems. The package exchange with a vehicle service uses a GPS-based proximity module to control and track the package exchange process in order to speed up the package delivery and pick-up process, and to ensure security for the package exchange. The package exchange with a vehicle service also uses a mobile delivery notice to verify the origination of the package delivery order as well as to communicate a successful delivery or pick up of a package. The package exchange with a vehicle service picks up or delivers a package to wherever vehicle is parked, including the service can deliver package to or pick-up package from a rental car while on business trip. (See FIG. 11 for a block diagram overview of an embodiment 1100 of the package exchange with a vehicle service hosted on a cloud-based and some of its features including i) process connectivity to multiple platforms, ii) built in privacy and security, and iii) a vehicle awake and alert system via proximity).

Figure 2A:
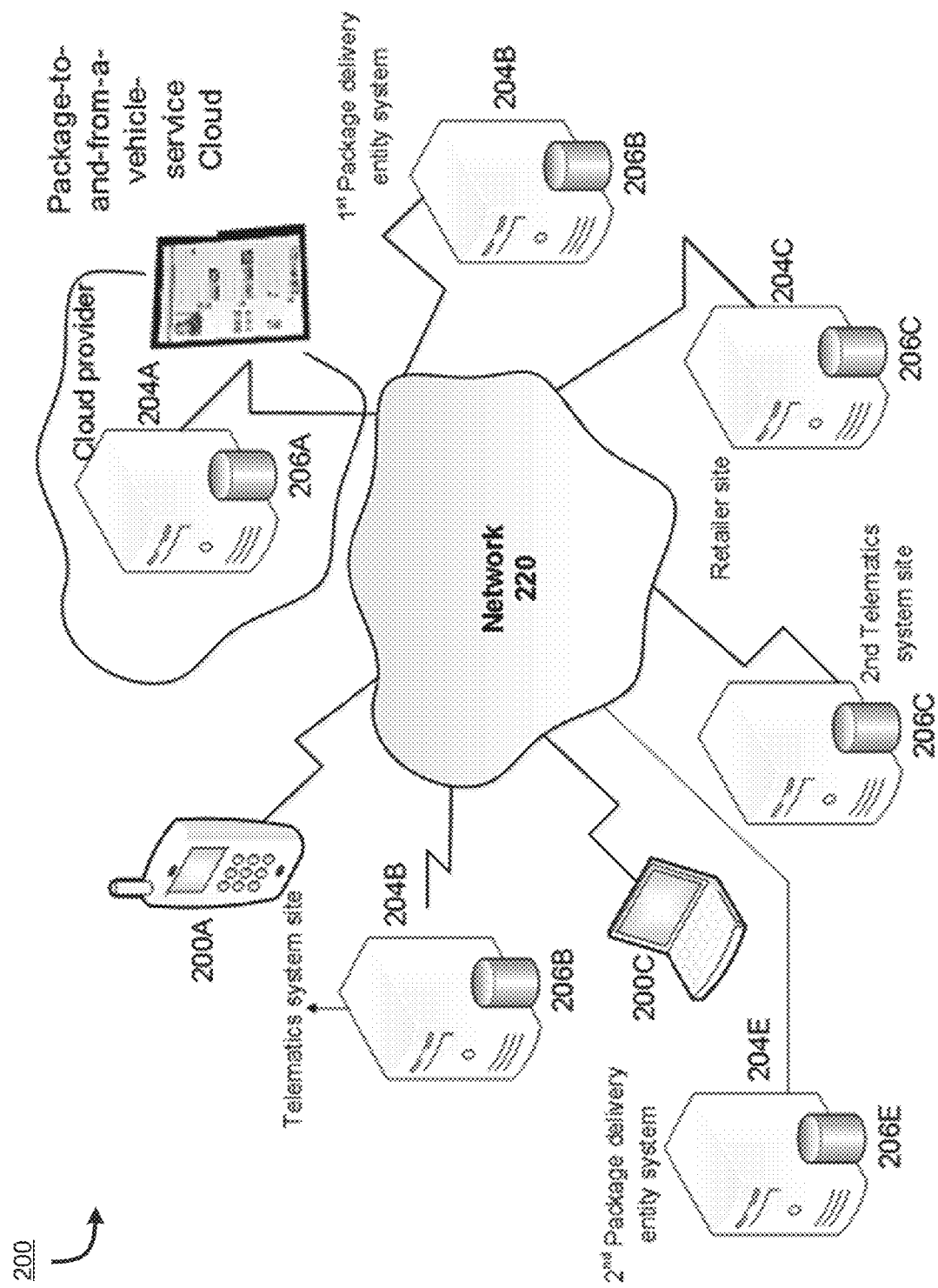
FIGS. 2A-2B illustrate block diagrams of embodiments of the package exchange with a vehicle service hosted on a cloud-based provider site.
Figure 2B:
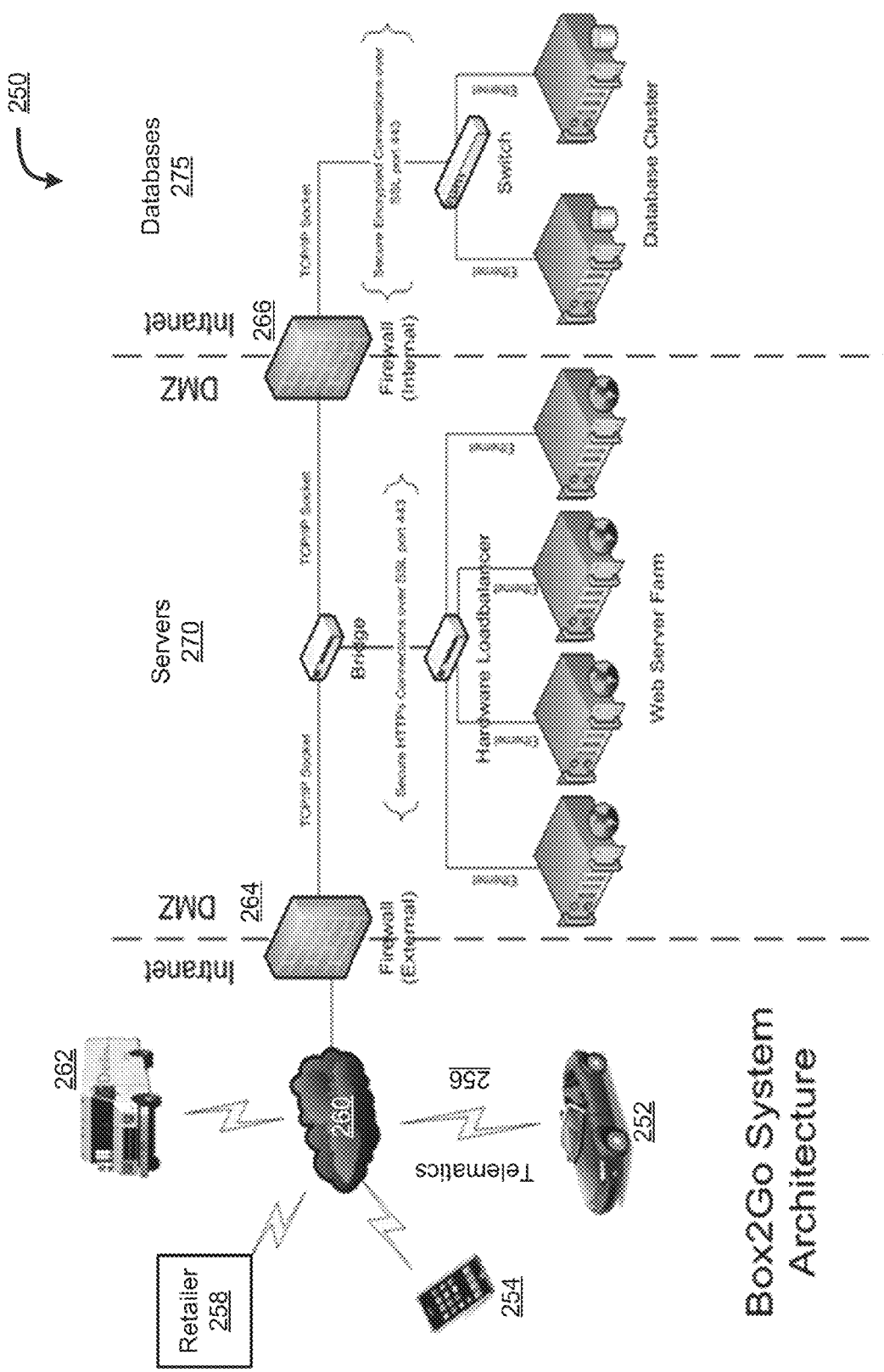

Example processes for and apparatuses to provide an automated process workflow for the entire cloud-based package exchange with a vehicle service are described. The following drawings and text describe various example implementations of the design. FIG. 1 and FIGS. 2A-2B illustrate example environments to implement the concepts.

The cloud based system for a package exchange with a vehicle service can be implemented in software, hardware electronics, and any combination of both and when one or more portions of the system are implemented in software, then that software is tangibly stored in an executable format on the one or more non-transitory storage mediums to be executed by a processing component.

High Level Description of Each Transaction in Case of Dongle Solution

Figure 4:
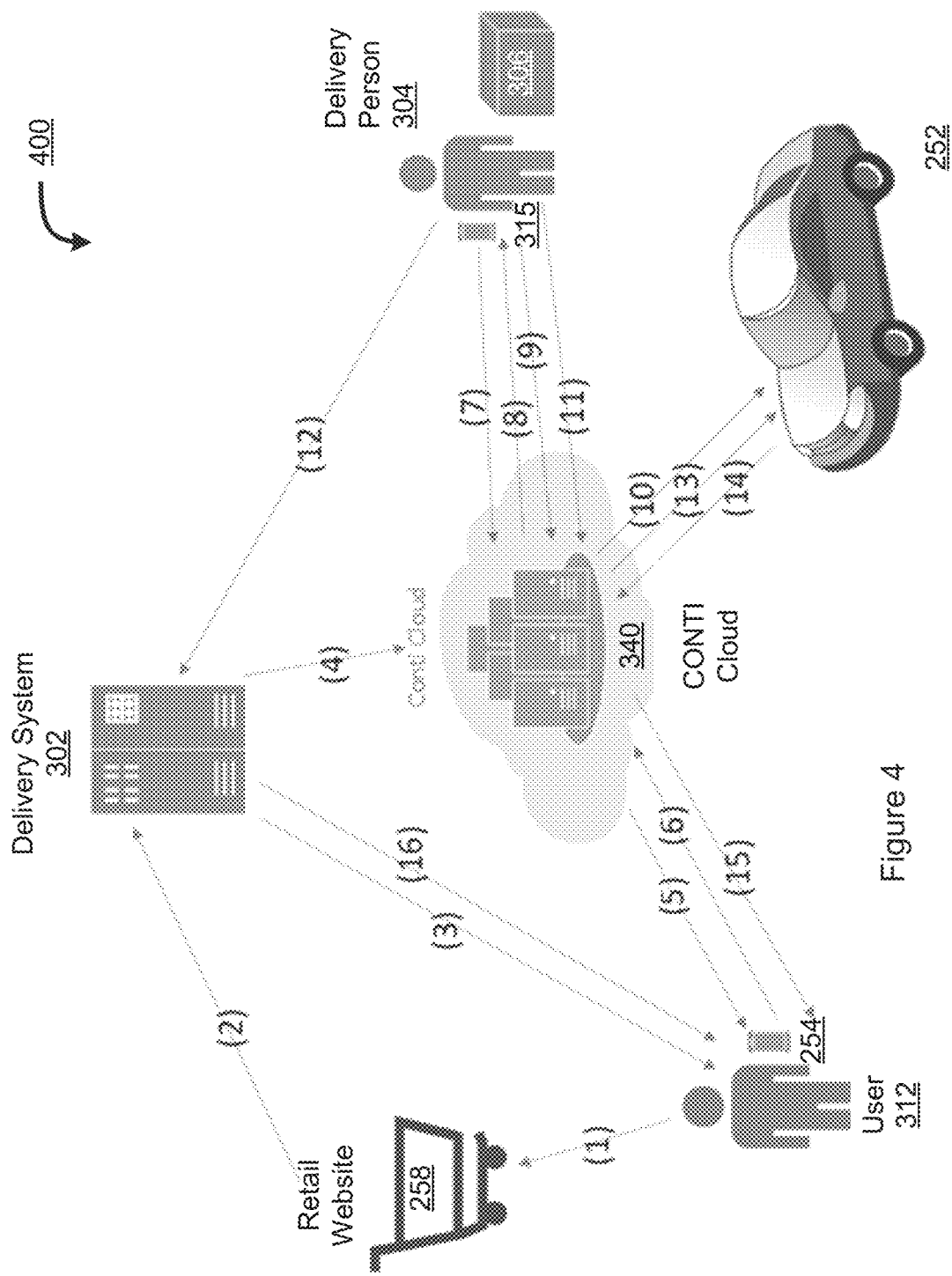
FIG. 4 illustrates a flow diagram of an embodiment of the alternative package pickup and delivery system using an example Dongle topology.

FIG. 4 illustrates a flow diagram 400 of an embodiment of the alternative package pickup and delivery system using an example dongle solution including sequence of steps.

In an embodiment, a dongle including a software application is configured to provide a new intelligence in a vehicle's navigation. The dongle application leads the way to an intelligent and expanded use of navigation data to control other vehicle systems. Additional hardware may be installed in the target vehicle to assist in the delivery operation. The dongle may be a small piece of hardware that attaches to the vehicle in order to enable additional functions.

Figure 5:
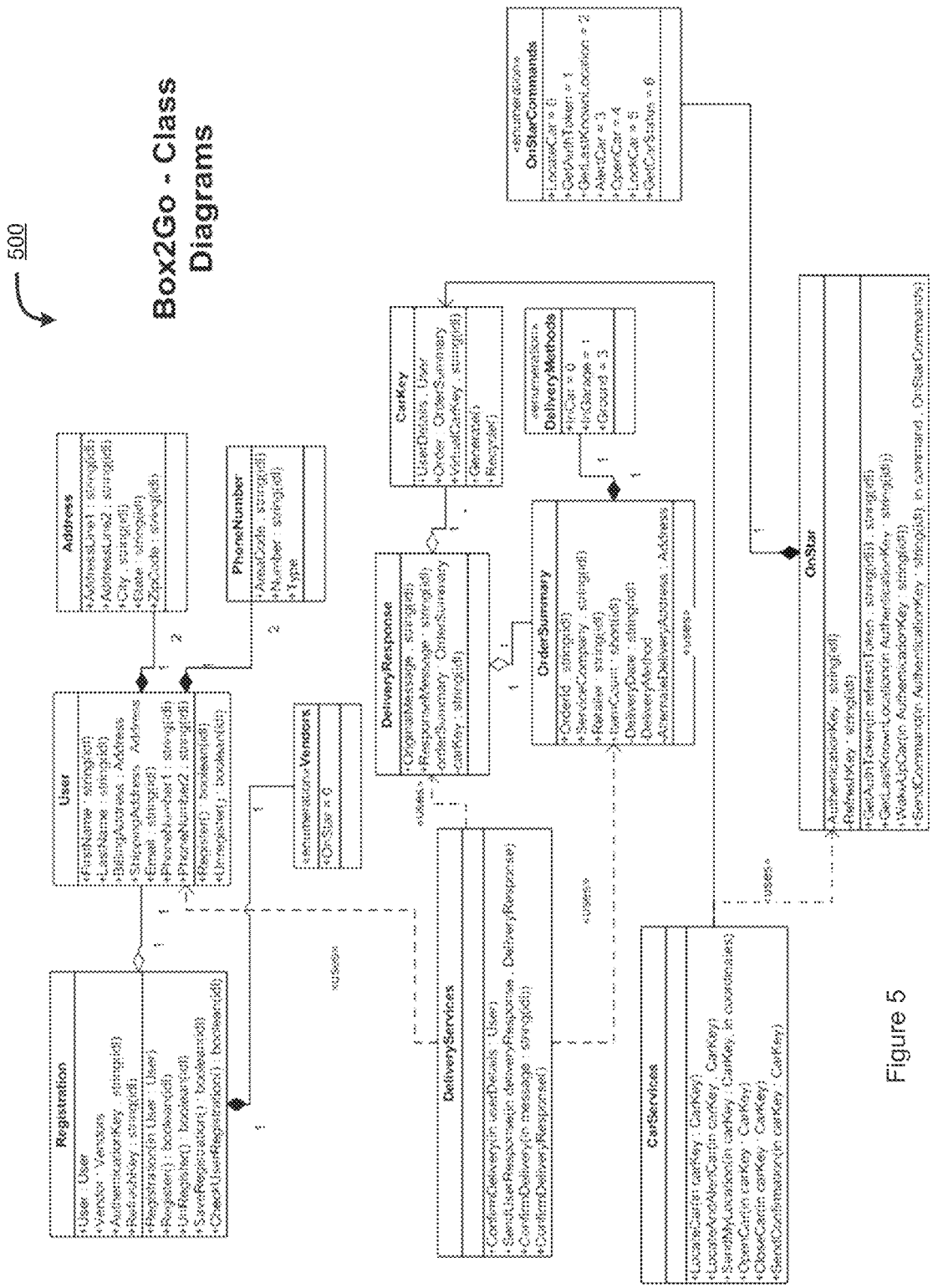
FIG. 5 illustrates an example class diagram of an embodiment of an application programming interface for the alternative package pickup and delivery system.

An alternative package pickup and delivery system is discussed. The system includes a cloud-based package exchange with a vehicle service that is hosted on a cloud-based provider site, one or more package delivery entity systems, such as FedEx™, having both a package delivery website as well as one or more package delivery vehicles with client devices having a delivery application resident in each client device. The cloud based system for a package exchange with a vehicle service is configured to have Wi-Fi or cellular communications to the dongle module in order to exchange information including GPS coordinates of the vehicle and to cause electromechanical actions within that vehicle including: unlocking doors, opening windows, opening trunks, closing trunks, turning engine on, turning engine off, opening and closing a sunroof or moon roof. The cloud based system for a package exchange with a vehicle service is hosted on a cloud-based provider site that contains one or more servers and one or more databases. The cloud based system for a package exchange with a vehicle service is coded to utilize a protocol, including HTTP, to engage in a request and response cycle with either i) a mobile device application resident on a client device of the user, ii) a web-browser application resident on the client device of the user/customer, or iii) both. The cloud based system for a package exchange with a vehicle service has one or more routines to automate the package delivery. The cloud based system for a package exchange with a vehicle service has one or more open application programming interfaces to standardly exchange information between the two or more package delivery entity systems. (See FIG. 5 for an example class diagram of an embodiment of an application programming interface for the alternative package delivery method.) A hardware module, such as a dongle module, in the vehicle then causes electromechanical actions within that given vehicle in order to allow the cloud based system for a package exchange with a vehicle service to access a plurality of different kinds of vehicles, manufactured from a number of different manufactures. An example dongle module may cooperate with or be part of a navigation system in the vehicle. The cloud based system for a package exchange with a vehicle service has a security module scripted to establish a communication link with a communication terminal of the package delivery entity systems sites via a communication network. The cloud based system for a package exchange with a vehicle service has an additional security module scripted to exchange information with a delivery application on a client device in order to send or receive information from a package delivery person. The cloud based system for a package exchange with a vehicle service has an additional security module for communicating to a user of the target vehicle having a package delivered to that vehicle, which is scripted to exchange information with a mobile application or desktop application on a client device of the user/customer. The vehicles include but are not limited to automobiles, trucks, vans, motorcycles, and other similar transportation mechanisms.

(0) Steps 1-7 are the same as the previous solution.

(1) The User 312 uses either a mobile application 254 on their client device (e.g., a mobile phone) or accesses a retailer's website via a browser on a desktop application 350 on their client device. The retailer's website collects order information including the products selected. The client device submits order and shipping information via the mobile application to the retailer's website, and in the case of delivering to a vehicle, the order includes the vehicle VIN. The user interface of the retailer's website offers the alternative delivery destination of the consumer's/user's vehicle 252 as a delivery destination. Note, the retailer's website user interface may show the alternative delivery destination of the consumer's/user's vehicle and an additional monetary charge may be associated with this alternative delivery destination. The additional monetary charge may be charged on a per delivery instance basis or based on a subscription basis.

(2) The retailer's website 258 sends shipping information to the package-delivery-entity-system 302, such as FedEx. The shipping data can include the customer/user data.

(3) The package-delivery-entity-system 302 sends confirmation including Tracking Number to the User/customer 312 on their client device application 254 or 350. FIG. 4 shows the mobile application 254 on a mobile device of the user 312.

(4) The package-delivery-entity-system 302 sends a notification to the cloud based system for a package exchange with a vehicle service 340, including Tracking Number and VIN via the standardized open application programming interface. The notification including the shipping Tracking Number and VIN are stored in the databases 275 of the cloud based system for a package exchange with a vehicle service 340.

(5) The cloud based system for a package exchange with a vehicle service 340 sends a notification to either the mobile application 254 or the desktop application 350 on their client device and confirms with the User their desire to have a package shipped to their vehicle with the Tracking Number and VIN for the package delivery. The confirmation notice also acts as a security mechanism to ensure that the user did in fact elect to have a package delivered to their vehicle 252.

(6) After the first notification, the User can supply a response into either the mobile application or the desktop application on their client device to send permission to the cloud based system for a package exchange with a vehicle service. In response to the second notification, the user may supply a second confirmation including a virtual key or a security token of the vehicle. The cloud based system for a package exchange with a vehicle service has a multiple phase, such as a two-phase, verification mechanism involving two security keys. The cloud-based infrastructure is scripted to validate authorization for the package delivery to a registered owner's vehicle. The source of initiating the request to open up the car is verified twice as the first virtual key coming along with a request from a package delivery system or a package delivery vehicle associated with the package delivery system is verified. Also, a second car actuation security token such as a second virtual key is coming from the client device associated with the user. The second virtual key can be a rolling security key of a Body Control Module (BCM) of the target vehicle of the customer.

(7) After the package arrives in the same city, the package delivery entity system's delivery person 304 uses the package delivery application 315 in their client device to send the Tracking Number to the package exchange with a vehicle service in order to obtain the vehicle's information including its current location information. FIG. 4 shows a package delivery application 315 on the client device of the delivery person 304.

Upon approaching the target vehicle, an application in the client device of the package delivery person can send a request to the cloud based system for a package exchange with a vehicle service to wake up the dongle module of the target vehicle by either automatically detecting a close proximity by the first threshold distance between the package delivery vehicle and the target vehicle or can be prompted by the package delivery person to send the request. Alternatively, the distance between the package delivery vehicle and the target vehicle can independently be monitored by the cloud based system for a package exchange with a vehicle service and the request can be sent without package delivery person's involvement. The dongle module may be in a sleep-mode as this prevents battery drain when vehicle is not in use and thus the dongle module needs to be sent a wake up notice. The cloud based system for a package exchange with a vehicle service via the one or more application programming interfaces sends one or more wake up requests to the dongle module to wake up the vehicle. Alternatively, a GPS based proximity module in the cloud based system for a package exchange with a vehicle service can calculate the distance between the delivery vehicle and the target vehicle and send the wake up message. In an embodiment, the wake up message can be initiated either manually by the package delivery person, or automatically by a GPS based proximity module in the cloud based system for a package exchange with a vehicle service. In an example, the dongle module may not drain battery power or may drain very little battery power thus may not go to sleep. In such case, the waking up step can be omitted (8) After step (6), the cloud based system for a package exchange with a vehicle service has tracked the vehicle's location and sends it out upon a request from the package delivery person.

Additionally, the distance between the GPS coordinates of the package delivery vehicle having a delivery application resident in a client device in the delivery vehicle and the target vehicle's GPS coordinates as periodically received from the dongle module is monitored and compared by a GPS based proximity module in the cloud based system for a package exchange with a vehicle service.

(9) After the package delivery entity system's delivery person approaches the vehicle, a request is sent to the cloud based system for a package exchange with a vehicle service to blink the hazard lights and open the trunk.

A GPS-based proximity module or a security module in the cloud based system for a package exchange with a vehicle service will also send a request via the one or more application programming interfaces to the dongle module to cause a localized alert in the target vehicle so that the vehicle can blink the vehicle's lights and honk its horn to alert the package delivery person directly to the target vehicle's location (see, for example, FIG. 7A), in order to save time and aid in locating the target vehicle within rows of parked cars. Alternatively, the request can be initiated by the client device of the package delivery vehicle or the client device of the package delivery person. This ensures the designated target vehicle is identified properly and increases efficiency of delivering the package.

(10) The cloud based system for a package exchange with a vehicle service verifies the request and blinks the hazard lights and/or unlocks the target vehicle including the trunk.

As discussed, before sending the functional commands including lock/unlock doors and give an alert to the target vehicle of the customer, the GPS-based proximity module or a security module in the cloud based system for a package exchange with a vehicle service receives at least two virtual verification keys, a first virtual verification key from the client device associated with the package delivery vehicle and a second virtual verification key from the client device associated with the customer. The first virtual verification key can be given a first shelf life and the second virtual verification key can be given a second shelf life such that sending of the functional commands stay within an overlap window of time between the first shelf life and the second shelf life.

Optionally, the GPS based proximity module waits for a confirmation from the delivery application that the package delivery person has located the target vehicle. Then the GPS based proximity module composes a correct request command and sends the request via the one or more application programming interfaces to the dongle module in the vehicle to open the trunk of the vehicle or some other electromechanical actuation of a window or sunroof of the vehicle.

(11) After placing the package in the target vehicle, e.g., a trunk of the target vehicle, and closing the doors including the trunk, the package delivery entity system's delivery person sends a delivery completion confirmation to the cloud based system for a package exchange with a vehicle service. Alternatively, the package delivery person instead of placing a package may retrieve a package from the target vehicle.

(12) The package delivery entity system's delivery person optionally sends a confirmation to the package delivery entity system 302.

(13) After (11), the cloud based system for a package exchange with a vehicle service polls the status of the vehicle. In fact, after receiving a confirmation of the completion of package transfer from the package delivery application in the package delivery person's client device, the GPS-based proximity module in the cloud based system for a package exchange with a vehicle service can receive GPS coordinates from the package delivery application in the package delivery person's client device and resume monitoring the package delivery vehicle. The GPS based proximity module performs distance monitoring to recognize when the package delivery person is departing and then is scripted to verify that the target vehicle is locked and to avoid the package delivery person leaving an unlocked vehicle. The cloud based system for a package exchange with a vehicle service polls the lock status of the target vehicle by sending a request to the dongle module.

(14) Dongle responds with the lock door status (open/closed). If door lock status is not confirmed locked, the GPS-based proximity module in the cloud based system for a package exchange with a vehicle service sends a request via the one or more application programming interfaces to the dongle module in the vehicle to close and lock the vehicle's doors/trunk. This feature improves security to insure the vehicle is locked after departure and is not left unlocked.

Note, the onboard dongle module in the target vehicle of the customer can be configured to communicate with the GPS-based proximity module and/or the security module of the cloud based system for a package exchange with a vehicle service through the Wi-Fi or cellular communications to receive the functional (electro-mechanical) commands including lock/unlock doors, give an alert, and turn engine on/off. The dongle module can have a key fob simulator such that it can include an RF circuitry of a key fob and can be configured to perform the functional (electro-mechanical) commands by transmitting RF signals that include the functional commands to a Body Control Module (BCM) of the target vehicle of the customer.

The GPS proximity module is scripted to perform multiple actions via the dongle module including i) waking up a vehicle, ii) facilitating for the electro mechanical operations in the vehicle to occur, such as unlocking/locking doors, opening/closing windows, opening and unlocking/closing and locking a trunk, opening/closing sunroof, and iii) detecting when the package delivery vehicle is at a certain distance away from the target vehicle, then the vehicle should become secure at that point.

(15) The cloud based system for a package exchange with a vehicle service sends a delivery confirmation notice to the User.

(16) The package delivery entity system 302 sends delivery confirmation email to the User.

In an example, the dongle module can have a key fob simulator such that it has a circuitry including the RF circuitry of a key fob and additionally is capable of executing an algorithm to generate rolling security keys of the Body Control Module. The dongle module can be taught as an extra key fob. The teaching of the dongle module as an extra key fob can be automated and performed by receiving commands via Wi-Fi or cellular communications from the security module or the GPS-based proximity module of the cloud based system for a package exchange with a vehicle service. After being taught, the current rolling security key can be stored in the dongle module. Upon receiving the functional (electro-mechanical) commands the dongle module can generate the next rolling security key based on the current rolling security key to be transmitted along with the functional commands to the Body Control Module.

Alternatively, in an example (e.g., for security reasons), the current rolling security key may not be stored in the dongle module and can be transmitted to the cloud based system for a package exchange with a vehicle service and/or transmitted to a client device of the user and can be stored in the client device of the user and/or stored in a database associated with the cloud based system for a package exchange with a vehicle service such that the security module or the GPS-based proximity module of the cloud based system for a package exchange with a vehicle service sends the functional command and the stored rolling security key to the dongle module. Upon receiving the functional commands and the rolling security key, the dongle module generates the next rolling security key based on the current rolling security key to be transmitted along with the functional commands to the Body Control Module. In an example, the next rolling security key can be generated by the security module of the cloud based system for a package exchange with a vehicle service such that the security module or the GPS-based proximity module of the cloud based system for a package exchange with a vehicle service sends the functional command and the next rolling security key to the dongle module to be transmitted along with the functional commands to the Body Control Module.

In an example, the dongle module can transmit (e.g., using Bluetooth) the current rolling security key of the Body Control Module to a client device of the user, which the user can transmit the current security key as the security token to the security module of the cloud based system for a package exchange with a vehicle service to be used for verification of the user and target vehicle.

In an embodiment, the actuation module of the target vehicle is a dongle module. In an example, when a rolling security key of the Body Control Module is generated, the (current) rolling security key is transmitted to the cloud based system to be stored in a Box2Go account corresponding to the user and the target vehicle. The generated current rolling security key is also transmitted to the client device of the user. When a user requests a delivery to the target vehicle, then the current rolling security key is sent by the client device of the user to the cloud based system, the rolling security key is matched with the rolling security keys in Box2Go accounts of the cloud based system for user and target vehicle verification. The commands sent by the cloud based system also includes the current rolling security key, which can be matched with by the dongle module with its rolling security key for authentication of the commands. The current rolling security key of the Body Control Module can be assigned a shelf life by the cloud based system.

In an embodiment, the actuation module of the target vehicle is a telematics module. The GPS-based proximity module of the cloud based system 340 obtains at least two virtual verification keys, one from an OEM telematics provider 310 and another from a package delivery service provider 302 before sending a command to the target vehicle 252. The virtual verification keys are given a shelf life such that sending of the command to unlock the door including the trunk of the target vehicle, the target vehicle stays within a predetermined time frame.

High Level Description of Each Transaction in Case of Telematics Solution

Figure 3A:
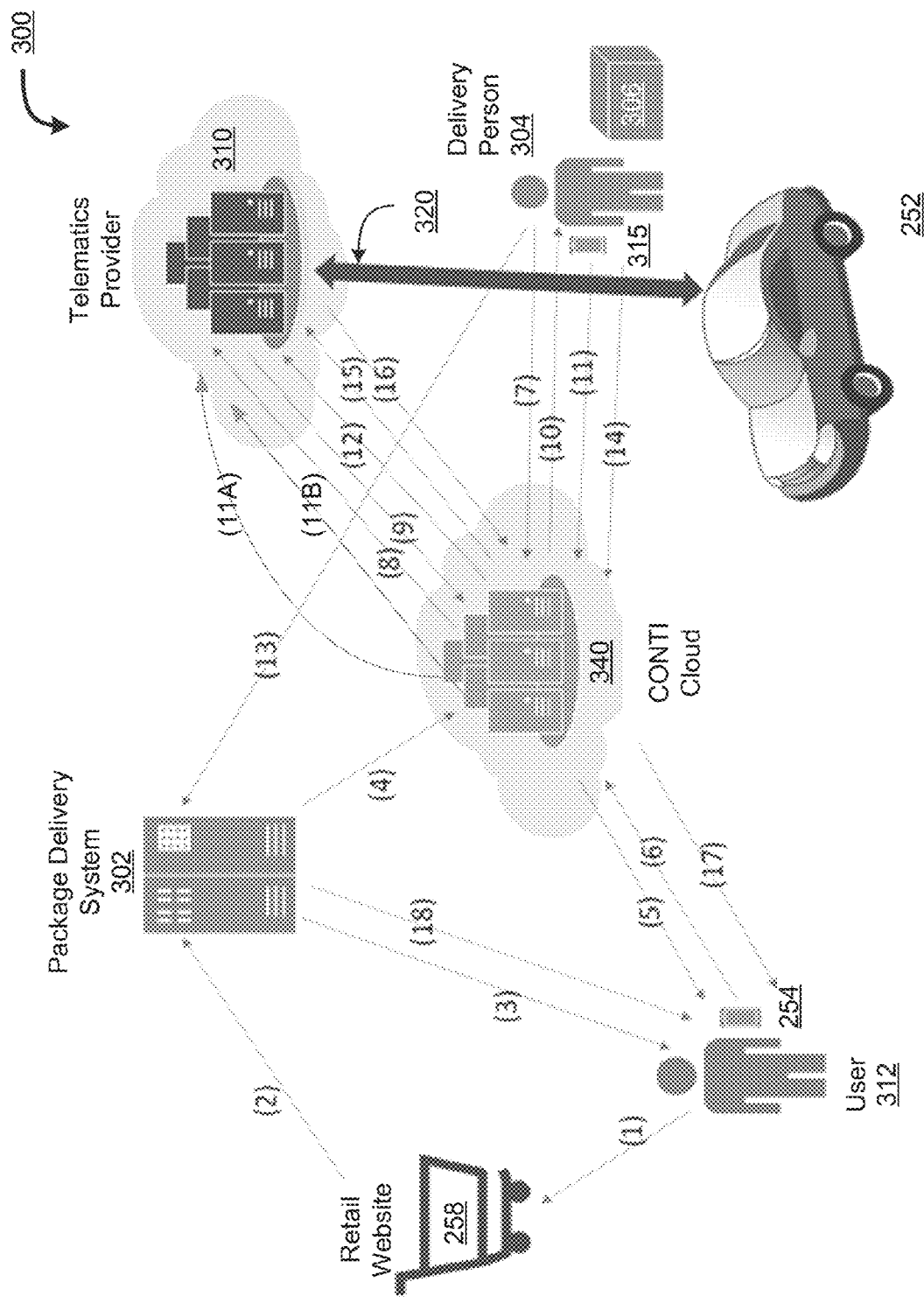
FIGS. 3A-3C illustrate block and flow diagrams of an embodiment of the alternative delivery system using a telematics solution.
Figure 3B:
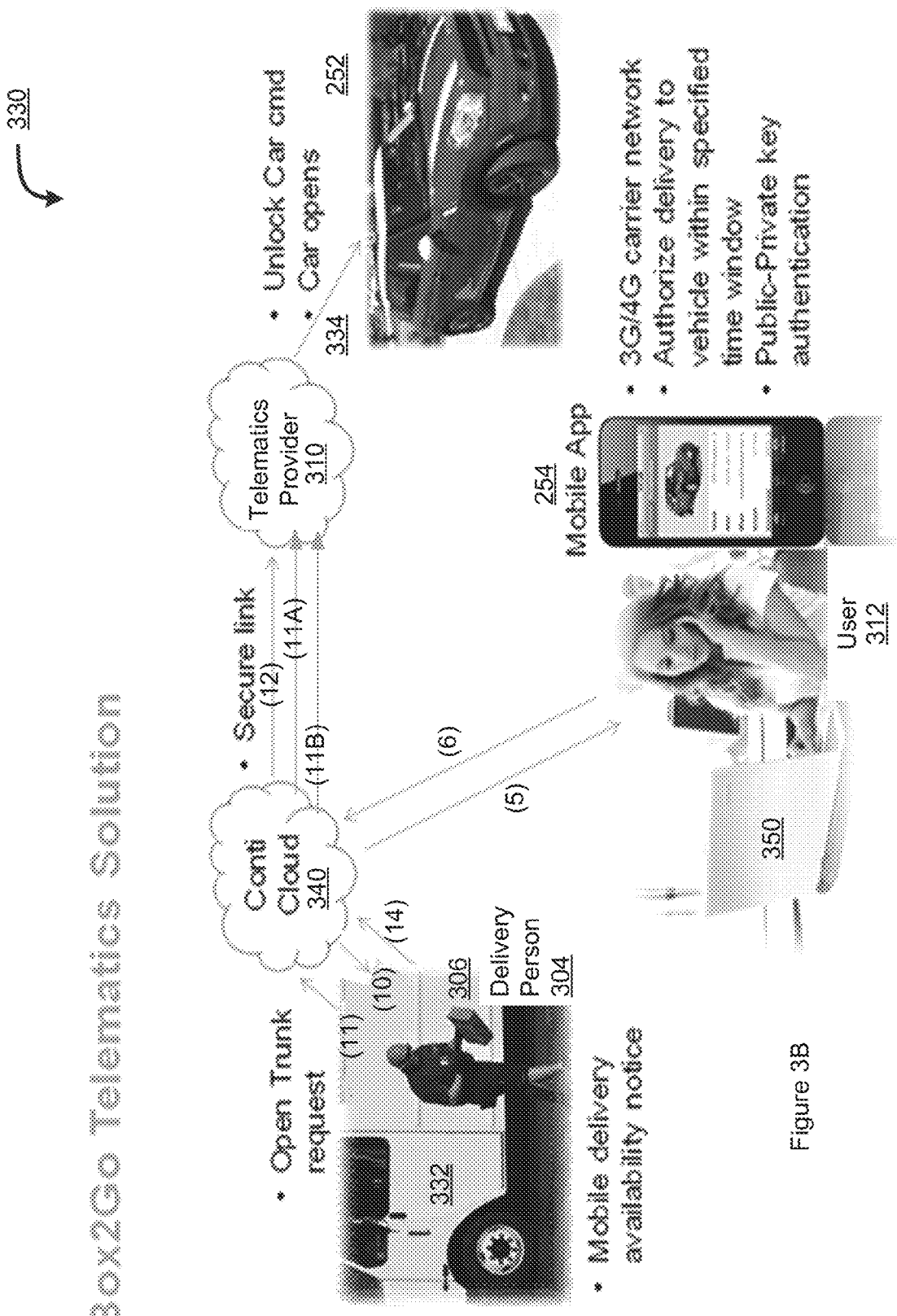
Figure 3C:
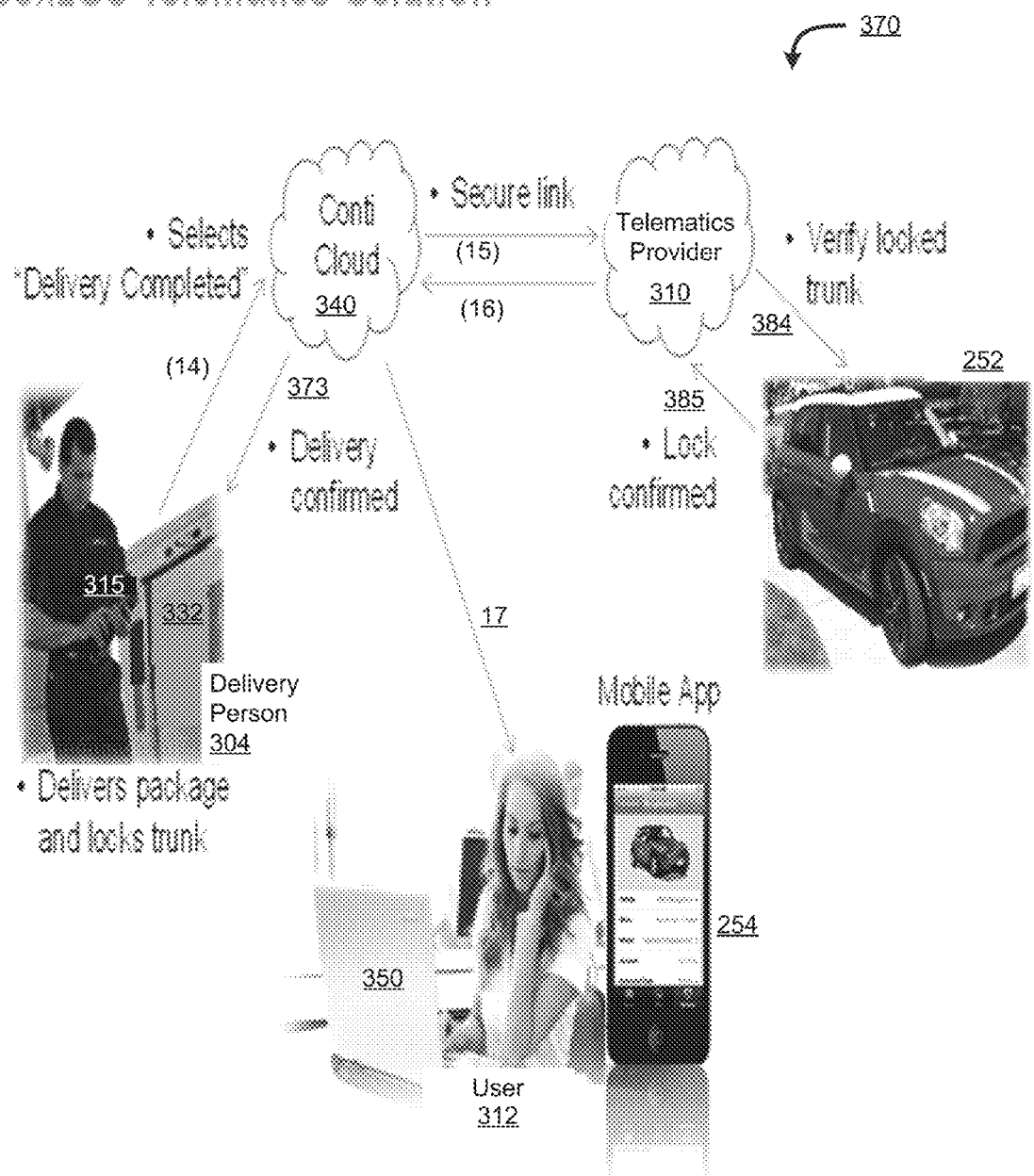

FIGS. 3A-3C illustrate block and flow diagrams of embodiments of the alternative delivery system using a telematics solution. FIGS. 3A-3C show a retail website 258, a package delivery system (e.g., FedEx™) 302, a geo-proximity Vehicle Alert and Access System (cloud based system for a package exchange with a vehicle service) 340, and a Telematics provider 310. However, similar principles can be applied in any of the solutions discussed herein such as merely using merchant sites and package delivery services without integrating the telematics solution into the design.

The alternative package pickup and delivery system is discussed. The system includes a cloud-based package exchange with a vehicle service that is hosted on a cloud-based provider site, one or more package delivery entity systems, such as FedEx™, having both a service website as well as one or more delivery vehicles with client devices having a first delivery application resident in each client device, and one or more OEM 'remote access/connectivity' systems 310, such as OnStar™, that are configured to have communications between the cloud and a vehicle in order to exchange information including GPS coordinates of the vehicle and interact with the vehicle's on-board intelligence system, such as an on-board telematics module, to cause electromechanical actions within that vehicle including: unlocking doors, opening windows, opening trunks, closing trunks, opening and closing a sunroof or moon roof. Thus, the on-board intelligence system may cause the opening & closing of those mechanical portions of the car/vehicle. The cloud-based package exchange with a vehicle service is hosted on a cloud-based provider site that contains one or more servers and one or more databases, including the cloud based server, that cooperate with one or more databased to store the data and reference information needed to control and track the package exchange process, to speed up the package delivery and pick-up process, and to ensure security for the package exchange process. The cloud-based package exchange with a vehicle service is coded to utilize a protocol, including HTTP, to engage in a request and response cycle with either i) a mobile device application resident in a client device, ii) a web-browser application resident in the client device, or iii) both. The cloud-based package exchange with a vehicle service has one or more routines to automate the package to and from vehicle delivery. The cloud-based package exchange with a vehicle service has one or more open application programming interfaces to standardly exchange information between the servers of two or more package delivery sites and/or the servers of two or more OEM 'remote access/connectivity' systems such as an OEM telematics system. (See FIG. 5 for an example class diagram 500 of an embodiment of an application programming interface for the alternative package pickup and delivery system.) The telematics systems are configured to have wireless communications between a server in the cloud and a given vehicle. A hardware module, such as a telematics module, in the vehicle then causes electromechanical actions within that given vehicle in order to allow the cloud-based package exchange with a vehicle service to access a plurality of different kinds of vehicles, manufactured from a number of different manufactures. An example telematics module may cooperate with or be part of a navigation system in the vehicle. The cloud-based package exchange with a vehicle service has a security module scripted to establish a communication link with a communication terminal of either or both of the telematics systems or the package delivery sites via a communication network. The cloud-based package exchange with a vehicle service has an additional security module scripted to exchange information with a delivery application on a client device in order to send or receive information from a delivery person. The cloud-based package exchange with a vehicle service has an additional security module for a user of the target vehicle having a package picked up or delivered to that vehicle, which is scripted to exchange information with a mobile application or desktop application on a client device. The package may be a retail shop item, flowers, perishables, tobacco and alcohol, postal letters, food or other consumable items, and other similar deliverable items. The vehicles include but are not limited to automobiles, trucks, vans, motorcycles, and other similar transportation mechanisms. The OEM 'remote access/connectivity' systems can include manufactures, such as Tesla Motors, who have backend servers that directly communicate with a telematics module in the vehicle. An onboard actuation module in the target vehicle may be one of i) a telematics module installed in the target vehicle or ii) a dongle module having a Wi-Fi or cellular communication circuit configured to establish a secure communication with the cloud based server and an electro-mechanical activation circuit configured to cooperate with a fault and diagnostic module installed in the target vehicle.

FIG. 3A illustrates an example sequence of numbered steps in diagram 300. The numbered steps (1) through (18) are described below.

(1) The User (customer) 312 uses either a mobile application 254 on their client device (e.g., a mobile phone) or accesses a retailer's website via a browser on a desktop application 350 on their client device. The retailer's website 258 collects order information including the products selected. The client device submits order and shipping information via the mobile application to the retailer's website, in the case of delivering to a vehicle, the shipping information includes the vehicle VIN. The user interface of the retailer's website offers the alternative delivery destination of the consumer's/user's vehicle 252 as a delivery destination. Note, the retailer's website user interface may show the alternative delivery destination of the consumer's/user's vehicle and an additional monetary charge may be associated with this alternative delivery destination. The additional monetary charge may be charged on a per delivery instance basis or based on a subscription basis.

(2) The retailer's website 258 sends shipping information to the package-delivery-entity-system 302, such as FedEx. The shipping data can include the customer/user data.

(3) The package-delivery-entity-system 302 sends confirmation including Tracking Number to the User/customer 312 on their client device application 254 or 350. FIGS. 2B, and 3A-3C show the mobile application 254 on a mobile device of the user as well as the desktop application 350 on a desktop/laptop device of the user 312.

(4) The package-delivery-entity-system 302 sends a notification to the cloud based system for a package exchange with a vehicle service 340, including Tracking Number and VIN via the standardized open application programming interface. The notification including the shipping Tracking Number and VIN are stored in the databases 275 of the cloud based system for a package exchange with a vehicle service 340.

(5) The cloud based system for a package exchange with a vehicle service 340 sends a notification to either the mobile application 254 or the desktop application 350 on their client device and confirms with the User their desire to have a package shipped to their vehicle with the Tracking Number and VIN for the package delivery. The confirmation notice also acts as a security mechanism to ensure that the user did in fact elect to have a package delivered to their vehicle 252.

(6) The User supplies a response into either the mobile application 254 or the desktop application 350 on their client device to send permission (User name and Password) for the telematics system (module), such as OnStar, to the cloud based system for a package exchange with a vehicle service 340. The User name and Password for the telematics module of the target vehicle can be sent encrypted such that the cloud based system for a package exchange with a vehicle service 340 may not discover it. The cloud based system for a package exchange with a vehicle service 340 has a multiple step, such as a two-phase, verification mechanism. The cloud-based infrastructure is scripted to validate authorization for the package delivery service to a registered owner's vehicle. The source of initiating the request to open up the car is verified twice as a delivery order key coming from a package delivery entity 302 is verified to match the initial request coming from the package exchange with a vehicle service as well as the car actuation virtual key coming from the telematics system 310, which both are verified to match the initial request coming from the-cloud based system for a package exchange with a vehicle service 340. The-cloud based system for a package exchange with a vehicle service 340 can tentatively propose a data and time frame for the alternative package delivery to the customer (See FIGS. 9A-9D on block diagrams 900, 930, 970, and 990 of embodiments of the multiple paired virtual keys and security authorization notices used by the package exchange with a vehicle service.)

The 2-phase security system to allow access to a vehicle for a package exchange (delivery or pick up) may include the topics of i) creating a unique encrypted first virtual key with a valid duration time period for the package delivery service and then storing the unique first key sequence or its equivalent in package exchange cloud database in order to later verify the authenticity of the encrypted first key for the package delivery service, ii) receiving the encrypted unique first virtual key from the package delivery service when they want to open the vehicle and checking the unique first key sequence against the stored information in package exchange cloud database; iii) authentication of the access token or a 2nd virtual key received from the OEM telematics provider, iv) doing a time check against the effective duration of the unique first virtual key received from the package delivery service, and v) if the time check against the effective duration of the unique first virtual key is still valid AND the access token or 2nd virtual key from the OEM telematics provider is still valid, then issuing a command request accompanied with the access token or 2nd virtual key to the OEM telematics provider to open up the target vehicle.

The details from the package delivery entity system 302 associated with the delivery key have to match the details of the initial request submitted by the package exchange with a vehicle service and are then sent over to the package delivery entity system 302. Likewise, the details associated with the car actuation key from the from telematics entity system 310 have to match the details of the initial request submitted by the cloud based system for a package exchange with a vehicle service 340 and are then sent over to the telematics entity system 310. The package-to-and-from the-vehicle-service cloud system 340 stores these details in a database 275, tracks the expected delivery vehicle and knows the location of the target vehicle 252, and after determining its proximity is close, then the virtual key will allow for the unlocking of the vehicle 252.

(7) After the package arrives at the same city, the package delivery entity system's delivery person 304 uses the package delivery application 315 in their client device to send the Tracking Number to the package exchange with a vehicle service in order to obtain the vehicle's information including its current location information. FIGS. 3A and 3C show a package delivery application 315 on the client device of the delivery person 304.

(8) The package exchange with a vehicle service in the cloud 340 sends a request via the one or more open application programming interfaces to the OEM backend of the telematics entity system 310 for the vehicle's current GPS location information using its VIN. (See FIGS. 7A and 7B on embodiments of the GPS-based control and tracking mechanisms used for delivery to or pick-up from the vehicle.)

(9) The telematics system OEM backend site 310 communicates with the vehicle's navigation system and sends back the vehicle location information from the vehicle's navigation system via the one or more open application programming interfaces to the cloud based system for a package exchange with a vehicle service 340. The cloud based system for a package exchange with a vehicle service 340 stores this information in its database.

(10) The cloud based system for a package exchange with a vehicle service 340 responds to the package delivery application 315 in the client device of the delivery person 304 with the target vehicle's location information. In an embodiment, the GPS coordinates of the target vehicle 252 may not be sent to the package delivery application 315 in the client device of the delivery person 304 and the cloud based system for a package exchange with a vehicle service 340 may solely track the distance between the delivery vehicle (truck) 322 and the target vehicle (car) 252.

(11) Upon approaching vehicle 252, the package delivery application 315 in the client device of the delivery person 304 can send a request to the cloud based system for a package exchange with a vehicle service 340 to wake up the vehicle 252 by either automatically detecting a close proximity by the first threshold distance between the package delivery vehicle 322 and the target vehicle 252 or can be prompted by the delivery person to send the request. Alternatively, the distance between the package delivery vehicle 322 and the target vehicle 252 can independently be monitored by the cloud based system for a package exchange with a vehicle service 340 and the request can be sent without delivery application 315 or delivery person 304 involvement. The vehicle's telematics module 310 may be in a sleep-mode as this prevents battery drain when vehicle is not in use and thus the vehicle's telematics module needs to be sent a wake up notice. The cloud based system for a package exchange with a vehicle service 340 via the one or more application programming interfaces sends one or more wake up requests to the telematics system OEM Backend 310 in order for the telematics system OEM Backend 310 to wake up the vehicle 252. Alternatively, the GPS-based proximity control routine in the GPS-proximity module of the cloud based system for a package exchange with a vehicle service 340 can calculate the distance between the delivery vehicle 322 and the target vehicle 252 and send the wake up message. In an embodiment, the wake up message can be initiated either manually by the delivery person 304, or automatically by the GPS-based proximity control routine in the cloud based system for a package exchange with a vehicle service 340.

Additionally, the distance between the GPS coordinates of the delivery vehicle 322 having the delivery application 315 resident in a client device in the delivery vehicle and the target 252 vehicle's GPS coordinates as periodically fed back by the telematics system OEM Backend 310 is monitored and compared by a GPS-based proximity control routine in the cloud based system for a package exchange with a vehicle service 340.

(11A) The GPS-based proximity control routine in the cloud based system for a package exchange with a vehicle service 340 via the one or more application programming interfaces sends one or more wake up requests to the telematics system OEM Backend 310 to wake up the target vehicle as the package delivery (e.g., FedEx) truck 322 arrives near the target vehicle 252. However, without the advanced sequence of wake up requests, the vehicle telematics control may be in sleep mode and a delivery driver might be forced to wait 10 minutes or more to unlock the door. This wake up control ensures that an Unlock Vehicle command will execute immediately when the package delivery truck 322 arrives since the vehicle is awake. In order to prevent a delay due to in-vehicle power saving mode, the vehicle's telematics module is sent a command (e.g., send your GPS coordinates) to execute the command before the package delivery truck arrives at the location of the target vehicle 252 to keep the target vehicle 252 awake so that the target vehicle 252 respond immediately to a command to unlock the door (see, for example, command 724 of FIG. 7A). This improves productivity since the vehicle 252 can be opened immediately when the package delivery truck 322 arrives, since the vehicle is awake and ready to accept commands. Note, in an example, for security, cloud based system for a package exchange with a vehicle service 340 will grant access to the vehicle only once. Subsequent requests will not unlock the vehicle even if correct virtual key and valid time window are present.

(11B) A GPS-based proximity control routine in GPS-based proximity module the cloud based system for a package exchange with a vehicle service 340 will also send a request via the one or more application programming interfaces to the telematics system OEM Backend 310 to send a command to cause a localized alert in the target vehicle so that the vehicle can blink the vehicle's lights and honk its horn to alert the delivery driver directly to the target vehicle's location (see, for example, command 725 of FIG. 7A and command 762 of FIG. 7B), in order to save time and aid in locating the target vehicle within rows of parked cars. Alternatively, the cloud based system for a package exchange with a vehicle service 340 itself can be scripted to send a command directly to the vehicle's telematics module to blink lights and honk its horn to alert delivery driver directly to vehicle's location. This ensures the designated target vehicle is identified properly and increases efficiency of delivering or picking up of the package.

(12) Optionally, the GPS-based proximity control routine of the cloud based system for a package exchange with a vehicle service 340 waits for a confirmation from the package delivery application 315 that the vehicles driver 304 has located the target vehicle 252. The GPS-based proximity control routine composes a correct request command and sends the request via the one or more application programming interfaces to the telematics system OEM Backend 310 to send a command to the intelligent vehicle's telematics module in the vehicle 252 to open the trunk of the vehicle or some other electro-mechanical actuation of a window, sunroof, or other opening to a secure compartment of the target vehicle 252 for placement of the package.

(13) Upon opening trunk, the package delivery person 304 picks up or stores the package into the vehicle, and closes the trunk. Optionally, the delivery person 304 can send a notification of delivery or pickup to the package delivery system 302.

(14) The package delivery entity system's delivery person 304 sends confirmation of the package delivery/pickup and the securing of the target vehicle 252 via the delivery application 315 on the client's device to the cloud based system for a package exchange with a vehicle service 340. Alternatively, the delivery application 315 on the client's device of the delivery person can be configured to monitor for the confirmation sent by the package delivery person 304 to the package delivery system 302 and automatically send a package delivery/pickup confirmation to the cloud based system for a package exchange with a vehicle service 340.

(15) After receiving a confirmed delivery of the package from the package delivery application 315 in the delivery person's client device, the GPS-based proximity control routine in the cloud based system for a package exchange with a vehicle service 340 can receive GPS coordinates from the delivery application 315 in the delivery person's client device and resume monitoring the delivery person 306. The GPS-based proximity control routine performs distance monitoring to recognize when the delivery driver is departing and then is scripted to verify that the target vehicle 252 is locked and to avoid the delivery person leaving an unlocked vehicle. The package exchange with a vehicle service in the cloud system 340 checks the lock status of the target vehicle 252 by sending a request to the telematics system's OEM backend 310.

(16) As described above, the GPS-based proximity control routine in the cloud based system for a package exchange with a vehicle service 340 sends a request via the one or more application programming interfaces to the telematics system OEM Backend 310 to send a command to the intelligent telematics module in the vehicle 252 to check the lock status and to confirm the vehicle's doors/trunk is both closed and locked. The telematics system's OEM backend 310 also responds back with a lock confirmation that the vehicle's doors/trunk is both closed and locked, or does not confirm lock status. If not confirming, the GPS-based proximity control routine in the cloud based system for a package exchange with a vehicle service 340 sends a request via the one or more application programming interfaces to the telematics system OEM backend 310 to send a command to the intelligent vehicle's telematics module in the vehicle 252 to close and lock the vehicle's doors/trunk. This feature improves security to insure the vehicle 252 is locked after departure and is not left unlocked.

Note, the GPS proximity application is scripted to perform multiple actions including i) waking up a vehicle via its associated telematics system ii) facilitating for the electro mechanical operations in the vehicle to occur, such as unlocking/locking doors, opening/closing windows, opening and unlocking/closing and locking a trunk, opening/closing sunroof, and iii) detecting when the delivery or pick up of the package in vehicle is at a certain distance away from the target vehicle, then the vehicle should be secure at that point. In one embodiment, the GPS-based proximity control routine in the cloud based system for a package exchange with a vehicle service 340 performs the above actions by sending requests via the one or more application programming interfaces to the telematics system OEM Backend 310.

(17) The cloud based system for a package exchange with a vehicle service 340 sends delivery confirmation to the User on either the mobile application 254 or the desktop application 350 on their client device.

(18) The package delivery entity system 302, optionally, sends a delivery notice message (e.g., email) to the User 312.

A cloud based system 340 includes a cloud based server which has a GPS-based proximity module to control and track a package exchange process, to speed up a package delivery and pick-up process, and to ensure security for the package exchange process.

Alternatively, a geo-proximity vehicle alert and access system for at least one of i) package delivery to a vehicle and ii) package pickup from the vehicle, includes a cloud based server having at least one processor to execute instructions associated with, and a GPS-based proximity module to control and track multiple actions. The actions can be performed by the modules in the following:

1) Module-A which is configured to monitor and track a GPS-based proximity between a client device associated with package carrier's vehicle 322 and a target vehicle 252. The client device has an application resident in the client device to establish communication with the cloud based server and transmit its current GPS coordinates; and 2) Module-B which is configured to initiate a request to an on-board intelligent control system installed in the target vehicle to perform electro mechanical operations in the target vehicle 252 based on the monitored GPS-based proximity between the client device associated with package carrier's vehicle 322 and a target vehicle 252. The on-board intelligent control system can be a Body Control Module (BMC) of the target vehicle 252.

In an embodiment, the target vehicle's on-board actuation module is a telematics module that is configured to 1) send data including GPS coordinates of the target vehicle 252 to an OEM telematics provider 310, and 2) receive one or more commands from the OEM telematics provider 310. The server of the OEM telematics provider is configured to send the GPS coordinates of the target vehicle to the cloud based server with the GPS-based proximity module. Also, the one or more processors in the cloud based server site are configured to calculate the first threshold distance, and then issue a request to a server of the OEM telematics provider 310 to issue the command to wake up the telematics module of the target vehicle 252 by pinging the telematics module with intervals shorter than a predefined idle time before going to sleep of the telematics module. As an example, the idle time before going to sleep of the on-board Telematics module of the target vehicle 252 can be between 5 to 20 minutes (e.g., 10 minutes).

In an embodiment, the target vehicle's on-board actuation module is a dongle module that is that is coupled to a fault and diagnostic module installed in the target vehicle of the user and is configured to retrieve diagnostic data including the current GPS coordinates of the target vehicle of the user. The on-board dongle module is configured to send the current GPS coordinates of the target vehicle of the user via a Wi-Fi or cellular communication to the GPS-based proximity module. The on-board dongle module may also include a Radio Frequency circuitry of a key fob to communicate with a local client device, such as a smart phone or hand held device, and is configured to perform the commands by transmitting RF signals that include the commands to a Body Control Module (BCM) of the target vehicle of the customer, where the security token is a rolling security key of the BCM that is included in the transmitted signals and is used by the BMC for verifying the authentication of the commands.

In an embodiment, the target vehicle's on-board actuation module is an on-board RF module having a radio frequency communication circuit configured to establish a secure communication with the security module to receive the commands and the security token via the local client device. The on-board RF module includes an RF circuitry of a key fob and is configured to perform the commands by transmitting RF signals.

One or more processors of the cloud bases system 340 may calculate the first threshold distance, and then issue a request to the one or more servers of the telematics provider to issue the command to wake up the on-board telematics module by pinging the on-board telematics module with intervals shorter than a predefined idle time before going to sleep of the on-board telematics module. Alternatively, a client device of the package delivery vehicle/person can calculate the first threshold distance and send a request to the security module of the cloud based system 340.

FIG. 3B illustrates in diagram 330, a portion of the sequence of numbered steps describe above for diagram 300. (5) The user 312 receives a notice from the cloud based system for a package exchange with a vehicle service 340 on either the mobile application 254 or the desktop application 350 on their client device to confirm a desire for a package to be shipped to their vehicle 252. (6) The user 312 confirms and supplies a response into either the mobile application 254 or the desktop application 350 on their client device to send permission (User name and Password) for the telematics system 310, to the cloud based system for a package exchange with a vehicle service 340. (10) The cloud based system for a package exchange with a vehicle service 340 sends the target vehicle's GPS location data to the package delivery application 315 in the client device of the delivery person 304. (11) Upon approaching the target vehicle 252, the package delivery application 315 in the client device of the delivery person 304 either automatically detects a distance between the package delivery vehicle 322 and the target vehicle 252 or can also be prompted by the delivery person to send a request to the cloud based system for a package exchange with a vehicle service 340 to wake up the vehicle 252. Alternatively, the distance between the package delivery vehicle 322 and the target vehicle 252 can independently be monitored by the cloud based system for a package exchange with a vehicle service 340 and the request can be sent without delivery application 315 or delivery person 304 involvement. (11A) The GPS-based proximity control routine in the cloud based system for a package exchange with a vehicle service 340 via the one or more application programming interfaces sends one or more wake up requests to the telematics system OEM Backend 310 to wake up the target vehicle 252. (11B) The GPS-based proximity control routine in the cloud based system for a package exchange with a vehicle service 340 also sends a request via the one or more application programming interfaces to the telematics system OEM Backend 310 to send a command to cause a localized alert in the target vehicle 252 so that the vehicle can blink the vehicle's lights and honk its horn to alert the delivery driver directly to the target vehicle's location in order to aid in locating the target vehicle 252 within rows of parked cars. (12) The GPS-based proximity control routine in the GPS-based proximity module composes a correct request command and sends the request via the one or more application programming interfaces to the telematics system OEM Backend 310 to send a command to the intelligent vehicle's telematics module in the vehicle 252 to open a door including a trunk, a window, or a sunroof of the target vehicle 252. Consequently, the Telematics provider 310 sends command 334 through channel 320 to the target vehicle 252 to unlock and open the door of the vehicle. (14) The delivery person 304 sends confirmation of the package 306 delivery/pickup and the securing of the target vehicle 252 via the delivery application 315 on the client's device to the cloud based system for a package exchange with a vehicle service 340.

FIG. 3C illustrates in diagram 370, a portion of the sequence of numbered steps describe above for diagram 300. (14) The delivery person 304 sends confirmation of the package 306 delivery/pickup and the securing of the target vehicle 252 via the delivery application 315 on the client's device to the cloud based system for a package exchange with a vehicle service 340. (15) After a confirmed delivery of the package from the delivery application 315 in the delivery person's client device, the GPS-based proximity control routine performs distance monitoring to recognize when the delivery driver 304 is departing. In order to avoid the delivery person 304 leaving an unlocked vehicle, the package exchange with a vehicle service in the cloud system 340 checks the lock status of the target vehicle 252 by sending a request to the telematics system's OEM backend 310. Consequently, the Telematics provider 310 checks the lock state of the vehicle 252 by sending a verification command 384 and receiving a verification response through channel 320 to the target vehicle 252. (16) The telematics system's OEM backend 310 responds back with a lock confirmation that the vehicle's doors/trunk is both closed and locked, or does not confirm being locked. (17) After receiving the locking confirmation, the cloud based system for a package exchange with a vehicle service 340 sends delivery/transfer confirmation and optionally a lock confirmation to the User 312 on either the mobile application 254 or the desktop application 350 on their client device. Optionally, the cloud based system for a package exchange with a vehicle service 340 sends a delivery confirmation 373 via the delivery application 315 to the delivery person 304.

The current GPS coordinates of a package delivery vehicle 322 is transmitted from GPS-based delivery application 315 resident in a client device associated with a package delivery vehicle. The client device resides 1) in the package delivery vehicle 322, or 2) in a handheld tool that travels with a delivery person 304 of the package delivery vehicle. The GPS-based delivery application 315 can transmit the current GPS coordinates of the package delivery vehicle/person along with the first virtual key for authentication. The GPS-based delivery application 315 is downloadable from a website or, otherwise electronically distributed to the client device from a database in the cloud based server. Additionally, the GPS coordinates of the target vehicle 252 are transmitted from the telematics module of the target vehicle 252 to the telematics provider 310 and then is transmitted by the one or more servers of the telematics provider, via a secure communication, to the GPS-based proximity module.

Figure 9A:
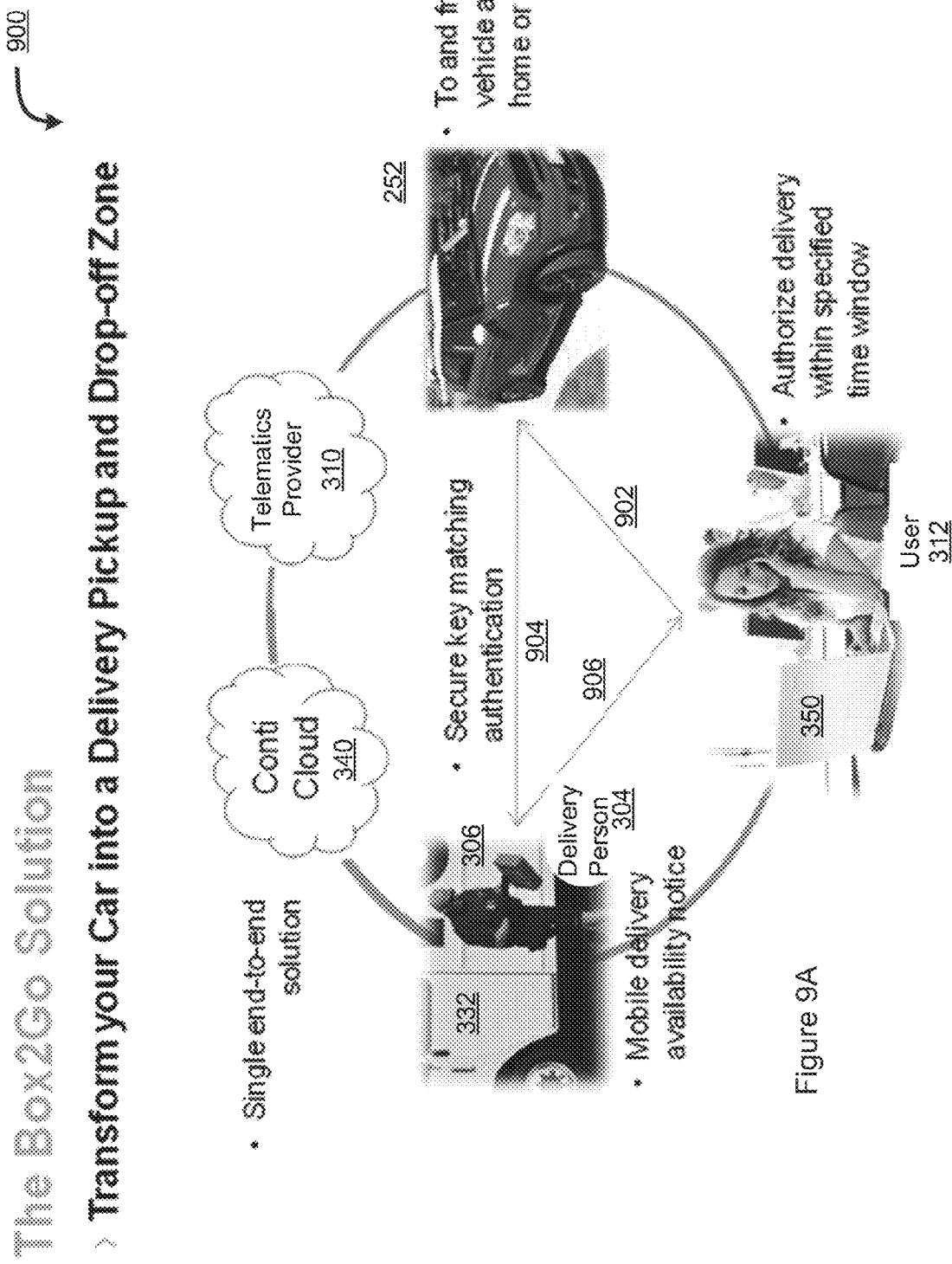
FIGS. 9A-9D illustrate block diagrams of embodiments of the multiple paired virtual keys and security authorization notices used by the package exchange with a vehicle service.
Figure 9B:
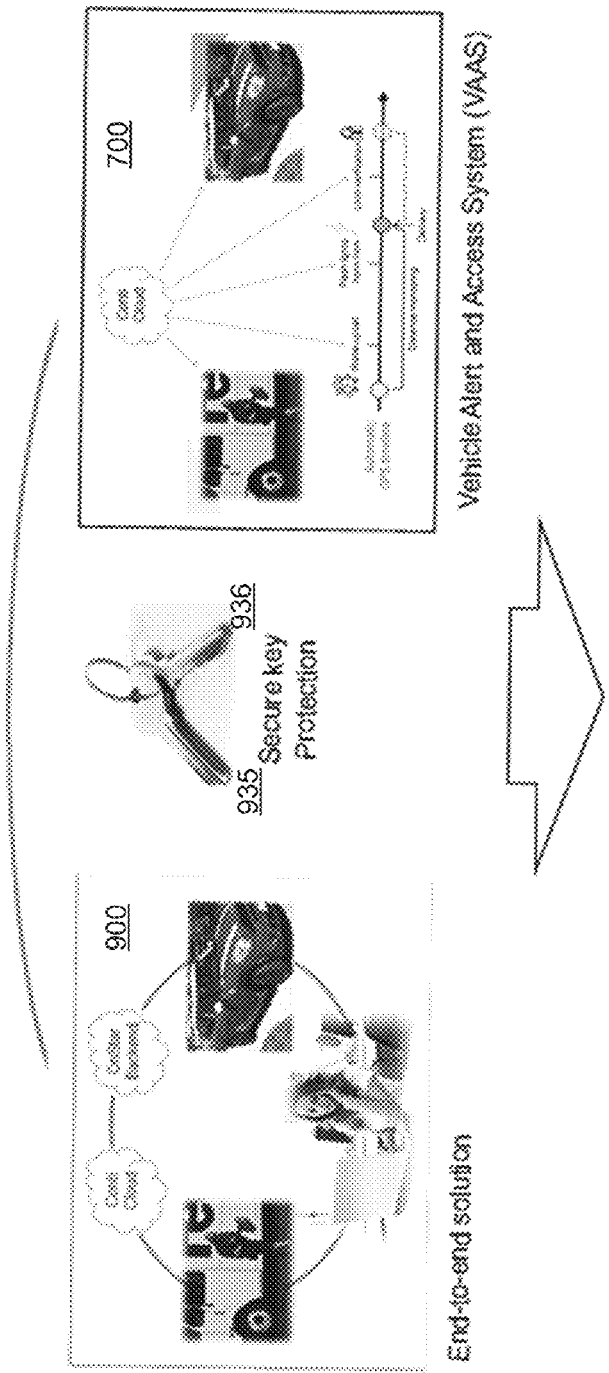
Figure 9C:
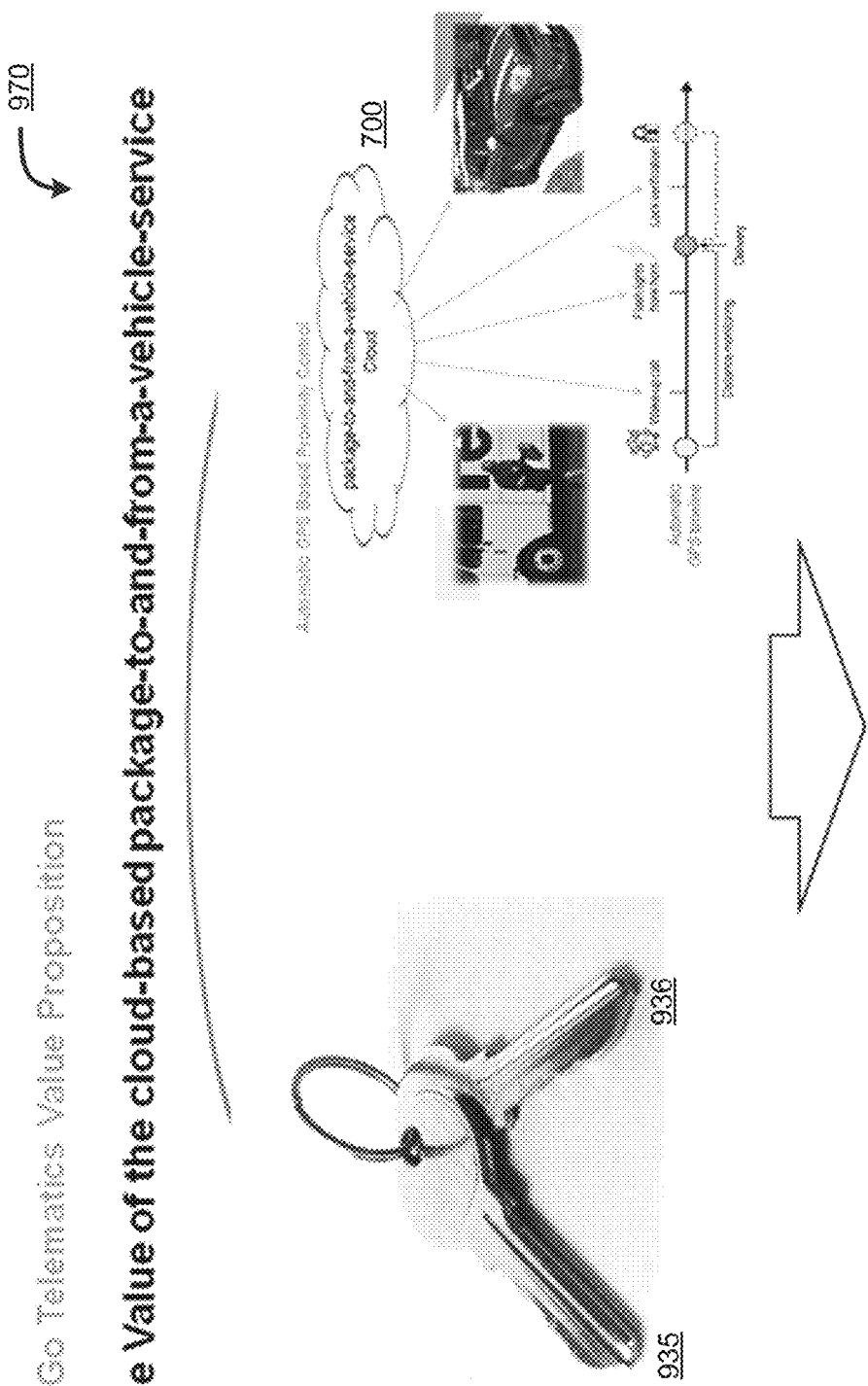
Figure 9D:
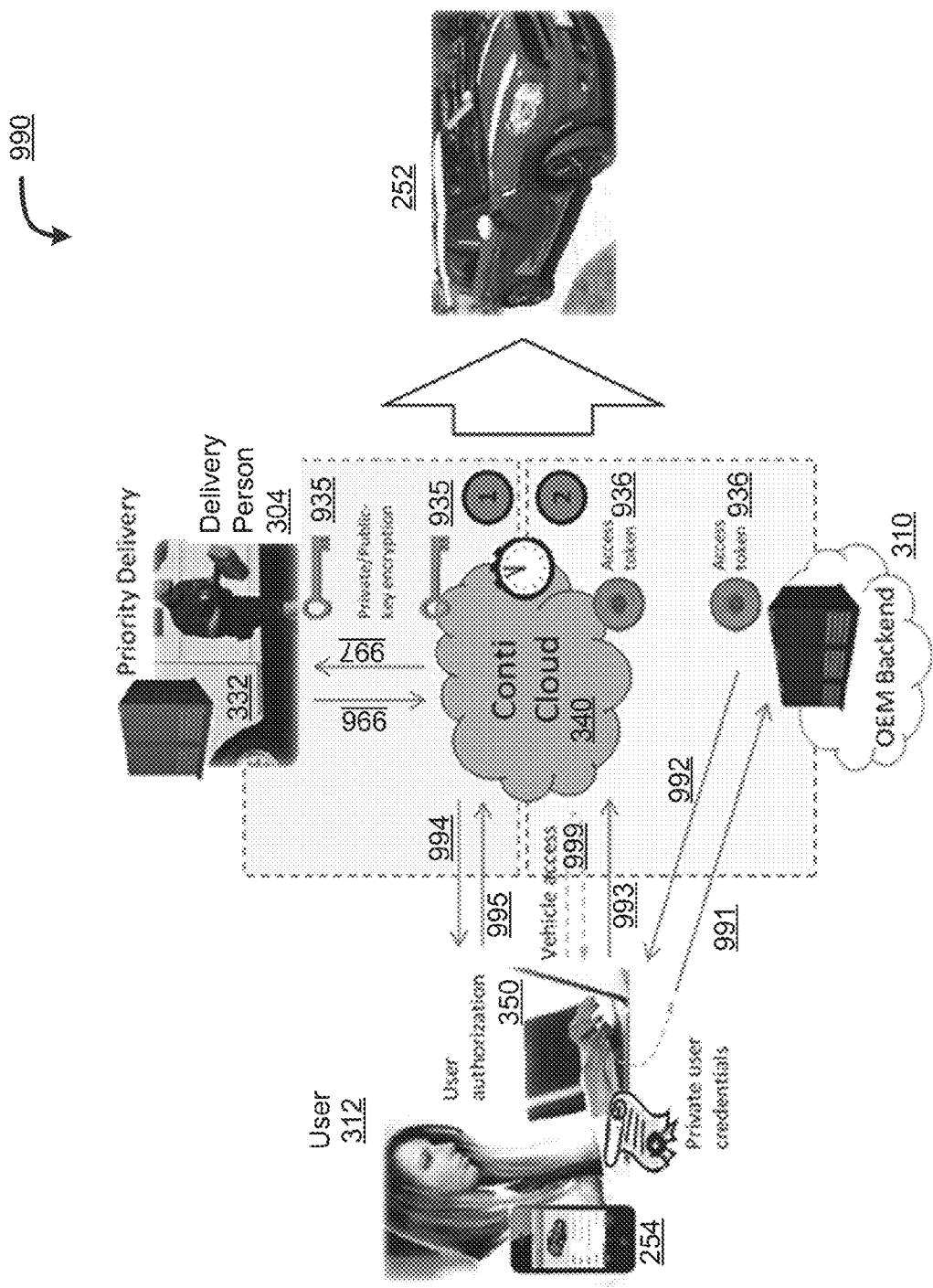

FIGS. 9A-9D on block diagrams 900, 930, 970, and 990 show embodiments of the multiple virtual keys and security token used by the package exchange with a vehicle service. FIG. 9D in diagram 990 shows the user 312, the package delivery vehicle 322 and the delivery person 304, the telematics provider (OEM backend) 310, and the target vehicle 252. The block diagram 990 also shows the first virtual key 935 that is used for authenticating the commands/requests received from the delivery person 304 and the security token 936 that is used for authentication the user 312.

The first virtual key 935 is provided by the cloud based system for a package exchange with a vehicle service 340 using a secure communication to the package delivery system 302. The package delivery system 302 can supply the first virtual key to a client device in the package delivery vehicle 322 or to a client device of the package delivery person 304. The first virtual key can be used by the cloud based system for a package exchange with a vehicle service 340 to authenticate commands/request/data received from the package delivery system 302, package delivery vehicle 322, and package delivery person 304 when the received command/request/includes the first virtual key. In an example, the first virtual key is a public key generated by the cloud based system for a package exchange with a vehicle service 340 such that only the cloud based system for a package exchange with a vehicle service 340 knows an associated private key matching the public key and can authenticate the received command/request/data including the first virtual key. As described with respect to FIGS. 3A-3C, the GPS coordinates of the package delivery vehicles as well as a wakeup command can be received from the package delivery person 304/package delivery vehicle 322. In an example, the package delivery person 304 uses the package delivery application 315 in their client device to send the Tracking Number and the first virtual key in message 996 to the cloud based system for a package exchange with a vehicle service 340 in order to obtain the target vehicle's information including its current location information. The cloud based system for a package exchange with a vehicle service 340 responds with message 997 to the package delivery application 315 in the client device of the delivery person 304 with the target vehicle's location information.

In an embodiment, a cloud based system 340 for a package exchange with a vehicle service includes a cloud based server that has one for more processors and one or more databases as well as a security module running on the one or more processors. The security module is configured to receive a first virtual key 935 and one of 1) a request for the package exchange with a vehicle service, 2) data, or 3) both, from a package delivery application 315 running on the client device associated with a package delivery vehicle 322. The first virtual key 935 has a first shelf life and is used by the security module for authentication of the communications from a client device associated with the package delivery vehicle 322. The first shelf life is a first window of time assigned by the security module of the cloud based system 340 to the virtual key 935. The first shelf life is a security measure of the first virtual key 935 that allows it to be used only inside the first window of time.

Also, the security module of the cloud based system 340 can receive a security token 936 associated with both a user 312 and the target vehicle 252 from a desktop application 350 or a mobile application 254 of a client device associated with the user 312. The security token 936 has a second shelf life and is used by a verification module running on one or more servers of a telematics provider 310 for a verification of the user and target vehicle. The second shelf life is a second window of time assigned by the security module of the cloud based system 340 to the security token 936. The second shelf life is a security measure of the security token 936 that allows it to be used only inside the second window of time.

Initially, the security module of the cloud based system 340 can perform an authentication of the received communications from the package delivery vehicle. After authentication, the security module can send the security token 936 and one or more commands 1) based on the request from a client device of the package delivery vehicle/person, or 2) initiated by the security module of the cloud based system 340, to an on-board actuation module of the target vehicle 252 for the package exchange with a vehicle service. The specified window of time is the overlap time between the first shelf life and the second shelf life. In response to the commands, the on-board actuation module is configured to cause an electro-mechanical operation in the target vehicle to any of i) open up, ii) unlock, and iii) any combination of these two, of the target vehicle so that the package delivery service performs a package exchange with the target vehicle.

Alternatively, the security token can be a current (first) rolling security key of Body Control Module (BMC) of the target vehicle and can be used by the security module to generate a next (second) rolling security key of the Body Control Module (BMC) of the target vehicle. After the first authentication and in an overlap window of the first shelf life and the second shelf life, the security module can be configured to send, via a universal fey fob simulator of a delivery person, the next (second) rolling security key and one or more commands 1) based on the request from first client device, or 2) initiated by the security module, to the Body Control Module (BMC) of the target vehicle. After a second authentication of the second rolling security key by the BMC, the commands can be executed via the BMC of the target vehicle.

In an embodiment, the on-board actuation module is an on-board telematics module coupled to a network of a telematics provider. In response to a user request and after a user login using user's credentials through the second client device to the telematics provider, the telematics provider is configured to provide the security token to the second client device of the user via a first secure communication. Before sending a command on behalf of the user to the telematics provider, the security module is configured to send the security token to a server of the telematics provider. The security token is used by a verification module running on one or more servers of a telematics provider to verify the user and target vehicle. In response to receiving the security token and after the verification, the telematics provider supplies, via a second secure communication, a second virtual key to the security module to be used for authenticating further communications from the security module to the telematics provider. The security module is configured to send the second virtual key and the commands to the telematics provider. The one or more servers of the telematics provider perform a second authentication using the second virtual key before sending the commands to the on-board telematics module in the target vehicle.

In an embodiment, the on-board actuation module is an on-board dongle module having a Wi-Fi or cellular communication circuit configured to establish a secure communication with the security module to receive the commands and the security token from the security module. The on-board dongle module includes an RF circuitry of a key fob and is configured to perform the commands by transmitting RF signals that include the commands to a Body Control Module (BCM) of the target vehicle of the customer. The security token is a rolling security key of the BCM that is included in the transmitted signals and is use by the BMC for verifying the authentication of the commands.

In an embodiment, the cloud based system for a package exchange with a vehicle service 340 includes a pool of virtual keys that includes one or more public keys and their associated private keys. The pool of virtual keys is in at least one database of the cloud based server. The first virtual key can be a public key from the pool of virtual keys and can be supplied by the security module of the cloud system 340, via a secure communication, to a client device of the package delivery vehicle 322. In an example, the first virtual key is provided by the cloud based system for a package exchange with a vehicle service 340 to the package delivery system 302 and then the package delivery system 302 provides the first virtual key to the client device of the package delivery vehicle 322. Also, the client device of the package delivery vehicle 322 can use the first virtual key with each communication to the security module. The security module of the cloud system 340 can use the first virtual key included in the communications from the client device of the package delivery vehicle to authenticate the received communications. Authentication can include matching a public key with an associated private key of the pool of virtual keys. In an example, a distinct first virtual key is used for each package transfer and the virtual key is recycled or discarded after the package transfer. In another example and to tighten the security, the first virtual key can be made unique in space and time such that it is only valid in a specific window of time and in a specific location of space. For example, the first virtual key can be active only between noon and 4 p.m. on a specific day and if the package delivery vehicle is located is specific location of a city.

On or around the day of delivery, the cloud based system for a package exchange with a vehicle service 340 sends a message (994) to the mobile application 254 or the desktop application 350 of the user 312 and asks the user to confirm the details of delivery or pick up including, for example, the expected location of the vehicle. The user 312 is also asked to provide a security token 936 supplied by the telematics provider to the cloud based system for a package exchange with a vehicle service 340. The user responds (995) and confirms the delivery or pick up. A positive response from the user 312 acts as a user permission to unlock and open a door of the target vehicle. The user further sends a request (991) along with the private user credentials such as login information and vehicle data to the telematics provider 310 and requests a security token 936. The telematics provider 310 verifies the user credentials and supplies a security token in a reply message (992). In an example, the security token is encrypted and neither the user 312 nor the cloud based system for a package exchange with a vehicle service 340 can decode it. After receiving the security token 936 the user sends the security token in a message (993) to the cloud based system for a package exchange with a vehicle service 340. The security token can be used by the telematics provider 310 for user verification. For example, when the telematics provider 310 receives a command including the security token, the telematics provider 310 uses the security token to verify the user and the account linked with the user and then may send the command to a target vehicle associated with the user account. In another example, the telematics provider 310 renews the security token after receiving a command and sends a new security token back to the cloud based system for a package exchange with a vehicle service 340 to be used for user verification in the next communication. In another embodiment, the security token 936 is only used once for user verification such that a communication containing only the security token 936 is sent to the telematics provider. In response to receiving the security token 936 and after user verification, the telematics provider can supply back a second virtual key such as a public key to the cloud based system for a package exchange with a vehicle service 340 to be used for user verification in future communications.

The cloud based system 340 also includes a GPS-based proximity module. The GPS-based proximity module can run on the one or more processors of the cloud based system 340 and includes the security module. The GPS-based proximity module can control and track a package exchange process, can speed up a package delivery and pick-up process, and can ensure security for the package exchange process. The GPS-based proximity module can receive both current GPS coordinates of a package delivery vehicle 322 from a client device of the package delivery vehicle and current GPS coordinates of a target vehicle 252 from the on-board actuation module and to monitor the distance between the package delivery vehicle and the target vehicle for at least one of package delivery to the target vehicle and package pick up from the target vehicle. After receiving the second virtual key and in the overlap window of the first shelf life and the second shelf life, the security module of the GPS-based proximity module can send one or more commands to the target vehicle 252 through the actuation module. The commands include: 1) to wake-up an on-board actuation module in the target vehicle 252 while in a close proximity established by a first threshold distance between the package delivery vehicle and the target vehicle (see, for example, wake-up call point 702 on the timeline of FIG. 7A), 2) to give an alert from the target vehicle 252 while in a close proximity established by a second threshold distance between the package carrier's vehicle and the target vehicle such that the second threshold distance is shorter that the first threshold distance (see, for example, flash lights/honk horn point 704 on the timeline of FIG. 7A), 3) to unlock a door and/or trunk of the target vehicle 252 (see, for example, command 766 on FIG. 7B), and 4) to lock the target vehicle 252 after receiving a confirmation of the package exchange process from a client device of the package delivery vehicle (see, for example, command 772 on FIG. 7B). Locking the target vehicle may also require establishing a fourth separation distance between the package delivery vehicle 322 and the target vehicle 252 vehicle (see, for example, lock verification point 706 on the timeline of FIG. 7A). The GPS-based proximity module is configured to establish the first threshold distance between the package delivery vehicle 322 and the target vehicle 252 before initiating a request from the on-board intelligent control system in the target vehicle. The first threshold distance may be calculated by the one or more processors based on factors including current traffic data as well as actual distance between the client device and the target vehicle. At least one package can be exchange between the package delivery vehicle 322 and the target vehicle 252 between unlocking the target vehicle and then locking the target vehicle.

In an embodiment, a shelf life is assigned to the security token and/or the second virtual key by the cloud based system for a package exchange with a vehicle service 340 such that it can be assigned in a limited window of time. In another embodiment, the telematics provider 310 can assign a shelf life to the security token and/or the second virtual key.

Additionally, the on-board telematics module of the target vehicle 252 is coupled to an intelligent control system in the target vehicle. The security module can send commands to the on-board telematics module and to the intelligent control system of the target vehicle via communication with the telematics module in the target vehicle through an OEM telematics provider 310. The security module provides the second virtual key to the telematics provider such that the one or more servers of the telematics use the second virtual key for authentication of communications from the security module. The commands include waking up the telematics module and performing mechanical actions of locking and unlocking the target vehicle, opening and closing doors, and giving an alert by the target vehicle 252. The alert includes one or a combination of 1) activating one or more lights of the target vehicle, 2) activating an alarm system of the target vehicle, and 3) honking a horn of the target vehicle 252. In an embodiment, the on-board telematics module can be coupled to an input port of an on-board diagnostics system of the target vehicle. The on-board intelligent control system can be a Body Control Module (BMC) of the target vehicle.

In an embodiment, the user 312 can login through a mobile application 254 or a desktop application 350 on a client device of the user to the telematics provider 310 using user's credentials. After login and in response to a user request, the telematics provider 310 can provide the security token 936 to the client device of the user via a secure communication.

In an embodiment, before sending a command on behalf of the user 312 to the telematics provider 310, the security module of the cloud based system 340 can send the security token 936 to the telematics provider 310. The security token 936 is used by a verification module of the telematics provider 310 to verify the user 312 and target vehicle 252. In response to receiving the security token and after the verification, the telematics provider 310 supplies, via a secure communication, a second virtual key to the security module. The second virtual key can be included in communications from the security module to the telematics provider

310 and can to be used by the telematics provider 310 for authenticating communications received from the security module.

Therefore, the security module of the cloud based system 340 can send any commands along with the second virtual key to the telematics provider 310. One or more servers of the telematics provider 310 perform a second authentication using the second virtual key before sending the commands to the on-board telematics module in the target vehicle 252.

FIG. 9A in diagram 900 shows an embodiment of the paired virtual keys and security authorization notices used by the package exchange with a vehicle service. In diagram 900, communication arrows between the package delivery person 304, the target vehicle 252, and the user 312 includes further communications to the telematics provider 310 and cloud based system for a package exchange with a vehicle service 340. On or about the time of delivery, the package delivery person sends a message 906 requesting confirmation of delivery (906). In an example, the request is received through the cloud based system for a package exchange with a vehicle service 340. The user 312 responds 902 and authorizes the delivery. In an example, the response is sent to the cloud based system for a package exchange with a vehicle service 340 and may include the security token from the telematics provider. After performing user verification by the telematics provider based on the security token, a message 904 is sent to the delivery person through the cloud based system for a package exchange with a vehicle service 340 that includes the GPS coordinates of the target vehicle.

Figure 7A:
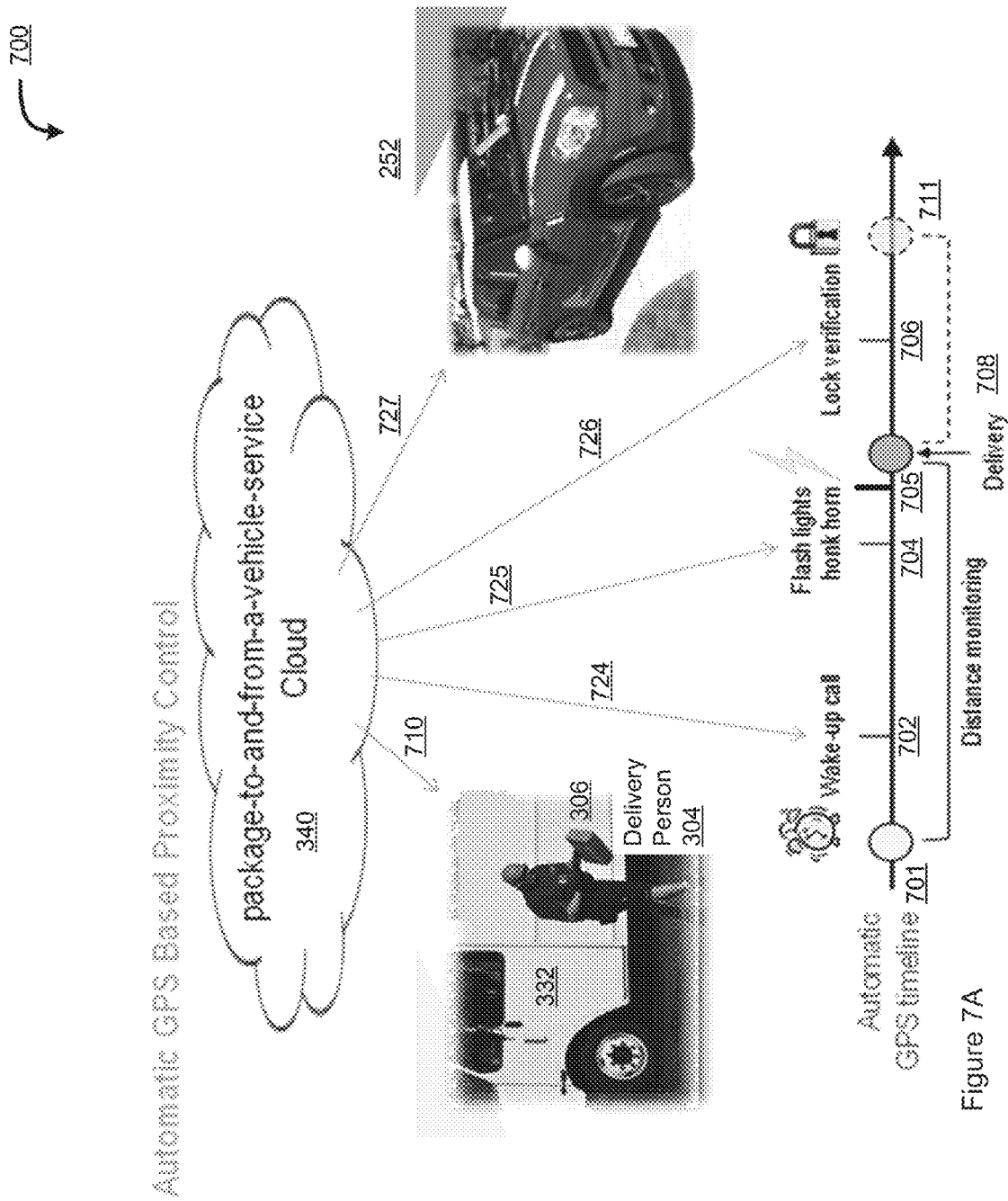
FIGS. 7A and 7B illustrate block and flow diagrams of embodiments of the GPS-based control and tracking mechanisms used for delivery to or pick-up from the vehicle.

FIG. 9B in diagram 930 shows a combination of diagram 900 of FIG. 9A and diagram 700 of FIG. 7A. Diagram 900 is described above and diagram 700 which is a timeline of the package delivery to and pick up from the vehicle process is described below. The diagram 930 further shows two secure key protections. The first secure key protection is the first virtual key 935 that is used for authentication of the request/command/data received from the package delivery person 304 by the cloud based system for a package exchange with a vehicle service 340 and the second secure key protection is the security token 936 that is used by the telematics provider for verification of the user and the received commands.

FIG. 9C in diagram 970 shows a portion of diagram 930 of FIG. 9B. The diagram 970 shows the use of the two secure key protections on the timeline of the package delivery to and pick up from the vehicle process which is described below with regards to FIG. 7A. Again, the first secure key 935 is used for authentication of the request/command/data received from the package delivery person 304 and the second secure key protection 936 is used for verification of the user/commands sent to the telematics provider 310.

High Level Description of the Package Exchange with a Vehicle Service Processes

Figure 6A:
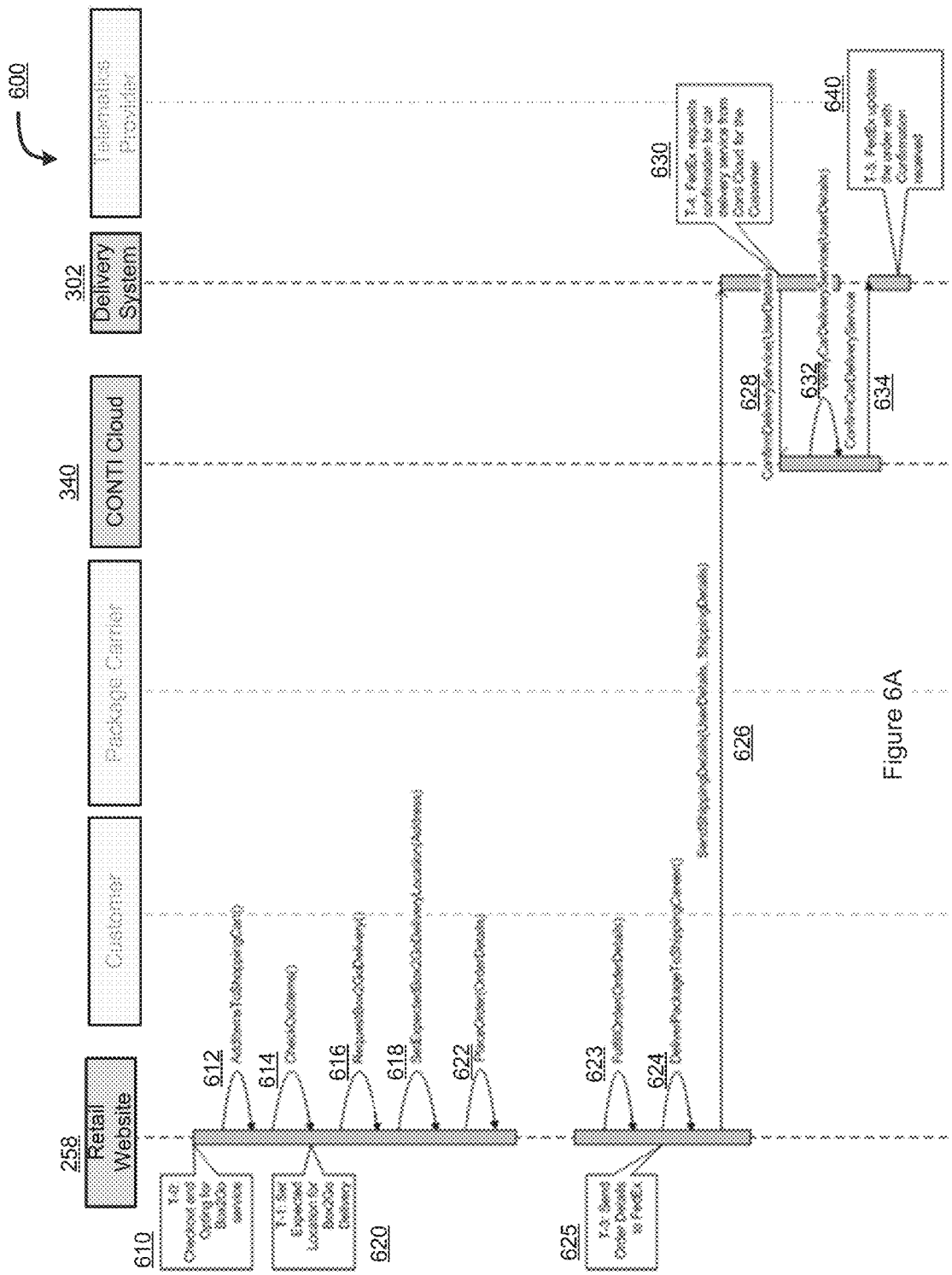
FIGS. 6A-6B illustrate flow diagrams of embodiment of the alternative delivery system.
Figure 6B:
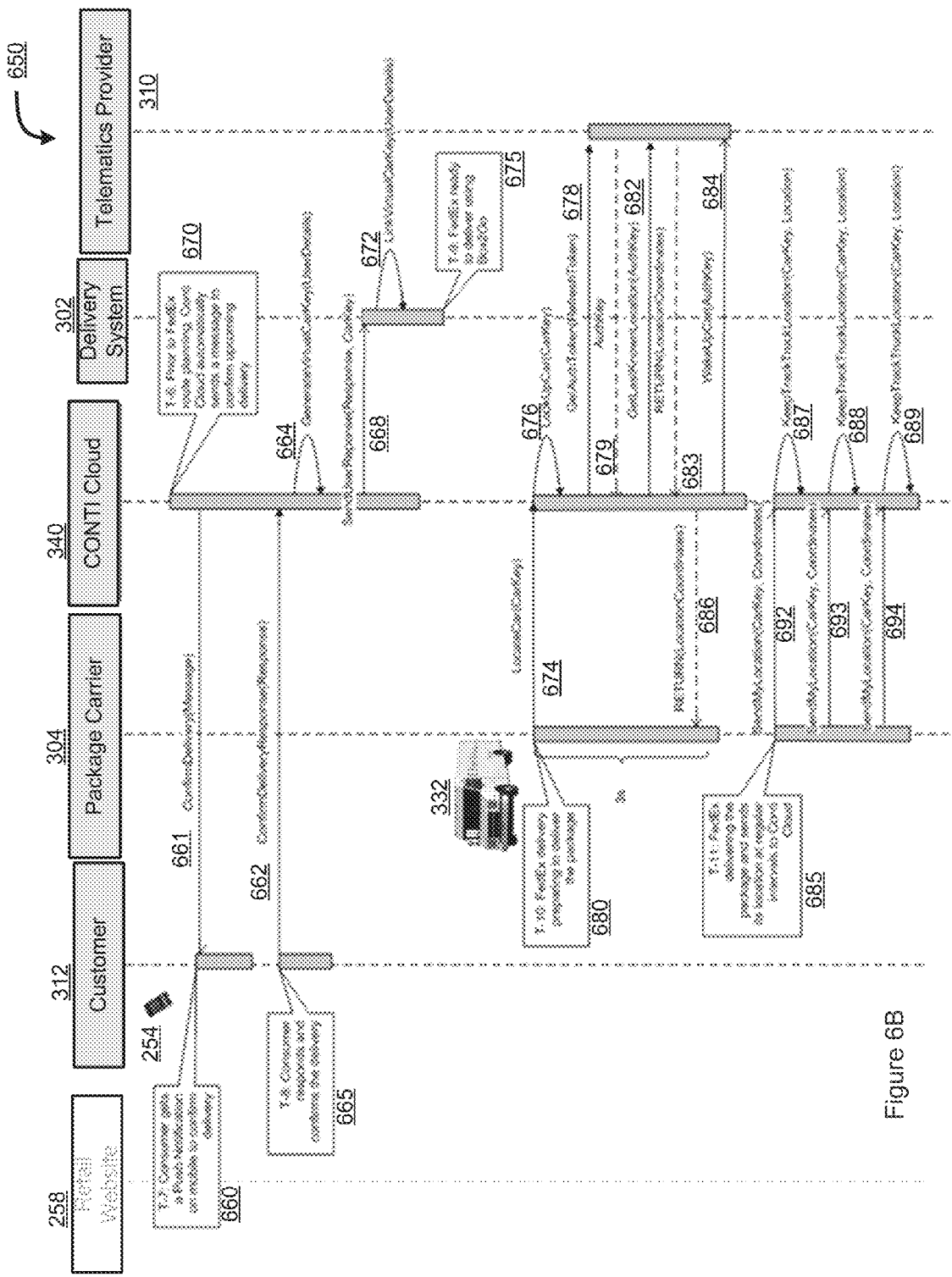

FIGS. 6A-6B illustrate flow diagrams 600 and 650 of embodiment of the alternative delivery system for package delivery to and pick up from the vehicle. The diagram 600 describes a customer/user 312 shopping at a retail website 258. The retail website 258 includes an option of delivery to a mobile location (e.g., a vehicle 252). The user/customer adds items to the shopping cart (612). After being done with shopping the user/customer proceeds to checkout (614). At checkout, the user/customer requests for Box2GoDelivery (e.g., delivery to a vehicle) (616). The customer/user 312 enters the expected delivery location (expected location of the vehicle 252) (618) and places the order (622). Additionally, and the retail website 258 prepares the order details 623 and the shipping details 624 and sends the order details and shipping details to the package delivery system 302 (626). The order details can include user details (user data) such as name and VIN of the vehicle. The shipping details can include the expected location of the vehicle. After receiving a request for delivery to a mobile location (e.g., the vehicle 252), the package delivery system 302 sends the user data to the cloud based system for a package exchange with a vehicle service 340 and requests a confirmation of the user and target vehicle (628). The cloud based system for a package exchange with a vehicle service 340 verifies the user and target vehicle (632) and sends a confirmation back to the package delivery system (634). The package delivery to and pick up from the vehicle process continues on flow diagram 650. The user receives a confirmation delivery message from the cloud based system for a package exchange with a vehicle service (661). For example, on or around the day of delivery, the cloud based system for a package exchange with a vehicle service 340 sends a message to the mobile application 254 of the user 312 and asks the user to confirm the details of delivery including, for example, the time and location of the vehicle. The user responds (662). A positive response from the user 312 acts as the user permission to unlock and open a vehicle door. Based on the permission, the cloud based system for a package exchange with a vehicle service 340 generates a virtual car key (664) allowing the package carrier 304 to unlock and open the door of the vehicle. The cloud based system for a package exchange with a vehicle service 340 sends the virtual car key to the package delivery system (668) and the package carrier system 302 links the virtual car key to the user data (672). On the day of delivery, the package carrier 304 send the virtual car key to the cloud based system for a package exchange with a vehicle service 340 and informs about the delivery (674). The cloud based system for a package exchange with a vehicle service 340 verifies the virtual car key (676) and sends a request to the Telematics provider 310 and asks for an authorization key (678). The request can include the user account information including username and password and VIN of the vehicle. The Telematics provider 310 responds with an authorization key (679). The cloud based system for a package exchange with a vehicle service 340 uses the authorization key and requests for the last know location of the target vehicle (682). The Telematics provider 310 responds with the last GPS coordinates of the target vehicle (683). Optionally, the cloud based system for a package exchange with a vehicle service 340 send the last coordinates of the target vehicle 252 to the package carrier (686). The cloud based system for a package exchange with a vehicle service 340 which receives the GPS coordinate of the package delivery vehicle 322, monitors the distance between the package delivery vehicle 322 and the target vehicle 252 and using the authorization key sends a wakeup call (684) to the Telematics provider 310 when the package delivery vehicle gets to predefined distance (e.g., closer than the first threshold distance) of the target vehicle. The cloud based system for a package exchange with a vehicle service 340 continues to receive the GPS coordinates of the package carrier's vehicle 322 along with the virtual car key (692-694) and calculates the distance between the package delivery vehicle 322 and the target vehicle 252 and monitors the distance (687-689). The virtual car key is used by the cloud based system for a package exchange with a vehicle service 340 to check the authenticity of the messages received from the package carrier 304. Likewise, the authorization key is used by Telematics provider 310 to authenticate the messages it receives from the cloud based system for a package exchange with a vehicle service 340.

Figure 7B:
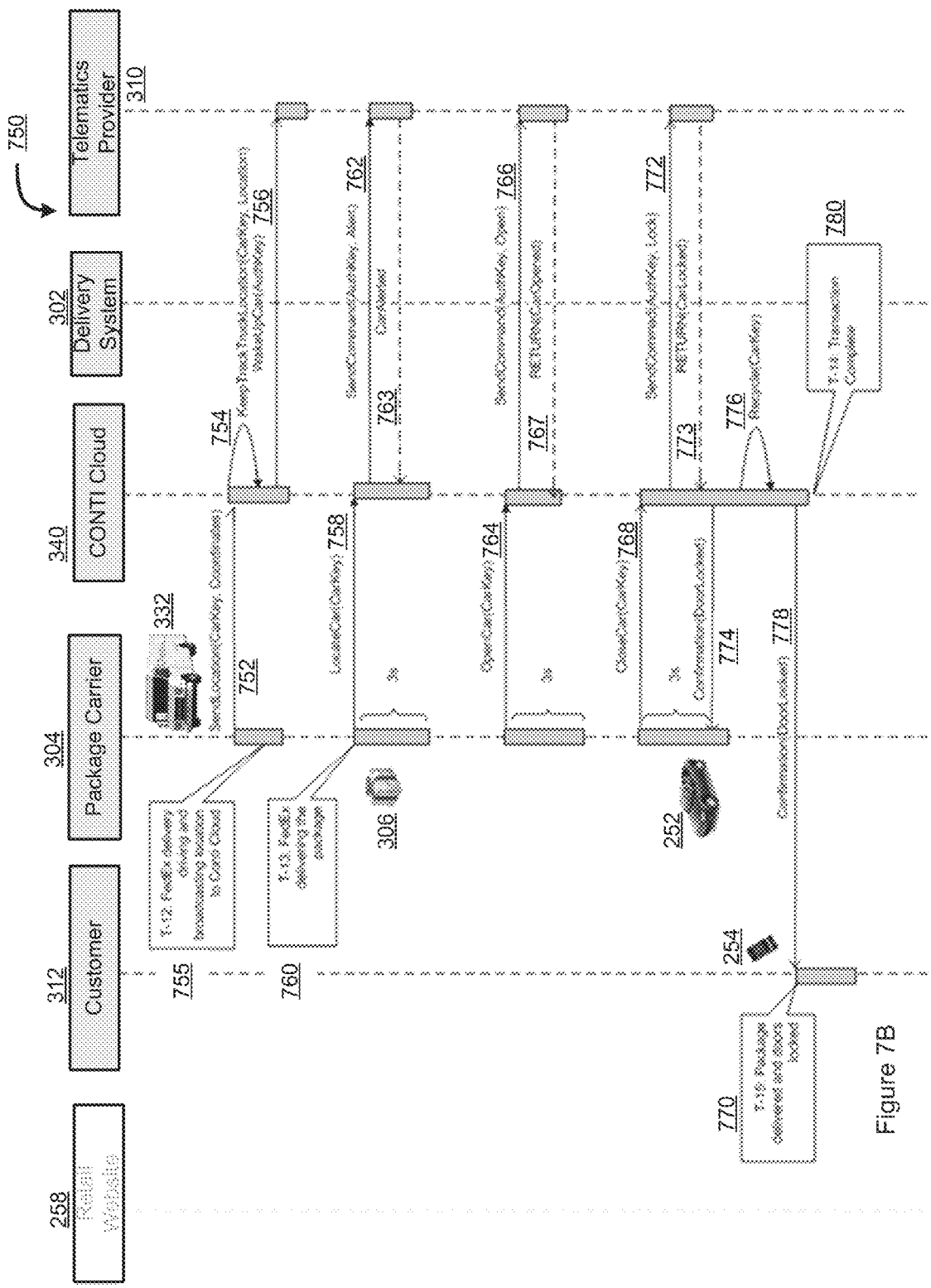
Figure 8A:
FIGS. 8A-8D illustrate block and flow diagrams of embodiment of the value proposition of the alternative delivery system.
Figure 8A:
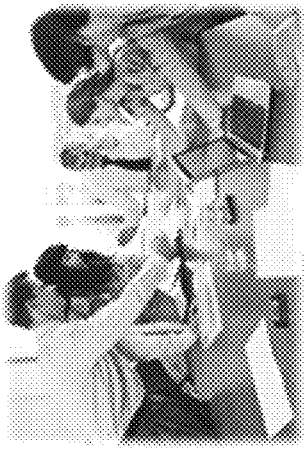
Figure 8A:
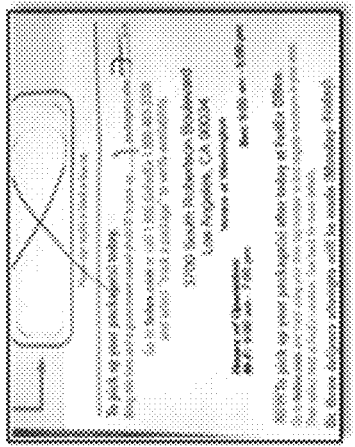
Figure 8B:
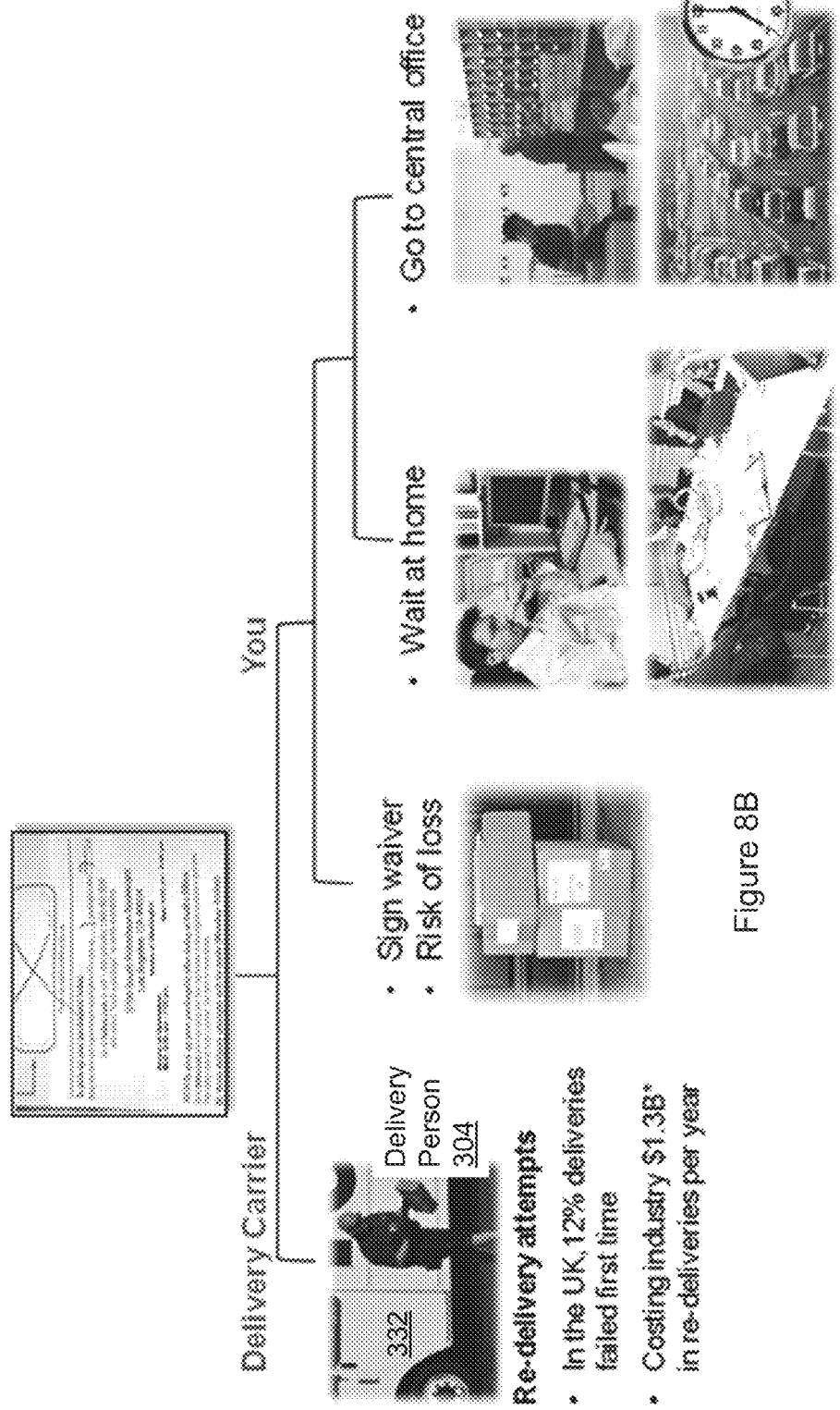
Figure 8C:
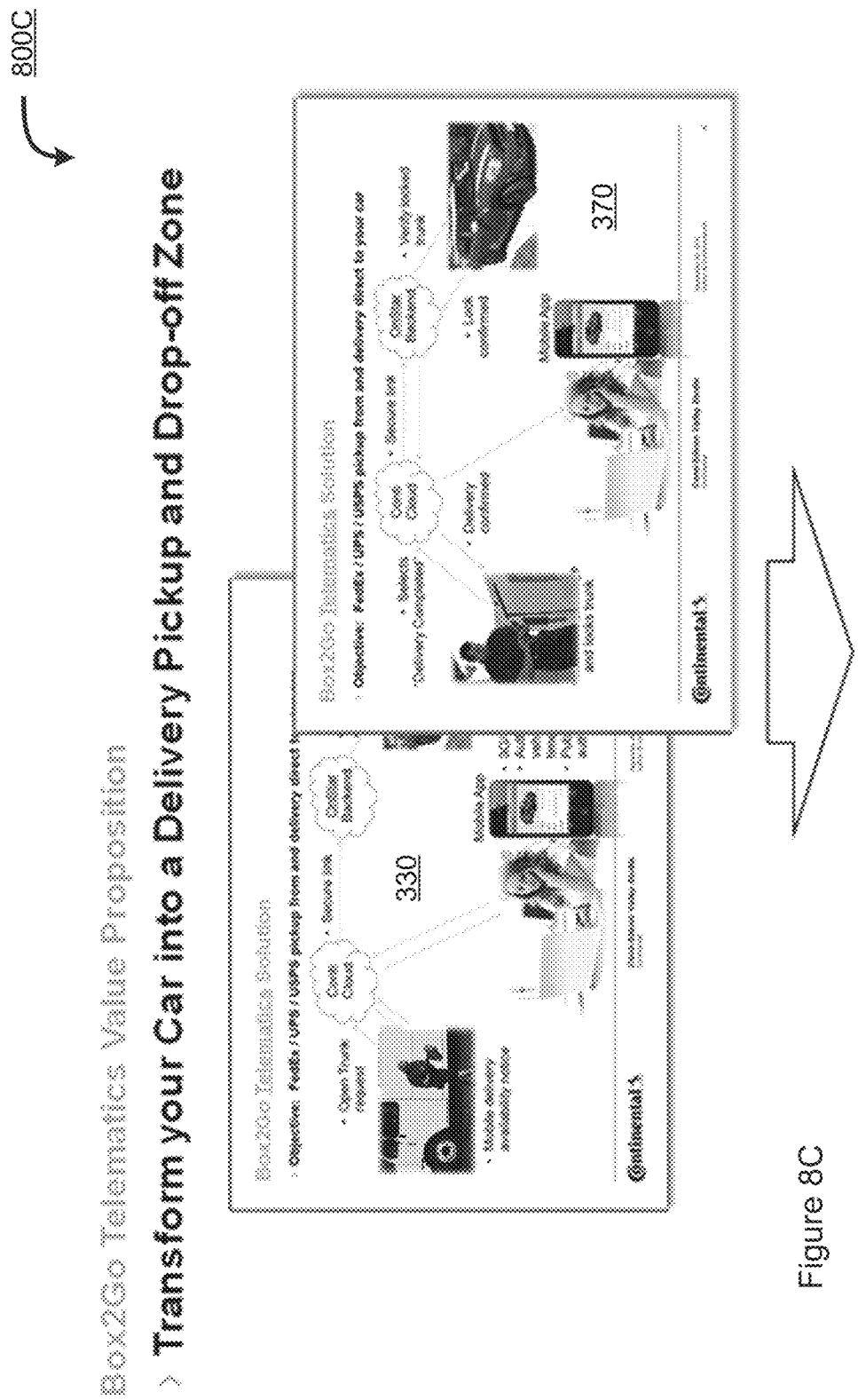
Figure 8D:
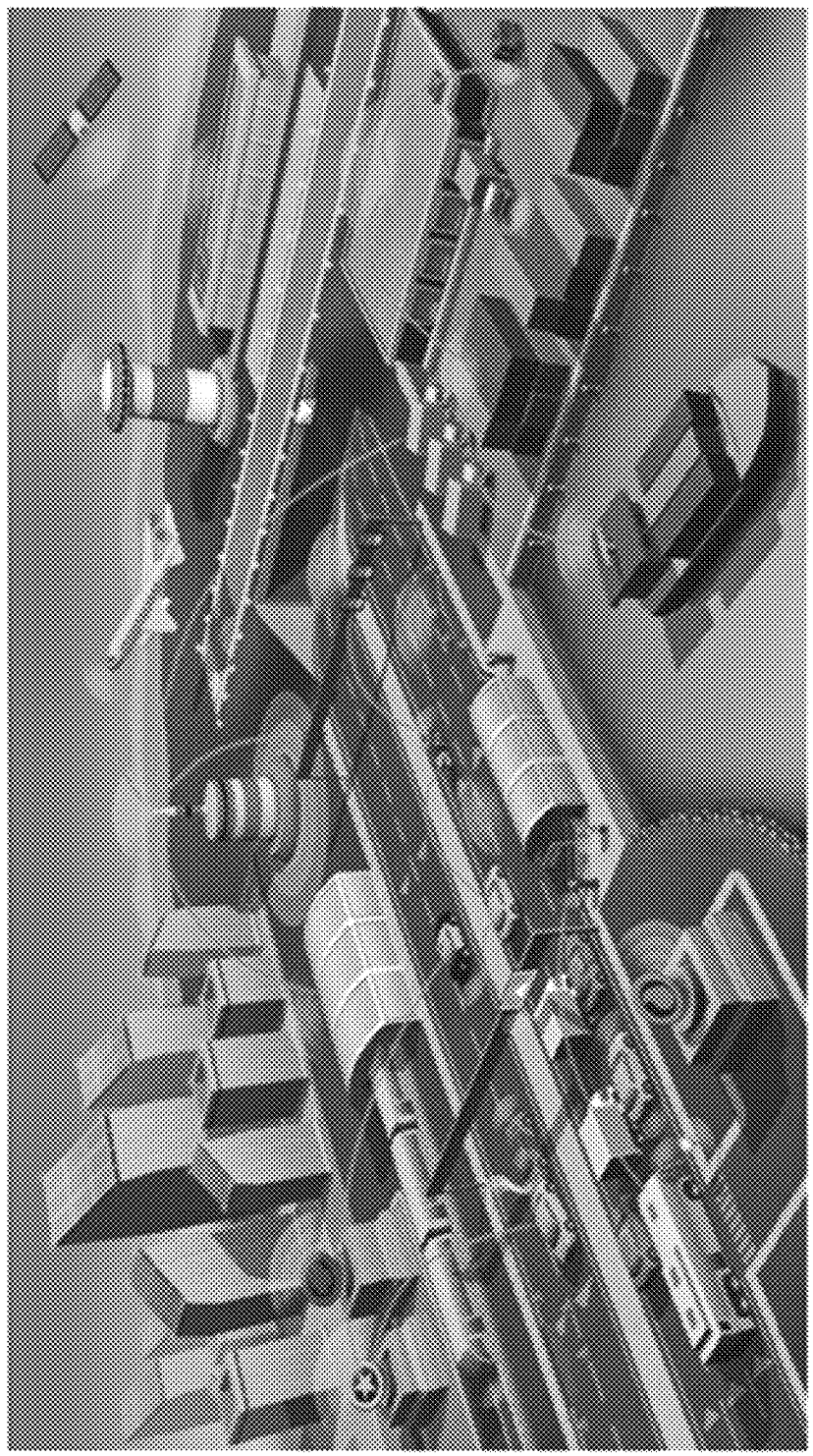

FIG. 7B illustrates flow diagram 750 of the continuation of the package delivery to and pick up from the vehicle process. The cloud based system for a package exchange with a vehicle service 340 continues to receive the GPS coordinates of the package carrier's vehicle 322 along with the virtual car key (752) and monitors the distance to target vehicle 252 (754). Using the authorization key, the cloud based system for a package exchange with a vehicle service 340 can send more wakeup calls (756) to the Telematics provider 310 to prevent the Telematics module of the target vehicle from going to sleep mode. The cloud based system for a package exchange with a vehicle service 340 continues to receive the GPS coordinates of the package carrier's vehicle 322 along with the virtual car key (758) and monitors the distance to target vehicle 252 and when the package carrier's vehicle 322 gets to the vicinity of the target vehicle 252 (e.g., closer than the second threshold distance), the cloud based system for a package exchange with a vehicle service 340 sends an Alert request (762) along with the authorization key to the Telematics provider 310 to cause the target car to turn on the lights, sound the horn, or produce other audio or visual alerts such that the delivery person 304 can notice the target vehicle 252. Then the Telematics provider 310 acknowledges the alert request (763) and sends the request to the target vehicle 252. The delivery person 304 find he target vehicle and sends a request (764) along with the virtual car key to the cloud based system for a package exchange with a vehicle service 340 to unlock the target vehicle and open a door of the target vehicle. The cloud based system for a package exchange with a vehicle service 340 sends the unlock request along with the authorization key to the Telematics provider 310 (766) and then the Telematics provider 310 acknowledges the unlock request (767) and sends the request to the target vehicle 252. The delivery person 304 opens the target vehicle 252 and either delivers a package to the target vehicle or picks up a package from the target vehicle. The delivery person 304 sends a request (768) along with the virtual car key to the cloud based system for a package exchange with a vehicle service 340 to confirm delivery/pick up of the package and request to lock the target vehicle. The cloud based system for a package exchange with a vehicle service 340 sends the lock request along with the authorization key to the Telematics provider 310 (772) and then the Telematics provider 310 acknowledges the lock request (773) and sends the request to the target vehicle 252 and also sends a lock confirmation to the delivery person (774). The cloud based system for a package exchange with a vehicle service 340 further recycles (destroys) the virtual car key (776) and sends a delivery/pickup confirmation (778) to the user 312 via client's mobile application 254 or desktop application 350.

FIG. 7A illustrates block diagram 700 of the timeline of the package delivery to and pick up from the vehicle process. In the timeline, at point 701, the cloud based system for a package exchange with a vehicle service 340 begins monitoring the distance between the package carrier vehicle 322 and the target vehicle 252. Monitoring can include calculating a distance between the target vehicle 252 and package delivery vehicle 322 using the GPS coordinates of the package delivery vehicle and GPS coordinates of the target vehicle. In one embodiment, the distance monitoring can be initiated by receiving a message from the delivery person 304, by a predetermined time before scheduled delivery, and/or at the beginning of the day of delivery. In order to prevent draining the battery, the Telematics module of a vehicle is usually kept in sleep mode when the vehicle is not operated. In the sleep mode, the Telematics module can wake up for example every 10 minutes and to communicate with the Telematics provider (OEM telematics system 310) and check for any commands to execute. Thus, in sleep mode, the Telematics module cannot instantly execute commands and only execute commands when wakes up. In the timeline, at point 702, a message is sent to the Telematics module of the target vehicle 252 to wake up. The wake up message is executed with delay and thus it is sent when the package delivery vehicle 322 is a predefined distance (or predefined amount of time) away from the target vehicle 252 to give the target vehicle enough time to wake up. In the timeline, at point 704, when the package delivery vehicle 322 is in close vicinity of the target vehicle 252 (e.g., in the same parking lot) an alert message is sent to the target vehicle so that the target vehicle does a mechanical operation such as blowing the horn, flashing the light, or activating the alarm system such that the delivery person 304 can notice the target vehicle. As discussed with respect to FIG. 7B, the command to unlock and open the target vehicle, can be sent after the delivery person locates the target vehicle and sends the request 764 to the cloud based system for a package exchange with a vehicle service 340. Optionally and to increase security, the command to unlock and open the target vehicle 252, can be sent after the delivery person locates the target vehicle and sends the request 764 and additionally when the delivery truck 322 or the delivery person 304 gets as close as point 705 to the target vehicle. At point 708, the delivery person 304 delivers the package to the target vehicle or picks up the package from the target vehicle. As discussed with respect to FIG. 7B, after delivery, the delivery person 304 sends the request 768 to close and lock the target vehicle. As shown in the timeline, when the delivery truck drives away from the target vehicle 252 and reaches the point 706, a lock verification message is sent to the target vehicle. Optionally, at point 711 a message is sent by the cloud based system for a package exchange with a vehicle service 340 to the delivery person 304 informing the lock verification. The GPS coordinates of the package delivery application 315 can be used when the delivery person 304 walks away from the delivery truck 322. As discussed with respect to FIGS. 3A, 6A, 6B, and 7B, the communications (724-727) between the cloud based system for a package exchange with a vehicle service 340 and the target vehicle 252 is through the Telematics provider 310. As described, alerting the target vehicle can happen when the delivery person 304 reaches the second threshold distance such as when the delivery person enters a parking lot (e.g., 100 meters) but it is not secure to unlock the target vehicle. Unlocking the target vehicle can happen when the delivery person 304 reaches a much closer distance of the third threshold distance. Additionally and besides satisfying the third threshold distance, the GPS-based proximity module may require an indication from the delivery person 304 that the target vehicle has been located before unlocking the target vehicle 252.

Additionally, the target vehicle can be sent an unlock command to unlock the target vehicle while in a close proximity established by a third threshold distance that is smaller in a preset amount than the second threshold distance between the package carrier's vehicle 322 and the target vehicle 252. FIG. 7A show the timelines. The one or more processors calculate the first threshold distance through the fourth threshold distance. The point 704 corresponds to the second threshold distance and point 705 corresponds to the third threshold distance that is closer to target vehicle than the second distance. The unlocking includes acquiring an unlocking permission by the GPS-based proximity module of the cloud based system 340 by satisfying the third threshold distance as well as satisfying a security measure that the issuing of an unlocking command is occurring only within a preset time window. The GPS-based proximity module of the cloud based system 340 is then configured to transmit the command to unlock to the onboard actuation module in the target vehicle 252, which then is coded to unlock one or more of the doors including unlocking the trunk of the target vehicle. The onboard actuation module in the target vehicle may also be coded to cause the opening of a sun roof of the target vehicle 252.

One or more processors of the cloud based system 340 may calculate the first threshold distance in cooperation with a GPS-based proximity control routine in the GPS-based proximity module and the calculation is based on factors including current traffic data as well as actual distance between the first client device of the package delivery vehicle and the target vehicle. The target vehicle 252 can be unlocked while a close proximity established by a third threshold distance smaller by a preset distance than the second threshold distance between the package delivery vehicle 322 and the target vehicle 252. Also, the one or more processors calculate the third threshold distance and the second threshold distance. The unlocking may include acquiring an unlocking permission by the GPS-based proximity module from the user and satisfying the third threshold distance as well as satisfying a security measure that the issuing of an unlocking command is occurring only within a preset time window. Then the GPS-based proximity module can transmit the unlock command to the on-board actuation module in the target vehicle 252 to unlock one or more of the doors including the trunk of the target vehicle 252. Alternatively, the target vehicle commands of lock, unlock, alert, and wake up can be initiated by a delivery person 304 through a request from the client device of the package delivery vehicle to the security module of the cloud based system 340.

The GPS-based proximity module of the cloud based system 340 can calculate the fourth distance separation threshold with the one or more processors and then send a command to lock the target vehicle 252 while the fourth distance separation threshold between client device associated with the package carrier's vehicle 322 and the target vehicle 252 is satisfied. The locking can include performing a lock verification to check to see if the doors of the target vehicle are indeed locked by the time the fourth distance separation threshold is satisfied. Then, if not locked, to send a command to the on-board actuation module to lock the target vehicle by locking one or more doors of the target vehicle. Locking of the doors can include ensuring the trunk and a sunroof are closed and locked. The lock verification can be performed after the delivery truck 322 has a minimum fourth threshold distance to the target vehicle to make sure delivery person 304 is leaving the area (see, for example, lock verification point 706 on the timeline of FIG. 7A).

Additionally, the security module of the cloud based system 340 can provide one or more application programming interfaces between the servers of two or more package delivery services 302 and the servers of two or more OEM telematics providers 310. The cloud based system 340 can also include a first input socket to receive a first notification about a request for a package delivery to or pick-up from the target vehicle 252 of a user 312 via the one or more application programming interfaces from a first package delivery service. A second module of the cloud based system 340 can be configured to communicate with a database 275 of the cloud based system to store the first notification including a shipping Tracking Number (TN) and a Vehicle Identification Number (VIN) associated with the request and to register the request for the package delivery to or pick-up from the target vehicle 252. The security module of the cloud based system 340 can be configured to, upon registering the package delivery to or pick-up from request, send a second notification to the user 312 via either a mobile application 254 or a desktop application 350 on a client device of the user 312 to confirm with the user a desire to have a package with the shipping TN shipped to or picked-up from the target vehicle with the VIN (see, for example, message 661 of FIG. 6B and message 1006 of FIG. 10). The security module of the cloud based system 340 can also be configured to use the one or more application programming interfaces with the two or more OEM telematics providers 310 to establish wireless communications with an onboard telematics module in the target vehicle 252. The security module can send a command to a first OEM telematics provider via the one or more application programming interfaces to wake the target vehicle's onboard telematics module when the package carrier's vehicle is in close proximity established by the first threshold distance to a target vehicle matching the VIN (see, for example, message 684 of FIG. 6B and message 1026 of FIG. 10). The security module can also be configured to send a command to the first OEM telematics provider 310 via the one or more application programming interfaces to unlock the trunk and/or doors of the vehicle via the vehicle's onboard telematics module when an indication is received that a delivery person is ready to deliver or pick-up the package (see, for example, command 766 of FIG. 7B and command 1042 of FIG. 10). The security module can further be configured to send a lock command to the first telematics provider 310 via the one or more application programming interfaces to lock the trunk and doors of the vehicle via the vehicle's on-board telematics module when the confirmation is received that the delivery person has delivered or picked-up the package (see, for example, command 772 of FIG. 7B and command 1052 of FIG. 10). The security module may send the requests or commands along with either of the second virtual key or the security token such that the telematics provider 310 can use the second virtual key or the security token for authentication of the communication from the security module.

Figure 10:
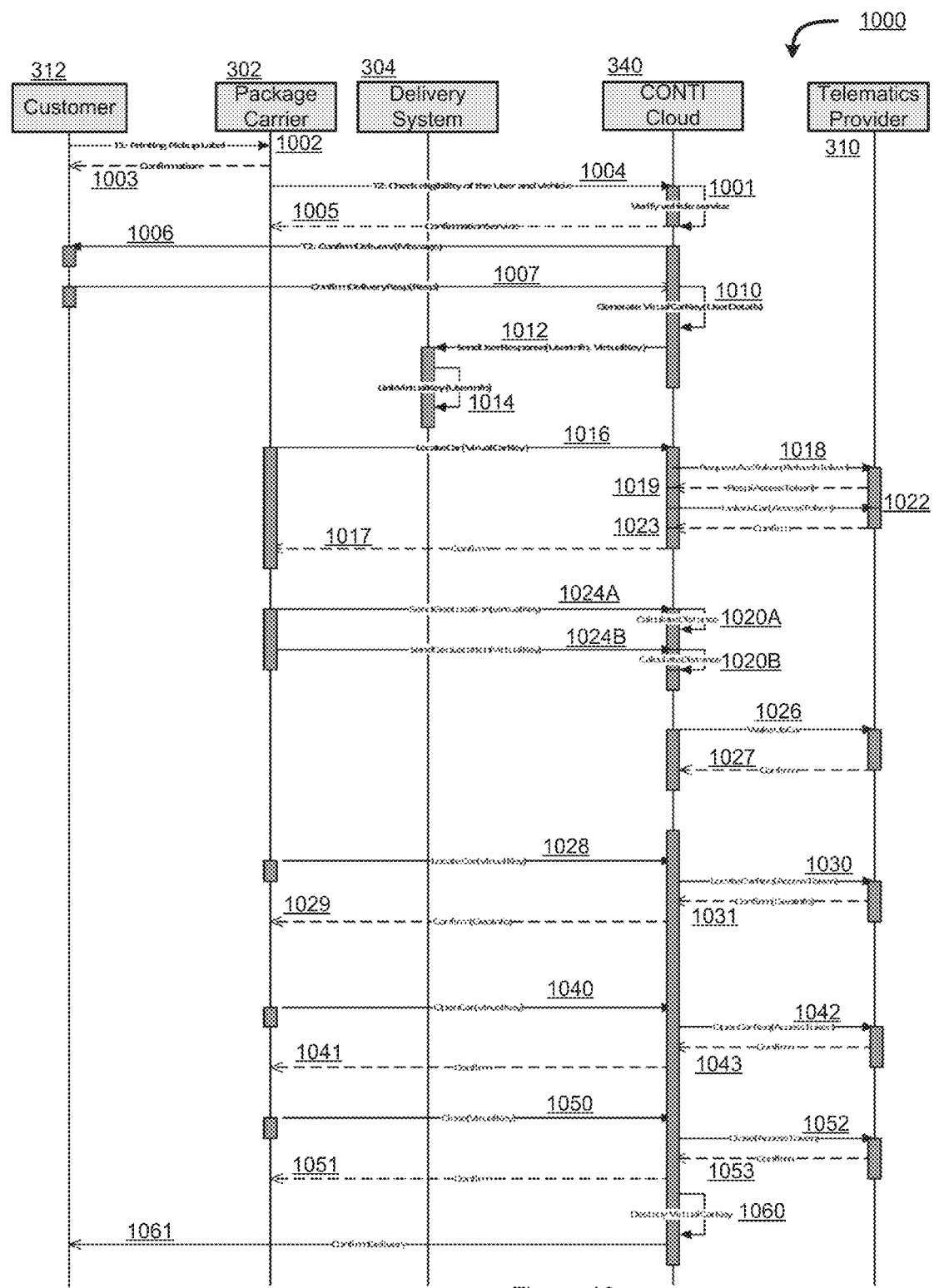
FIG. 10 illustrates a sequence diagram of embodiment of a package pick up from a user of the package exchange with a vehicle service.

FIG. 10 illustrates a sequence diagram 1000 of embodiment of a package pick up from a user of the package exchange with a vehicle service. The diagram 1000 is similar to the combination of diagrams 600, 650, and 750. A user of the cloud-based package exchange with a vehicle service can use the Box2Go application 254 or 350 resident in their client device to arrange a package pickup from their vehicle. The Box2Go application resident in their client device will collect the details and send the information to the cloud-based package exchange with a vehicle service. Additionally, and/or alternatively, a package delivery service web site presents a user interface or web page to collect the details for the user to arrange a package pickup from their vehicle. In diagram 1000, the Telematics provider 310 provides an Access Token to the cloud-based package exchange with a vehicle service to authenticate the message that it receives from cloud-based package exchange with a vehicle service. Likewise, the cloud-based package exchange with a vehicle service provides a virtual car key to the package delivery system 302 as well as package carrier 304 to authenticate the messages it receives from the package delivery system 302 and package carrier 304.

Figure 12:
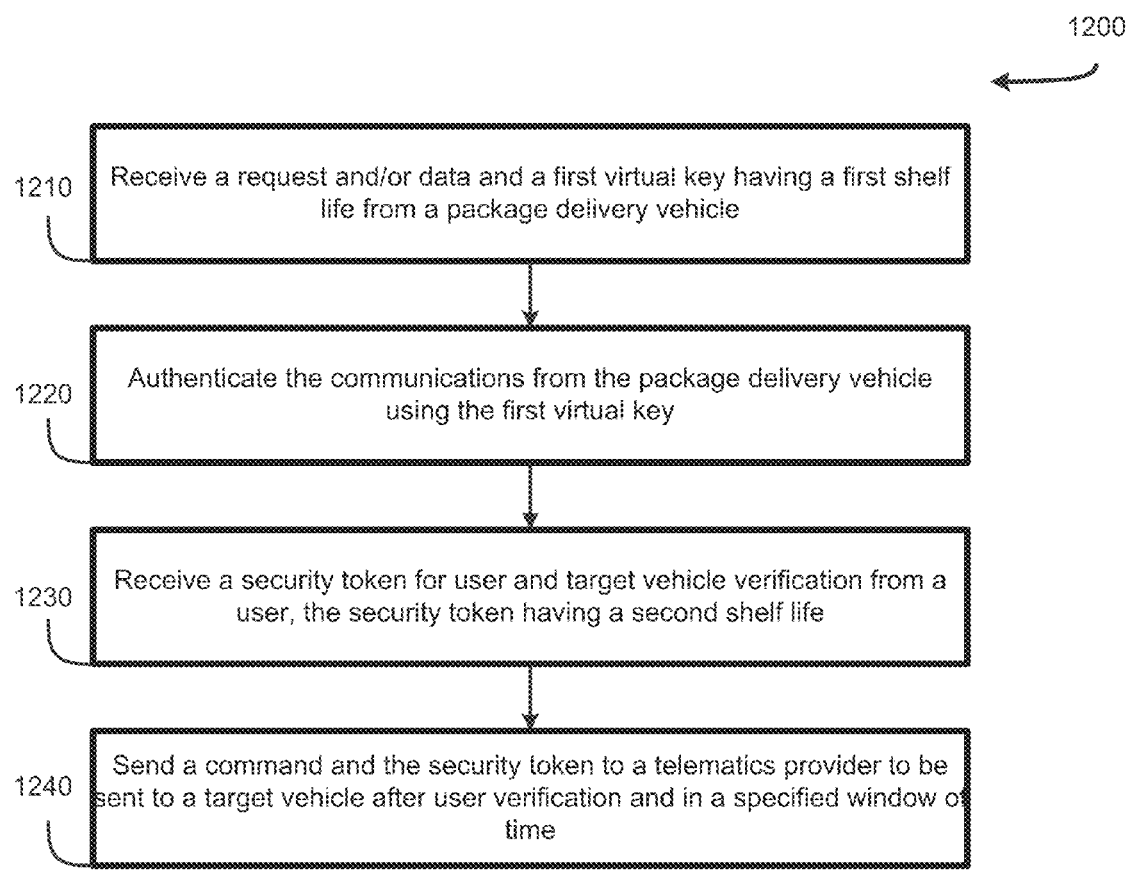
FIG. 12 illustrates a flow graph of an example method of operating a speed delivery, pick-up, and secure package exchange between a package carrier's vehicle and a target vehicle.

FIG. 12 illustrates a flow graph of an example secure method of operating package exchange with a vehicle service between a package delivery vehicle and a target vehicle. The method 1200 can be used for describing the sequence of numbered steps in diagram 990 of FIG. 9D or the flow diagrams 650, 750, and 1000 in FIGS. 6B, 7B, and 10. A request, data, or both, and a first virtual key 935 having a first shelf life is received from a package delivery vehicle (1210). As shown in FIGS. 3A-3C and 9D, the cloud based system for a package exchange with a vehicle service 340 can control and track a package exchange with a vehicle service between a target vehicle 252 and the package delivery vehicle 322. The first virtual key 935 has a first shelf life such that it is only valid in a specific window of time. In an embodiment, the first virtual key is selected from a pool of virtual keys of the cloud based system for a package exchange with a vehicle service 340 which include one or more public keys and their associated private keys such that the first virtual key can be a public key. The first virtual key can be supplied by the security module of the cloud based system for a package exchange with a vehicle service 340 to a package delivery system 302 such as FedEx™, and the package delivery system 302 can send it to a client device of the package delivery vehicle 322 or the package delivery person 304 (see, for example, "CarKey" in commands 668 and 674 of FIG. 6B). Supplying the first virtual key to package delivery system 302 can occur in a secure communication line and first virtual key can be encrypted. In an embodiment, the first virtual key can be unique across time and space such that it is only active in specific window of time and in a specific location of space. In an example, the first shelf time can be assigned by the cloud based system for a package exchange with a vehicle service 340 and the first virtual key can be recycled after the expiration of the first shelf life. Examples of the requests received from the package delivery vehicle are: a request for initiating the package exchange with a vehicle service, a request for sending commands such as a wake up command, an unlock command, or a lock command to the target vehicle. In an example, a request may include delivery data as well. Examples of data are GPS coordinates of the package delivery vehicle or data associated with a delivery including requester's name, tracking number, and VIN of the target vehicle.

The communications from the package delivery vehicle is authenticated using the first virtual key (1220). The first virtual key is provided by the cloud based system to the client device of the package delivery person such that any communication including receiving data or requests from to the package delivery vehicle 322 or the package delivery person 304 can be authenticated (see, for example, "VirtualKey" in commands 1040 and 1050 of FIG. 10). In an example, the first virtual key is a public key and the authentication is performed by the security module of the cloud based system for a package exchange with a vehicle service 340 through matching the public key with an associated private key. Because the security module of the cloud based system for a package exchange with a vehicle service 340 has provided the first virtual key, only the security module knows the associated private key and thus can validate the first virtual key and authenticate the communication. As noted above, the first virtual key can be encrypted by the security module of the cloud based system for a package exchange with a vehicle service 340 before sending and can be received encrypted such that the package delivery system 301, the package delivery vehicle 322, and the package delivery person 304 does not need and cannot decode it.

A security token is received for user and target vehicle verification from a user. The security token has a second shelf life (1230). As described with respect to diagram 990 of FIG. 9D, a user 312 of the cloud based system for a package exchange with a vehicle service 340 logs into his/her account with a telematics provider 310 on a mobile application 254 or a desktop application 350 and send a request 991 for an access/security token 936. The telematics provider 310 verifies the user account and sends the response 992 with the security token 936 to the user 312. The security token can be supplied by the telematics provider through a secure communication connection and the security token 936 can be encrypted. Each time the user 312 or the cloud based system for a package exchange with a vehicle service 340 on behalf of the user sends a command which includes the security token 936 to the telematics provider 310, the security token 936 can be used by the telematics provider to authenticate the user and a user's vehicle registered by the telematics provider. The user 312 can supply the security token 936 through a secure communication 993 to the cloud based system for a package exchange with a vehicle service 340. The cloud based system for a package exchange with a vehicle service 340 can supply a second shelf life to the security token 936. In an embodiment, the cloud based system for a package exchange with a vehicle service 340 uses the security token 936 when sending commands to the telematics provider 310 for performing actions on the target vehicle 252 and the telematics provider 310 uses the security token for verification of the user account (see, for example, commands 1026, 1042 and 1052 of FIG. 10). In an example, the telematics provider renews the security token after receiving a command and sends the renewed security token to the cloud based system for a package exchange with a vehicle service 340 to be used for user verification in the next communication. In another embodiment, the cloud based system for a package exchange with a vehicle service 340 can send the security token 936 prior to sending any command to the telematics provider 310. In response to receiving the security token the telematics provider can verify the user account and supply back a second virtual key such as a public key to the cloud based system for a package exchange with a vehicle service 340 (see, for example, message 679 in FIG. 6B that returns "AuthKey"). The second virtual key can be used for user verification in future communications (see, for example, "AuthKey" in commands 756, 762, 766, and 772 of FIG. 7B).

One or more commands are sent to be executed by an on-board actuation module. After performing the authentication and in an overlap window of time between the first shelf life and the second shelf life, the commands are sent to the on-board actuation module of the target vehicle (1240). If the telematics system is used, the commands are sent along with the security token by the cloud based system for a package exchange with a vehicle service 340 to the telematics provider. The command is sent in a limited window of time which is an overlap window of the first shelf life associated with the first virtual key and the second shelf life associated with the security token. As described before, the telematics provider 310 uses the security token 936 to verify the user account and after verification of the user and the target vehicle sends the command to the target vehicle 252. As shown in FIGS. 7B and 10, the command can include wake up, open, or lock the target vehicle. As described before, in an embodiment, the telematics provider may supply a second virtual key to replace the security token and the second virtual key can be supplied in each communication to the telematics provider 310 and can be used by the telematics provider 310 to verify the user and the user account. In an example, the commands are generated based on requests from the package delivery vehicle and/or initiated by the cloud based system for a package exchange with a vehicle service 340.

Alternatively, the target vehicle may not use any telematics module and instead can use a dongle module. The dongle module can include an RF circuitry of a key fob and can be configured to perform the functional (electro-mechanical) commands by transmitting RF signals that include the functional commands and a valid rolling security key to a Body Control Module (BCM) of the target vehicle of the customer. The dongle module can have the circuitry of a key fob and additionally can be capable of executing an algorithm to generate rolling security keys of the Body Control Module. The dongle module can be taught as an extra key fob. The security token 936 can be a current (first) rolling security key of the Body Control Module (BMC) of the target vehicle 252 that can be sent by the dongle module to a client device of the user.

In an example and for security reasons, the dongle module may not keep the current rolling security key and only sends it to the client device of the user and the user sends it as the security toke 936 to the security module of the cloud based system for a package exchange with a vehicle service 340. The security module of the cloud based system for a package exchange with a vehicle service can send back the current rolling security key and the commands via Wi-Fi or cellular communications to the dongle module and the dongle module can use the current rolling security key to generate a next (second) rolling security key of the Body Control Module (BMC) of the target vehicle 252. Only a correct current rolling security key can generate a valid next rolling security key of the BMC. Thus, including the current rolling security key with the commands sent via Wi-Fi or cellular communications to the dongle module, is a method of authenticating the received commands.

In an example, the target vehicle may not use any telematics or dongle module and instead can use the current rolling security key of an existing key fob of the target vehicle as the security token 936. The key fob of the target vehicle can be enabled to transmit its current security key to the client device of the user and the user sends it as the security toke 936 to the security module of the cloud based system for a package exchange with a vehicle service 340. The security module of the cloud based system for a package exchange with a vehicle service 340 can use the current rolling security key and generate a corresponding next rolling security key. Then security module of the cloud based system for a package exchange with a vehicle service 340 can send the next rolling security key and the commands via Wi-Fi or cellular communications to a client device of a package delivery person or a package delivery vehicle. The client device of a package delivery person or a package delivery vehicle can be equipped with a universal key fob and RF circuitry such that it can transmit, via RF circuitry, the electro-mechanical commands and the next rolling security key to the BCM of the target vehicle 252.

Registration and Purchase

There are multiple time periods and methods (described below) a customer can select to register with the package exchange with a vehicle service. Upon registering, a first database in the one or more databases may be also configured to contain and index information regarding for each user including: User ID and password for the package exchange with a vehicle service, User name, email, etc., security questions, vehicle VIN, vehicle model, color and year, and other similar information.

When purchasing a new car at the dealership with a telematics system built into the vehicle the following steps are performed: i) the customer is offered to sign-up for the package exchange with a vehicle service, ii) the customer signs up for the Box2Go service application in the cloud-based package exchange with a vehicle service using a paper form and the customer downloads the Box2Go mobile app into their client device, iii) the customer logs-in to the Box2Go mobile app at least once to activate the Box2Go service application in the cloud-based package exchange with a vehicle service. Next, the cloud-based package exchange with a vehicle service automatically tracks the Authentication Key and Refresh Key for the user and stores it as part of the registration.

A customer may register using the Box2Go Application by i) using the Box2Go app to sign up, ii) Box2Go collects the registration information for the telematics system site (e.g. OnStar's Backend site) from the user and passes it to the telematics system site, (Box2Go mobile application or the cloud-based package exchange with a vehicle service does not store this information in the cloud system), iii) the telematics system site finishes the registration and returns the Authentication Key and Refresh Key, and lastly iv) the cloud-based package exchange with a vehicle service stores the Authentication Key and Refresh Key as part of the registration.

When an already existing User registers, the Box2Go app collects the username and password from the telematics system site customer, Box2Go signs up the customer, and the telematics system site returns the Authentication Key and Refresh Key. The cloud-based package exchange with a vehicle service stores the Authentication Key and Refresh Key as part of the registration.

The shopping experience may be as follows. While shopping at a retail store, at checkout, the customer will i) purchase a product on a retail website e.g. Amazon, Best-Buy, eBay, etc., ii) be offered an option on the user interface to have the purchased items delivered to his car using the Box2Go service application in the cloud-based package exchange with a vehicle service, iii) selects the delivery method as "Box2Go Delivery," to have the package delivered to the vehicle, iv) optionally, selects the expected location of the vehicle to be either work or home, and v) checks-out and places the order with the retailer. The retailer will fulfill the order and prepare the package for delivery and delivers the package with a delivery service provider like FedEx.

The delivery service provider's Box2Go Delivery Process may include use cases with communications via Wi-Fi hotspots, the telematics solution, and blue tooth exchanges between the internal intelligent software in the vehicle itself and the downloaded application resident in the client device. Thus, the GPS-based delivery application is downloadable or otherwise electronically distributed such as contained in flash drive type of computer readable medium to the client device from a database in the cloud based server.

For packages marked for "Box2Go Delivery", the delivery service provider initiates a query process for the delivery of the package with the package exchange with a vehicle service in the cloud. The package exchange with a vehicle service cloud verifies the customer information who requested the package delivery in its system and confirms that the customer has the Box2Go service application in the cloud-based package exchange with a vehicle service available to allow for such a delivery. The package exchange with a vehicle service cloud then sends verification back to the delivery service provider's site that the customer can accept a Box2Go delivery.

Shipping Experience—Delivery Planning

Prior to the delivery service provider's route planning, the cloud-based package exchange with a vehicle service sends a push message (preferably early in the morning) to the customer's cell phone of the Customer requesting confirmation for the vehicle delivery for the package with the Order details. The Customer confirms the vehicle delivery option by sending a message back to the cloud-based package exchange with a vehicle service. The customer may notice a push-message for Box2Go application. Once the cloud-based package exchange with a vehicle service receives the customer's confirmation for the car delivery, the cloud-based package exchange with a vehicle service will generate a virtual Car Key. The cloud-based package exchange with a vehicle service sends a virtual Car Key to the delivery service provider server. The virtual Car Key is issued with a limited shelf life and will expire even if not used within a defined amount of time, such as 4 hours. Note, the dual key security protects against if either the virtual Car key or access token are compromised. The limited shelf life expiration protects against if BOTH the virtual Car Key and access token are compromised, they are only valid for a limited window of time established by the cloud-based package exchange with a vehicle service. Thus, the security of the vehicle is protected in multiple ways. The delivery service provider system then links the virtual Car Key to the delivery order. The delivery service provider systems are then ready to execute the package delivery to the Customer's vehicle.

Pre-Delivery

The delivery service provider prepares the Box2Go package to be delivered to the customer's car. The delivery service provider plans the delivery route based on either the address selected for Box2Go delivery at the time of checkout or the current location of the vehicle. On delivery day, the delivery service provider's delivery vehicle looks up the virtual Car Key associated with the order in the Box2Go app. The delivery service provider contacts the cloud-based package exchange with a vehicle service to get the location of the car. The cloud-based package exchange with a vehicle service then receives the last known location of the car and sends it back to the delivery service provider's Box2Go app. If the current location of the vehicle is in his delivery zone, the delivery service provider's system moves ahead with the delivery. If the vehicle to deliver to is not in the delivery zone, then that delivery is skipped and marked for differed mail delivery.

Real-Time Tracking of the Delivery Service Provider's Vehicle

While tracking the delivery service provider's delivery vehicle driving toward the delivery location, an application in the delivery vehicle can notify the cloud-based package exchange with a vehicle service of the delivery vehicle's location. The cloud-based package exchange with a vehicle service anticipates the delivery of a package to the car and wakes up the vehicle's system by issuing a command. When the delivery service provider's vehicle approaches near the car (like 100 meters), the cloud-based package exchange with a vehicle service automatically alerts the vehicle and the vehicle starts flashing lights and beeps a few times. This helps the delivery service provider's driver to locate the exact vehicle in a parking lot.

To unlock the car once delivery service provider's delivery reaches the car, the application used by the delivery person uses the Box2Go app to send an Unlock command. The cloud-based package exchange with a vehicle service intercepts this command and issues an Unlock command to the telematics system site. The telematics system site triggers an unlock request in the car's telematics module by sending this Unlock command to electromechanically unlock a trunk or door of the vehicle.

The delivery person places the package inside the customer's car, closes the car door/trunk, and then uses the Box2Go app to send a lock command. Like above, the cloud-based package exchange with a vehicle service intercepts this command and issues a Lock command to the telematics system site. The telematics system site triggers a lock request in the car's telematics module by sending the lock command.

A confirmation message is sent from the package exchange with a vehicle service to the delivery service provider's server and to the customer on the Box2Go app on the customer's cell phone. The delivery process is completed when the package exchange with a vehicle service destroys the virtual CarKey for the order.

Revenue

FIGS. 8A-8D illustrate block and flow diagrams 800A, 800B, 800C, and 800D of embodiment of the value proposition of the alternative delivery system. As discussed above, the user/customer may pay an additional fee on a per delivery/per pick-up instance to use the package exchange with a vehicle service. The user/customer may pay a monthly or yearly subscription fee for all deliveries and pick-ups of packages to use the package exchange with a vehicle service. The user/customer may pay on another usage case model. A revenue sharing agreement may be in place between the retailer, the package exchange with a vehicle service, the delivery service provider, and the OEM provider. The delivery service may subsidize the delivery of packages to increase volume, make package delivery more efficient, and eliminate re-delivering of packages. For example, in a survey of United Kingdom deliveries, 12% of deliveries failed first time. This costs the delivery industry $1.3 billion in re-deliveries per year. Advertisers may also subsidize the delivery of packages by placement of advertisements in the order placing and delivery process. Combinations of the above may be used in the revenue generating processes for using the package exchange with a vehicle service. The backend servers of the delivery service, the package exchange with a vehicle service, and retailer sites collect and distribute the compensation.

Computing System

FIG. 1 illustrates a block diagram 800 of an example computing system that may be used in an embodiment of one or more of the servers, in-vehicle electronic modules, and client devices discussed herein. The computing system environment 800 is only one example of a suitable computing environment, such as a client device, server, in-vehicle electronic module, etc., and is not intended to suggest any limitation as to the scope of use or functionality of the design of the computing system 810. Neither should the computing environment 800 be interpreted as having any dependency or requirement relating to any one or combination of components illustrated in the exemplary operating environment 800.

With reference to FIG. 1, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing system 810 typically includes a variety of computing machine readable media. Computing machine readable media can be any available media that can be accessed by computing system 810 and includes both volatile and nonvolatile media, removable and non-removable media. By way of example, and not limitation, computing machine readable mediums uses include storage of information, such as computer readable instructions, data structures, other software or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 800. However, carrier waves would not fall into a computer readable medium. Communication media typically embodies computer readable instructions, data structures, program modules, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or software that are immediately accessible to and/or presently being operated on by processing unit 820. By way of example, and not limitation, FIG. 1 illustrates operating system 834, other software 836, and program data 837.

The computing system 810 may also include other removable/non-removable volatile/nonvolatile computer storage media. By way of example only, FIG. 1 illustrates a hard disk drive 841 that reads from or writes to non-removable, nonvolatile magnetic media nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 1, provide storage of computer readable instructions, data structures, other software and other data for the computing system 810. In FIG. 1, for example, hard disk drive 841 is illustrated as storing operating system 844, other software 846, and program data 847. Note that these components can either be the same as or different from operating system 834, other software 836, and program data 837. Operating system 844, other software 846, and program data 847 are given different numbers here to illustrate that, at a minimum, they are different copies.

A user may enter commands and information into the computing system 810 through input devices such as a keyboard 862, a microphone 863, a pointing device 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a video interface 890. In addition to the monitor, computing devices may also include other peripheral output devices such as speakers 897 and other output device 896, which may be connected through an output peripheral interface 890.

The computing system 810 may operate in a networked environment using logical connections to one or more remote computers/client devices, such as a remote computing device 880. The remote computing device 880 may be a personal computer, a hand-held device, a server, a router, a network PC, a peer device or other common network node, and typically includes many or all of the elements described above relative to the computing system 810. The logical connections depicted in FIG. 1 include a local area network (LAN) 871 and a wide area network (WAN) 873, but may also include other networks. Such networking environments are commonplace in offices, enterprise-wide computer networks, intranets and the Internet. A browser application may be resident in the computing device and stored in the memory.

When used in a LAN networking environment, the computing system 810 is connected to the LAN 871 through a network interface or adapter 870. When used in a WAN networking environment, the computing system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, other software depicted relative to the computing system 810, or portions thereof, may be stored in the remote memory storage device. By way of example, and not limitation, FIG. 1 illustrates remote application programs 885 as residing on remote computing device 880. It will be appreciated that the network connections shown are exemplary and other means of establishing a communications link between the computing devices may be used.

As discussed, the computing system may include a processor, a memory, a built in battery to power the computing device, an AC power input, potentially a built-in video camera, a display screen, a built-in Wi-Fi circuitry to wirelessly communicate with a remote computing device connected to network.

It should be noted that the present design can be carried out on a computing system such as that described with respect to FIG. 1. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless security module 872 may employ a Wireless Application Protocol to establish a wireless communication channel. The wireless security module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Vehicle's Intelligent Transport Systems to Integrate with a Connected Network Environment A vehicle has hardware and software that can take control of the vehicle for a short period including activating electromechanical mechanisms that are part of the vehicle. The vehicle has hardware and software for networking between the clouds as well as potentially between other vehicles to cause related automation within the vehicle based on communications between the vehicle and the cloud and/or other vehicles. The vehicle's Cellular Interface system is configured to allow cellular phones access the automobile computer systems, interpret the information and show the text on the cellular phones display while simultaneously transmitting the retrieved information, as well as characteristic and states of the cellular phone used to access the vehicle computer system, to a global network that would alert parties who could assist or benefit from the retrieved automobile information. A cellular phone with a software application can establish a connection with the vehicle's on-board diagnostic computer and/or other on-board intelligent control systems.

The system can interface with a client device, such as a mobile phone, with the on-board computing system in the vehicle. The on-board diagnostic computing device may monitor a set of operational characteristics of a vehicle and communicate that diagnostic to both the driver and with the cloud. The information derived from this system can also be conveyed and processed on a mobile client device coupled with additional information and displayed on the mobile client device's display screen, while simultaneously transmitting this information over the Internet to be stored in a database.

At the point of communication negotiation, an application on the client device extracts position location from the vehicle's navigation system and transmits the response from the vehicle's navigation system and the location to a server ready to receive this information. Alternatively, an application can extract similar position information from GPS module internal to the client device itself.

In an embodiment, the standard for the automotive industry for vehicles may use is the SAE J1850 communications protocol, which utilizes variable pulse width modulation and pulse width modulation. This means that the width of the pulse determines whether it is a 1 or a 0. Most phones form communication with serial connections (RS-232, Infrared . . . etc.) and wireless connection protocols (Bluetooth, Infrared . . . etc.). These two protocols must be converted or bridged by some sort of microprocessor so the two communication methodologies can communicate with each other. This can be accomplished by using an integrated circuit that can be used to convert the OBD-II signal (which includes different protocols such as, but not limited to: J1850 VPW, J1850 PWM, ISO 9141-2, ISO 14230, ISO 15765) to one of the aforementioned phone communication formats.

Network Environment

FIGS. 2A-2B illustrate block diagrams of embodiments of the package exchange with a vehicle service hosted on a cloud-based provider site. The cloud-based package exchange with a vehicle service is hosted on a cloud-based provider site that contains one or more servers and one or more databases. FIG. 2A illustrates diagram 200 of a network environment in which the techniques described may be applied. The network environment 200 has a communications network 220 that connects server computing systems 204A through 204E, and at least one or more client computing systems 202A, 202B. As shown, there may be many server computing systems 204A through 204E and many client computing systems 202A through 202B connected to each other via the network 220, which may be, for example, the Internet. Note, that alternatively the network 220 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 202A and the server computing system 204A can both initiate and respond to communications, their communication may be viewed as peer-to-peer. Likewise, communications between the client computing systems 204A and 204-2, and the server computing systems 202A and 202B may be viewed as peer-to-peer if each such communicating device is capable of initiation and response to communication. Additionally, server computing systems 204A-204E also have circuitry and software to communication with each other across the network 220. One or more of the server computing systems 204A to 204E may be associated with a database such as, for example, the databases 206A to 206E. Each server may have one or more instances of a virtual server running on that physical server and multiple virtual instances may be implemented by the design. A firewall may be established between a client computing system 200A and the network 220 to protect data integrity on the client computing system 200A. Each server computing system 204A-204E may have one or more firewalls.

FIG. 2B illustrates block diagram 250 of an embodiment of the package exchange with a vehicle service hosted on a cloud-based provider site. The web server farm 270 may have examples of 4 servers, each including one or more processors, coupled to databases 275 which may have examples of 2 database clusters. A user can download and use either i) a vehicle package delivery/pickup mobile application 254 or ii) a vehicle package delivery/pickup desktop application 350 on their client device to register with the cloud based system for a package exchange with a vehicle service 340 (see, for example, FIG. 3B). The cloud-based package exchange with a vehicle service hosted on a cloud-based provider site contains one or more servers and one or more databases. The one or more databases store at least i) User ID and Password for the package exchange with a vehicle service, ii) User name, iii) email or contact phone number of the user, iv) Security questions, v) Vehicle VIN, vi) Vehicle make, model, color, year, and vii) any combination of at least three of these. In one embodiment, the cloud based network 260 is configured to communication with 1) a user's mobile application 254, 2) a retailer website 258, 3) a telematics module of vehicle 252, via a secure connection 256 from a telematics provider to vehicle 252, and 4) a package delivery vehicle 262. The cloud based network 260 includes/is coupled to servers 270 which are protected by an external firewall 264 from the users and providers. The cloud based network 260 also includes/is coupled to databases 275 which are protected by an internal firewall 266 from the servers 270.

Thus, the GPS-based proximity module is hosted on a cloud-based provider site that contains one or more servers 270 including the cloud based server and one or more databases 275. The servers cooperate with the one or more databases to store the data and reference information needed to control and track the package transfer process, to speed up the package delivery and pick-up process, and to ensure security for the package exchange process. The on-board actuation module of the target vehicle is an on-board telematics module. One or more servers present one or more application programming interfaces to provide a single common end-to-end solution between servers of one or more package delivery services 302 and servers of one or more OEM telematics providers 310 without additional hardware required to be installed in the target vehicle.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicate use of these resources. The user's cloud based site is given a virtual amount of dedicated space and bandwidth in the cloud. Cloud applications can be different from other applications in their scalability—which can be achieved by cloning tasks onto multiple virtual machines at run-time to meet changing work demand. Load balancers distribute the work over the set of virtual machines. This process is transparent to the cloud user, who sees only a single access point.

The cloud-based package exchange with a vehicle service is coded to utilize a protocol, such as Hypertext Transfer Protocol (HTTP), to engage in a request and response cycle with both a mobile device application resident in a client device as well as a web-browser application resident in the client device. The cloud-based package exchange with a vehicle service has one or more routines to automate a package delivery to and pick up from the vehicle process. The cloud-based package exchange with a vehicle service can be accessed by a mobile device, a desktop, a tablet device and other similar devices, anytime, anywhere. Thus, the cloud-based package exchange with a vehicle service hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident in a client device and the cloud-based package exchange with a vehicle service, and 5) combinations of these.

The cloud-based package exchange with a vehicle service has one or more application programming interfaces (APIs) with two or more of the package delivery entity sites, such as FedEx, UPS, etc., as well as application programming interfaces with two or more of the OEM 'remote access/connectivity' systems, such as telematics system sites, such as OnStar, Lexus Linksys, Ford Sync, Uconnect, MBConnect, BMWConnect, etc. The APIs may be a published standard for the connection to each OEM 'remote access/connectivity' system. The APIs may also be an open source API. One or more of the API's may be customized to closed/non-published APIs of a remote access/connectivity' site and/or package delivery entity site. The cloud-based package exchange with a vehicle service is coded to establish a secure communication link between each package delivery entity site and the cloud provider site. The cloud-based package exchange with a vehicle service is coded to establish a secure communication link between each telematics system site and the cloud provider site. The software service is coded to establish the secure communication link by creating a tunnel at the socket layer and encrypting any data while in transit between each package delivery entity sites and the provider site as well as to satisfy any additional authentication mechanisms required by the direct lending institution, including but not limited to IP address white listing and token based authentication.

In an embodiment, the server computing system 204 may include a server engine, a web page management component, a content management component and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. is discussed. An application including any program modules, when executed on the server computing system 204A, causes the server computing system 204A to display windows and user interface screens on a portion of a media space, such as a web page. A user via a browser from the client computing system 200A may interact with the web page, and then supply input to the query/fields and/or service presented by a user interface of the application. The web page may be served by a web server computing system 204A on any Hypertext Markup Language (HTML) or Wireless Access Protocol (WAP) enabled client computing system 202A or any equivalent thereof. For example, the client mobile computing system 202A may be a smart phone, a touch pad, a laptop, a netbook, etc. The client computing system 202A may host a browser to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 202A. The applications then serve pages that allow entry of details and further pages that allow entry of more details.

Telematics System

The telematics system uses telecommunications, vehicular technologies, electrical sensors, instrumentation, and wireless communications modules to allow communication with between the cloud and a vehicle. The telematics system site sends, receives and stores information via a telematics module to affect control on objects in the vehicle. Telematics includes but is not limited to Global Positioning System technology integrated with computers and mobile communications technology in automotive navigation systems. Telematics also includes cloud-based interaction with an integrated hands-free cell phone system in the vehicle, wireless safety communication system in the vehicle, and automatic driving assistance systems.

A wireless communication circuit exchanges communication between the mobile client device and the vehicle. The wireless communication circuit executes instructions with the processor via a bus system. The wireless communication circuit can be configured to communicate to RF (radio frequency), satellites, cellular phones (analog or digital), Bluetooth®V, Wi-Fi, Infrared, Zigby, Local Area Networks (LAN), WLAN (Wireless Local Area Network), or other wireless communication configurations and standards. The wireless communication circuit allows the vehicle's intelligence systems such as the telematics module and other diagnostic tools to communicate with other devices wirelessly. The wireless communication circuit includes an antenna built therein and being housed within the housing or can be externally located on the housing.

The Telecommunications and Informatics applied in wireless technologies and computational systems may be based on 802.11p. The IEEE standard in the 802.11 family and also referred to as Wireless Access for the Vehicular Environment (WAVE) is the primary standard that addresses and enhances Intelligent Transportation System.

An example telematics module sends commands and exchanges information other electronic circuits, electromechanical devices, and electromagnetic devices in the vehicle. The telematics module may operate in conjunction with computer-controlled devices and radio transceivers to provide precision repeatability functions (such as in robotics artificial intelligence systems) and emergency warning performance systems located in and exchanged between vehicles.

Additional intelligent vehicle technologies are car safety systems and self-contained autonomous electromechanical sensors to generate warnings that can be transmitted within a specified targeted area of interest, say within 100 meters of the emergency warning system for vehicles transceiver. In ground applications, intelligent vehicle technologies are utilized for safety and commercial communications between vehicles or between a vehicle and a sensor along the road.

The wireless communication circuits in the vehicle or in a client device are configured to give access to the mobile Internet via a cellular telephone service provider. The mobile Internet is wireless access that handoffs the mobile client device or vehicle from one radio tower to another radio tower while the vehicle or device is moving across the service area. Also, in some instances Wi-Fi may be available for users on the move so that a wireless base station connects directly to an Internet service provider, rather than through the telephone system.

Scripted Code

In regards of viewing ability of an on-line site: the scripted code for the on-line site, such as a website, social media site, etc., is configured to adapted to be i) viewed on tablets and mobile phones, such as individual downloadable applications in data stores that are designed to interface with the on-line site, ii) viewable on a screen in the vehicle, as well as iii) viewable on a screen of a desktop computer via a browser. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like.

Mobile web applications and native applications can be downloaded from a cloud-based site. The mobile web applications and native applications have direct access to the hardware of mobile devices (including accelerometers and GPS chips), and the speed and abilities of browser-based applications. Information about the mobile phone and the vehicle's location is gathered by software housed on the phone.

One or more scripted routines for the cloud-based package exchange with a vehicle service are configured to collect and provide features such as those described herein.

Any application and other scripted code components may be stored on a non-transitory computing machine readable medium which, when executed on the server causes the server to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

The design is also described in the general context of computing device executable instructions, such as applications etc. being executed by a computing device. Generally, programs include routines, objects, widgets, plug-ins, and other similar structures that perform particular tasks or implement particular abstract data types. Those skilled in the art can implement the description and/or figures herein as computer-executable instructions, which can be embodied on any form of computing machine readable media discussed herein.

Some portions of the detailed descriptions herein are presented in terms of algorithms/routines and symbolic representations of operations on data bits within a computer memory. These algorithmic descriptions and representations are the means used by those skilled in the data processing arts to most effectively convey the substance of their work to others skilled in the art. An algorithm/routine is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms/routine of the application including the program modules may be written in a number of different software programming languages such as C, C++, Java, HTML, or other similar languages.

Many online pages on a server, such as web pages, are written using the same language, Hypertext Markup Language (HTML), which is passed around using a common protocol—HTTP. HTTP is the common Internet language (dialect, or specification). Through the use of a web browser, a special piece of software that interprets HTTP and renders HTML into a human-readable form, web pages authored in HTML on any type of computer can be read anywhere, including telephones, PDAs and even popular games consoles. Because of HTTP, a client machine (like your computer) knows that it has to be the one to initiate a request for a web page; it sends this request to a server. A server may be a computing device where web sites reside—when you type a web address into your browser, a server receives your request, finds the web page you want, and sends it back to your desktop or mobile computing device to be displayed in your web browser. The client device and server may bilaterally communicate via a HTTP request & response cycle between the two.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Although embodiments of this design have been fully described with reference to the accompanying drawings, it is to be noted that various changes and modifications will become apparent to those skilled in the art. Such changes and modifications are to be understood as being included within the scope of embodiments of this design as defined by the appended claims. The invention is to be understood as not limited by the specific embodiments described herein, but only by scope of the appended claims.

What is claimed is:

1. A cloud based system for a package exchange with a vehicle service between a package delivery vehicle and a target vehicle, comprising:
one or more servers having one for more hardware processors, one or more ports, and configured to cooperate with one or more databases in the cloud based system;
a security module of the one or more servers running on the one or more processors and configured to receive a first virtual key via a first port and one of 1) a request for the package exchange with the vehicle service, 2) data, or 3) both, from a first client device associated with the package delivery vehicle,
where the first virtual key having a first shelf life to limit at least activation of an on-board actuation module installed in the target vehicle and is stored in a first database of the cloud based system, and
where the first virtual key is used by the security module for a first authentication of communications from the first client device;

where the security module is further configured to receive a security token associated with both a user and the target vehicle from a second client device associated with the user, the security token having a second shelf life, where the security token is used for a verification of the user and the target vehicle; and wherein the security module is configured to send to any of i) the first client device, ii) one or more application programming interfaces of a server of the third party site or iii) internally to another module within the cloud based system for the package exchange with the vehicle service the security token for the verification and one or more commands regarding the target vehicle to be executed, after the first authentication and in an overlap window of time between the first shelf life and the second shelf life, where the security module is configured to send the one or more commands regarding the target vehicle 1) based on the request from the first client device, or 2) initiated by the security module, where the security module is configured to send the one or more commands regarding the target vehicle over a network to either a local client device or over the network via the one or more application programming interfaces of the server of the third party site to the on-board actuation module of the target vehicle, where in response to the one or more commands, the on-board actuation module is configured to cause an electro-mechanical operation in the target vehicle to any of i) open up a door, a window, or a trunk of the target vehicle, ii) unlock the door or the trunk of the target vehicle, and iii) any combination of these two, so that the package delivery vehicle can perform the package exchange with the target vehicle.

2. The cloud based system of claim 1, wherein the on-board actuation module is one of:

1) an on-board telematics module coupled to a network of a telematics provider, where using user's credentials and after a user login through the second client device to the telematics provider, in response to a user request, the telematics provider is configured to provide the security token to the second client device of the user via a first secure communication;

wherein before sending a command on behalf of the user to the telematics provider, the security module is configured to send the security token to a server of the telematics provider, where the security token is used by a verification module running on one or more servers of a telematics provider to verify the user and the target vehicle, where in response to receiving the security token and after the verification, the telematics provider supplies, via a second secure communication, a second virtual key to the security module to be used for authenticating communications from the security module to the telematics provider; and wherein the security module is configured to send the second virtual key and the commands to the telematics provider, where the one or more servers of the telematics provider perform a second authentication using the second virtual key before sending the commands to the on-board telematics module in the target vehicle;

2) an on-board dongle module having a Wi-Fi or cellular communication circuit configured to establish a secure communication with the security module to receive the commands and the security token via the local client device, where the on-board dongle module includes an RF circuitry of a key fob and is configured to perform the commands by transmitting RF signals that include the commands to a Body Control Module (BCM) of the target vehicle of the customer, where the security token is a rolling security key of the BCM that is included in the transmitted signals and is use by the BMC for verifying the authentication of the commands; or 3) an on-board RF module having a radio frequency communication circuit configured to establish a secure communication with the security module to receive the commands and the security token via the local client device, where the on-board RF module includes the radio frequency communication circuit of a key fob and is configured to perform the commands by transmitting RF signals.

3. The cloud based system of claim 2, further comprising:

a GPS-based proximity module that includes the security module;

wherein the GPS-based proximity module is configured to run on the one or more processors and to control and track a package exchange process, to speed up a package delivery and pick-up process, and to ensure security for the package exchange process, where the GPS-based proximity module is configured to receive both current GPS coordinates associated with the package delivery vehicle from the first client device and current GPS coordinates associated with the target vehicle from the on-board actuation module and to monitor a distance between the package delivery vehicle and the target vehicle for at least one of a package delivery to the target vehicle and a package pick-up from the target vehicle, where after receiving the second virtual key and in the overlap window of the first shelf life and the second shelf life, the security module of the GPS-based proximity module is configured to send to the target vehicle the one or more commands including 1) to wake-up the on-board telematics module in the target vehicle while in a close proximity established by a first threshold distance between the package delivery vehicle and the target vehicle, 2) to give an alert from the target vehicle while in a close proximity established by a second threshold distance between the package delivery vehicle and the target vehicle, 3) to unlock the door including the trunk of the target vehicle, or 4) to lock doors of the target vehicle after receiving a confirmation of the package exchange process from the first client device associated with the package delivery vehicle and establishing a fourth separation distance between the package delivery vehicle and the target vehicle.

4. The cloud based system of claim 3, wherein the GPS-based proximity module is hosted on the cloud-based system that contains the one or more servers, including the cloud: based server, that cooperate with the one or more databases to store the data and reference information needed to control and track the package exchange process, to speed up the package delivery and pick-up process, and to ensure security for the package exchange process, where the on-board actuation module of the target vehicle is the on-board telematics module, where the one or more servers present the one or more application programming interfaces to provide a single common end-to-end solution between servers of one or more package delivery systems and servers of one or more telematics providers without additional hardware required to be installed in the target vehicle.

5. The cloud based system of claim 4, wherein the on-board telematics module of the target vehicle is coupled to an intelligent control system in the target vehicle, where the security module is configured to send the commands to the intelligent control system of the target vehicle via communication with the on-board telematics module in the target vehicle through the one or more servers of the telematics provider, where the security module provides the second virtual key to the telematics provider, where the one or more servers of the telematics provider uses the second virtual key for authentication of communications from the security module;

wherein the commands include waking up the on-board telematics module and performing mechanical actions of locking and unlocking the target vehicle, opening and closing doors, and giving an alert, wherein giving the alert includes one or a combination of 1) activating one or more lights of the target vehicle, 2) activating an alarm system of the target vehicle, and 3) hocking a horn of the target vehicle; and wherein the one or more processors are configured to calculate the first threshold distance, and then issue a request to the one or more servers of the telematics provider to issue the command to wake up the on-board telematics module by pinging the on-board telematics module with intervals shorter than a predefined idle time before going to sleep of the on-board telematics module.

6. The cloud based system of claim 4, further includes:

the security module is configured to provide the one or more application programming interfaces between servers of two or more of the package delivery systems and servers of two or more of the telematics providers;

a first input socket of the security module is configured to receive a first notification about a request for the package delivery to or a pick-up from the target vehicle of the user via the one or more application programming interfaces from a first package delivery system, the first notification includes the first virtual key for authentication;

a second module is configured to communicate with a database of the cloud based provider to store the first notification including a shipping Tracking Number (TN) and a Vehicle Identification Number (VIN) associated with the request and to register the request for the package delivery to or the pick-up from the target vehicle;

the security module is configured to, upon registering the package delivery or pick-up request, send a second notification to the user via either a mobile application or a desktop application on the second client device of the user to confirm with the user a desire to have a package with the shipping TN shipped to or picked-up from the target vehicle with the VIN, the second notification requesting the security token from the user;

the security module is configured to use the one or more application programming interfaces with the two or more telematics providers to establish wireless communications with the on-board telematics module in the target vehicle, where the security module is configured to send a wakeup command along with the second virtual key for authentication to a first telematics provider via the one or more application programming interfaces to wake the target vehicle's on-board telematics module when the package delivery vehicle is in close proximity established by the first threshold distance to the target vehicle matching the VIN; and where the security module is configured to send an unlock command along with the second virtual key for authentication to the first telematics provider via the one or more application programming interfaces to unlock the trunk and/or the doors of the vehicle via the vehicle's on-board telematics module when an indication is received that a delivery person is ready to deliver or pick-up the package, and where the security module is also configured to send a lock command along with the second virtual key for authentication to the first telematics provider via the one or more application programming interfaces to lock the trunk and the doors of the vehicle via the vehicle's on-board telematics module when the confirmation is received that the delivery person has delivered or picked-up the package.

7. The cloud based system of claim 3, wherein the current GPS coordinates of the package delivery vehicle are transmitted from a GPS-based delivery application resident in the first client device associated with the package delivery vehicle, the first client device residing 1) in the package delivery vehicle, or 2) in a handheld tool that travels with a delivery person of the package delivery vehicle, where the GPS-based delivery application transmits the current GPS coordinates of the package delivery vehicle along with the first virtual key for authentication, where the GPS-based delivery application is downloadable or otherwise electronically distributed to the first client device from a database in a cloud-based server;

wherein the on-board actuation module of the target vehicle is one of: 1) the on-board telematics module configured to send the current GPS coordinates of the target vehicle to the one or more servers of the telematics provider, and wherein the one or more servers of the telematics provider are configured to send the GPS coordinates of the target vehicle to the cloud-based server having the GPS-based proximity module, where the data is transmitted, via a secure communication, from the telematics provider to the GPS-based proximity module; or 2) the on-board dongle module that is coupled to a fault and diagnostic module installed in the target vehicle of the user and is configured to retrieve diagnostic data including the current GPS coordinates of the target vehicle of the user, the on-board dongle module is configured to send the current GPS coordinates of the target vehicle of the user via a Wi-Fi or cellular communication to the GPS-based proximity module.

8. The cloud based system of claim 3, wherein the first threshold distance is calculated by the one or more processors in cooperation with a GPS-based proximity control routine in the GPS-based proximity module and the calculation is based on factors including current traffic data as well as actual distance between the first client device of the package delivery vehicle and the target vehicle, and wherein unlocking the target vehicle while in a close proximity established by a third threshold distance smaller by a preset distance than the second threshold distance between the package delivery vehicle and the target vehicle, wherein the one or more processors calculate the third threshold distance and the second threshold distance, and wherein unlocking includes acquiring an unlocking permission by the GPS-based proximity module from the user and satisfying the third threshold distance as well as satisfying a security measure that the issuing of an unlocking command is occurring only within a preset time window, and then the GPS-based proximity module is configured to transmit the unlock command to the on-board actuation module in the target vehicle to unlock one or more of the doors including the trunk of the target vehicle.

9. The cloud based system of claim 3, wherein the GPS-based proximity module is further configured to calculate the fourth distance separation threshold with the one or more processors and then send a command to lock the target vehicle when the fourth distance separation threshold between the first client device associated with the package delivery vehicle and the target vehicle is satisfied, and wherein locking includes performing a lock verification, to check to see if the doors of the target vehicle are indeed locked by a time the fourth distance separation threshold is satisfied, and then, if not locked, to send a command to the on-board actuation module to lock the target vehicle by locking one or more of the doors of the target vehicle, and, where the locking the doors includes ensuring the trunk and a sunroof are closed and locked.

10. The cloud based system of claim 2, wherein the security token is a current rolling security key of the BCM that is used by the security module to generate a next rolling security key of the BCM of the target vehicle; and wherein after the first authentication and in the overlap window of time between the first shelf life and the second shelf life, the security module is configured to send, via a universal fey fob simulator of a delivery person, the next rolling security key and the one or more commands 1) based on the request from first client device, or 2) initiated by the security module, to the Body Control Module (BMC) of the target vehicle such that after the second authentication of the next rolling security key by the BMC, the commands are executed via the BMC of the target vehicle.

11. The cloud based system of claim 1, further including a pool of virtual keys including one or more public keys and associated private keys in at least one database of a cloud-based server, where the first virtual key is a public key from the pool of virtual keys supplied by the security module, via a secure communication, to the first client device of the package delivery vehicle;

wherein the first client device is configured to include the first virtual key with each communication to the security module; and wherein the first virtual key is used by the security module for the first authentication of the communications received from the first client device of the package delivery vehicle, where the first authentication includes matching the first public key with an associated first private key of the pool of virtual keys, where the first virtual key is recycled after the expiration of the first shelf life.

12. A secure method of package exchange with a vehicle service by a cloud-based system between a package delivery vehicle and a target vehicle, comprising:

receiving at the cloud-based system a first virtual key and one of 1) a request for the package exchange with the vehicle service, 2) data, or 3) both, from the package delivery vehicle, the first virtual key having a first shelf life to limit at least activation of an on-board actuation module installed in the target vehicle;

authenticating by the cloud-based system communications from the package delivery vehicle using the first virtual key;

receiving a security token from a user, the security token having a second shelf life and to be used for a verification of the user and the target vehicle; and after authentication, sending one or more commands by the cloud-based system 1) based on the request from the package delivery vehicle, or 2) initiated by the cloud-based system, in an overlap window of time between the first shelf life and the second shelf life to the on-board actuation module of the target vehicle so as to perform a package delivery of the vehicle service from the package delivery vehicle.

13. The secure method of claim 12, wherein the on-board actuation module is one of: 1) an on-board telematics module, where receiving the security token from the user further includes logging by the user into a user's account on the telematics provider and requesting the security token, and providing the security token to the user by the telematics provider;

wherein sending the commands further includes sending the security token to the telematics provider, receiving a second virtual key from the telematics provider after the verification, and sending the commands and the second virtual key to the telematics provider in the overlap window of time between the first shelf life and the second shelf life, where the commands are sent by the telematics provider to a telematics module of the target vehicle after authenticating communications using the second virtual key; or 2) an on-board dongle module where receiving the security token from the user further includes receiving a current rolling security key of the BCM of the target vehicle as the security token, generating a next rolling security key of the BCM of the target vehicle, where sending the commands further includes sending the command and the next rolling security key to the on-board dongle module of the target vehicle, and the dongle module transmitting the commands and the next rolling security key to the BCM of the target vehicle; and wherein authenticating communications from the package delivery vehicle further includes selecting the first virtual key from a pool of virtual keys, the pool of virtual keys including one or more public keys and associated private keys, providing the first virtual key to the package delivery vehicle, authenticating the communications from the package delivery vehicle by matching the first public key with an associated private key, and recycling the first virtual key after expiration of the first shelf life.

14. The secure method of claim 12, further including controlling and tracking a secure package exchange with the vehicle service by a GPS-based proximity module of the cloud-based system;
monitoring a distance between the package delivery vehicle and the target vehicle by receiving current GPS coordinates of the package delivery vehicle and current GPS coordinates of the target vehicle;
sending a first command for waking up the on-board actuation module of the target vehicle while establishing a close proximity by a first threshold distance between the package delivery vehicle and the target vehicle;
sending a second command for providing an alert by to the target vehicle while establishing a close proximity by a second threshold distance between the package delivery vehicle and the target vehicle;
sending a third command for unlocking the target vehicle;
exchanging at least one package between the package delivery vehicle and the target vehicle;
receiving a confirmation of the package exchange with a vehicle service; and
sending a fourth command for locking the target vehicle after receiving the confirmation and after establishing a fourth separation distance between the package delivery vehicle and the target vehicle.

15. The secure method of claim 14,
wherein monitoring the distance between the package delivery vehicle and the target vehicle further includes:
authenticating communications from the package delivery vehicle using the first virtual key;
receiving the current GPS coordinates of the package delivery vehicle from a resident application in 1) the package delivery vehicle, or 2) a mobile device of a package carrier;
receiving the current GPS coordinates of the target vehicle through a secure communication channel from the actuation module; and
calculating a distance between the target vehicle and package delivery vehicle using the GPS coordinates of the package delivery vehicle and GPS coordinates of the target vehicle.

16. The secure method of claim 14,
wherein sending the third command for unlocking the target vehicle further includes:
establishing a close proximity by a third threshold distance smaller than the second threshold distance between the package delivery vehicle and the target vehicle,
issuing the unlock command in a preset time window, and acquiring a permission for unlocking the target vehicle from the user,
where unlocking includes opening one or more doors of the target vehicle, including a trunk and a sunroof; and
wherein sending the fourth command for locking the target vehicle further includes performing a lock verification.

17. The secure method of claim 12,
wherein the target vehicle's on-board actuation module further performing:
sending data including GPS coordinates of the target vehicle to the cloud based system; and
receiving the commands from the cloud-based system, the commands including waking up the on-board actuation module and performing mechanical actions of locking and unlocking the target vehicle, opening and closing doors, and giving an alert,
where giving the alert includes 1) activating one or more lights of the target vehicle, 2) activating an alarm system of the target vehicle, and 3) honking a horn of the target vehicle,
wherein executing the commands by an intelligent controller of in the target vehicle coupled to the on-board actuation module.

18. The secure method of claim 12,
wherein prior to the package exchange with the vehicle service performing:
offering to a customer on a user interface at a checkout of a retail website an alternative package delivery option of delivering to a vehicle of the customer;
selecting the alternative package delivery option by the customer;
uploading shipping data to the cloud-based system implementing the package exchange with the vehicle service, the shipping data includes customer data;
tentatively proposing a date and time frame for the alternative package delivery to the customer;
receiving, by the cloud-based system, a first notification about a request for the package exchange with the vehicle service for the target vehicle of the user;
storing a shipping tracking number and a Vehicle Identification Number of the target vehicle in a database of the cloud-based system and registering a package delivery to or a package pickup from the target vehicle; and
sending, by the cloud-based system, a second notification to the user about an expected date and time frame of the package exchange with the vehicle service and receiving a confirmation of the package delivery to or the package pickup from the user.

19. The package exchange method of claim 12, further including:
acquiring a permission for unlocking the target vehicle from a user of the package exchange with the vehicle service; and
sending a confirmation and a target vehicle lock confirmation to the user of the package exchange with the vehicle service, after exchanging the at least one package between the package carrier's vehicle and the target vehicle and locking the target vehicle.

20. A multiple phase security system used by a cloud-based package-exchange-service between a package delivery vehicle and a target vehicle, comprising:
one or more servers having one for more hardware processors, one or more ports, and configured to cooperate with one or more databases in the system for cloud based package-exchange-service;
a security module of the one or more servers running on the one or more processors and configured to coordinate the multiple phase security system to enable the package exchange with the target vehicle by enabling access to the target vehicle for the package exchange by remotely opening up the target vehicle;
where the security module is configured to receive notification of a package exchange request for a first user either i) from a server of a package delivery service or ii) from a server of a merchant;
where the security module is configured to look up in a first database of the cloud-based package-exchange-service for one or more contact information listings for the first user and to create one or more notifications, including any of e-mail notifications, SMS text notifications, and mobile app notifications, to one or more client devices associated with the first user;

where the notification of the package exchange request for the first user to take action to verify that the package exchange with their one or more target vehicles has indeed been requested by that first user;

where, when there is more than one target vehicle, the security module is configured to, via a first port, to receive confirmation of which of the one or more target vehicles associated with the first user will be the target vehicle used for the package exchange with the package delivery service, the received information is from any of the following i) the one or more client device of the first user, ii) the server of the merchant, and iii) the server of the package delivery service;

where the security module is configured to create at least one or more unique digital encrypted keys with an associated valid duration time period that are specific to the target vehicle in order for the package exchange service to utilize and to limit at least activation of an on-board actuation module installed in the target vehicle, where the security module is configured to then send the one or more unique digital encrypted keys to the server of the package delivery service as well as store each unique key sequence of the one or more unique digital encrypted keys or their equivalents in the first database of the cloud-based package-exchange-service in order to later verify an authenticity of the digital encrypted key for the package delivery service;

where the security module is configured to receive a first digital encrypted key and a request to any of i) locate the target vehicle, ii) open the target vehicle, iii) cause an alert of the target vehicle including one or a combination of honking a horn and flashing lights, iv) lock the target vehicle, and v) any combination of these four, from a client device associated with the package delivery service when the package delivery services wants to locate, open, cause an alert, or lock the target vehicle, and where the security module is configured to then check the unique key sequence against the stored information in the first database of the cloud based package-exchange-service in order to authenticate the digital encrypted key; and where the security module is configured to perform a time check against an effective duration of a first unique virtual digital key received from the client device of the package delivery service, and if the time check against the effective duration of the virtual digital key indicates that the time period for use is still valid, then generating a request to issue a command for either i) a telematics module of the on-board actuation module in the target vehicle, ii) a dongle module of the on-board actuation module, or iii) a RF module associated with a keyless remote entry function located in the target vehicle, to perform an electro-mechanical operation in the target vehicle and open up the target vehicle so that the package exchange with the target vehicle can occur from the package delivery vehicle.

* * * * *